United States Patent
Hoffer et al.

(10) Patent No.: US 10,674,788 B2
(45) Date of Patent: *Jun. 9, 2020

(54) PARTICULATE FOAM WITH OTHER CUSHIONING

(71) Applicant: NIKE, Inc., Beaverton, OR (US)

(72) Inventors: Kevin W. Hoffer, Portland, OR (US);
Cassidy R. Levy, West Linn, OR (US);
Nicholas R. Long, Portland, OR (US);
Aaron K. Seid, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 33 days.

This patent is subject to a terminal disclaimer.

(21) Appl. No.: 15/574,700

(22) PCT Filed: Sep. 23, 2016

(86) PCT No.: PCT/US2016/053260
§ 371 (c)(1),
(2) Date: Nov. 16, 2017

(87) PCT Pub. No.: WO2017/053669
PCT Pub. Date: Mar. 30, 2017

(65) Prior Publication Data
US 2018/0289108 A1 Oct. 11, 2018

Related U.S. Application Data

(60) Provisional application No. 62/222,842, filed on Sep. 24, 2015, provisional application No. 62/222,882, (Continued)

(51) Int. Cl.
*A43B 13/14* (2006.01)
*A43B 13/12* (2006.01)
(Continued)

(52) U.S. Cl.
CPC .......... *A43B 13/141* (2013.01); *A43B 1/0072* (2013.01); *A43B 5/00* (2013.01);
(Continued)

(58) Field of Classification Search
CPC ..... A43B 13/18; A43B 13/186; A43B 13/188; A43B 13/122; A43B 13/125
See application file for complete search history.

(56) References Cited

U.S. PATENT DOCUMENTS 2,930,149 A * 3/1960 Hack .................... A43B 13/181
36/28
3,087,262 A * 4/1963 Russell ................ A43B 13/181
36/28
(Continued)

FOREIGN PATENT DOCUMENTS

CN           1053884 A     8/1991
CN           1211901 A     3/1999
(Continued)

OTHER PUBLICATIONS

Japan Patent Office, Notice of Reasons for Rejection for JP Application No. 2018-515812 dated Jul. 29, 2019.
(Continued)

*Primary Examiner* — Ted Kavanaugh
(74) *Attorney, Agent, or Firm* — Honigman LLP; Matthew H. Szalach; Jonathan P. O'Brien

(57) ABSTRACT

An article of footwear has an upper, an outsole attached to the upper, and a midsole. The outsole includes a ground-engaging surface and an inner surface disposed on opposite sides. The midsole has a footbed and a bottom surface disposed on opposite sides. The bottom surface opposes the inner surface to define a cavity therebetween. The article of footwear also includes a first series of projections extending into the cavity from one of the inner surface and the bottom
(Continued)

surface in a first direction toward the other of the inner surface and the bottom surface. The article of footwear also includes a second series of projection extending into the cavity from one of the inner surface and the bottom surface in the first direction toward the other of the inner surface and the bottom surface. The article of footwear also includes a quantity of particulate matter disposed within the cavity.

22 Claims, 21 Drawing Sheets

Related U.S. Application Data filed on Sep. 24, 2015, provisional application No. 62/222,832, filed on Sep. 24, 2015, provisional application No. 62/222,873, filed on Sep. 24, 2015, provisional application No. 62/222,816, filed on Sep. 24, 2015, provisional application No. 62/222,851, filed on Sep. 24, 2015.

(51) Int. Cl.

| | |
|---|---|
| A43B 13/18 | (2006.01) |
| A43B 13/20 | (2006.01) |
| A43B 1/00 | (2006.01) |
| A43B 13/04 | (2006.01) |
| A43B 5/00 | (2006.01) |
| A43B 13/16 | (2006.01) |
| B32B 5/16 | (2006.01) |
| B32B 5/18 | (2006.01) |
| B32B 25/04 | (2006.01) |
| B32B 25/14 | (2006.01) |
| A43B 7/14 | (2006.01) |
| A43B 7/32 | (2006.01) |

(52) U.S. Cl.
CPC ............ *A43B 7/141* (2013.01); *A43B 7/32* (2013.01); *A43B 13/04* (2013.01); *A43B 13/122* (2013.01); *A43B 13/125* (2013.01); *A43B 13/127* (2013.01); *A43B 13/16* (2013.01); *A43B 13/181* (2013.01); *A43B 13/186* (2013.01); *A43B 13/187* (2013.01); *A43B 13/188* (2013.01); *A43B 13/189* (2013.01); *A43B 13/20* (2013.01); *A43B 13/206* (2013.01); *B32B 5/16* (2013.01); *B32B 5/18* (2013.01); *B32B 25/047* (2013.01); *B32B 25/14* (2013.01); *B32B 2264/02* (2013.01); *B32B 2437/02* (2013.01)

(56) References Cited

U.S. PATENT DOCUMENTS

| | | | |
|---|---|---|---|
| 3,469,576 A | | 9/1969 | Smith et al. |
| 3,552,044 A | | 1/1971 | Wiele |
| 3,608,215 A | * | 9/1971 | Fukuoka ............... A43B 3/108 36/29 |
| 3,765,422 A | | 10/1973 | Smith |
| 3,971,839 A | * | 7/1976 | Taylor ............... A47G 9/00 264/112 |
| 4,170,078 A | * | 10/1979 | Moss ............... A43B 13/203 36/28 |
| 4,307,200 A | | 12/1981 | Lichter et al. |
| 4,343,047 A | | 8/1982 | Lazowski et al. |
| 4,345,387 A | | 8/1982 | Daswick |
| 4,524,529 A | | 6/1985 | Schaefer |
| 4,658,515 A | * | 4/1987 | Oatman ............... A43B 17/14 36/2.6 |
| 4,686,781 A | | 8/1987 | Bury |
| 4,724,627 A | | 2/1988 | Sisco |
| 4,823,799 A | | 4/1989 | Robbins |
| 4,905,320 A | | 3/1990 | Squyers, Jr. |
| 4,970,807 A | | 11/1990 | Anderie et al. |
| 5,005,575 A | | 4/1991 | Geri |
| 5,150,490 A | | 9/1992 | Busch et al. |
| 5,231,776 A | * | 8/1993 | Wagner ............... A43B 19/005 36/1 |
| 5,363,570 A | | 11/1994 | Allen et al. |
| 5,378,223 A | | 1/1995 | Grim et al. |
| 5,383,290 A | | 1/1995 | Grim |
| 5,392,534 A | | 2/1995 | Grim |
| 5,517,770 A | | 5/1996 | Martin et al. |
| 5,617,650 A | | 4/1997 | Grim |
| 5,665,285 A | | 9/1997 | Hattori et al. |
| 5,718,064 A | | 2/1998 | Pyle |
| 5,753,357 A | | 5/1998 | Filipitsch et al. |
| 5,758,435 A | | 6/1998 | Miyata |
| 5,987,781 A | | 11/1999 | Pavesi et al. |
| 6,020,055 A | | 2/2000 | Pearce |
| 6,061,928 A | | 5/2000 | Nichols |
| 6,098,209 A | | 8/2000 | Bainbridge et al. |
| 6,158,149 A | | 12/2000 | Rudy |
| 6,266,896 B1 | | 7/2001 | Liu |
| D460,852 S | | 7/2002 | Daudier |
| 6,453,477 B1 | | 9/2002 | Bainbridge et al. |
| 6,502,331 B2 | | 1/2003 | Hines |
| 6,532,689 B1 | | 3/2003 | Jones, Jr. |
| 6,635,203 B2 | | 10/2003 | Monaci |
| 6,759,443 B2 | | 7/2004 | Brant et al. |
| 6,782,640 B2 | | 8/2004 | Westin |
| 6,848,200 B1 | | 2/2005 | Westin |
| 6,878,753 B1 | | 4/2005 | Takemura et al. |
| 7,037,571 B2 | | 5/2006 | Fish et al. |
| 7,069,672 B2 | | 7/2006 | Hahn |
| 7,152,342 B2 | | 12/2006 | Sommer |
| 7,484,318 B2 | | 2/2009 | Finkelstein |
| 7,555,851 B2 | | 7/2009 | Hazenberg et al. |
| 7,594,344 B2 | | 9/2009 | Mizrahi |
| 7,805,859 B2 | | 10/2010 | Finkelstein |
| 7,823,238 B2 | | 11/2010 | Din Mahamed |
| 7,904,971 B2 | | 3/2011 | Doria et al. |
| 8,091,254 B2 | | 1/2012 | Wang |
| 8,178,022 B2 | | 5/2012 | Schindler et al. |
| 8,272,149 B2 | | 9/2012 | Cooper et al. |
| 8,671,591 B2 | | 3/2014 | Brown |
| 2001/0000835 A1 | | 5/2001 | Hines |
| 2005/0022424 A1 | | 2/2005 | Held |
| 2005/0150132 A1 | | 7/2005 | Iannacone |
| 2006/0010717 A1 | | 1/2006 | Finkelstein |
| 2006/0130363 A1 | | 6/2006 | Hottinger |
| 2007/0051018 A1 | | 3/2007 | Issler |
| 2007/0169379 A1 | | 7/2007 | Hazenberg et al. |
| 2008/0066341 A1 | | 3/2008 | Hottinger |
| 2008/0148599 A1 | | 6/2008 | Collins |
| 2008/0230956 A1 | | 9/2008 | Allmendinger et al. |
| 2009/0094855 A1 | | 4/2009 | Finkelstein |
| 2009/0313853 A1 | | 12/2009 | Tadin |
| 2010/0011618 A1 | | 1/2010 | Bitton |
| 2010/0047550 A1 | | 2/2010 | Prissok et al. |
| 2010/0222442 A1 | | 9/2010 | Prissok et al. |
| 2011/0016747 A1 | | 1/2011 | Bitton |
| 2011/0215497 A1 | | 9/2011 | McEvoy et al. |
| 2012/0036698 A1 | | 2/2012 | Guertin |
| 2012/0073163 A1 | | 3/2012 | Tse |
| 2012/0204451 A1 | | 8/2012 | De Roode et al. |
| 2012/0210602 A1 | | 8/2012 | Brown |
| 2013/0008050 A1 | | 1/2013 | Marc |
| 2013/0145653 A1 | | 6/2013 | Bradford |
| 2014/0007456 A1 | | 1/2014 | Tadin |
| 2014/0223776 A1 | | 8/2014 | Wardlaw et al. |
| 2014/0223777 A1 | | 8/2014 | Whiteman et al. |
| 2015/0196085 A1 | | 7/2015 | Westmoreland et al. |
| 2015/0223564 A1 | | 8/2015 | Peyton et al. |

(56) References Cited

U.S. PATENT DOCUMENTS

| | | |
|---|---|---|
| 2016/0073732 A1 | 3/2016 | Ernst et al. |
| 2017/0055636 A1 | 3/2017 | Campos, II et al. |

FOREIGN PATENT DOCUMENTS

| | | |
|---|---|---|
| CN | 202051034 U | 11/2011 |
| CN | 103141993 A | 6/2013 |
| CN | 103720129 A | 4/2014 |
| CN | 104010541 A | 8/2014 |
| CN | 104203029 A | 12/2014 |
| CN | 104363783 A | 2/2015 |
| CN | 104490008 A | 4/2015 |
| DE | 2907506 A1 | 9/1980 |
| DE | 3406504 A1 | 8/1985 |
| DE | 3627538 A1 | 2/1988 |
| DE | 3723549 A1 | 2/1988 |
| DE | 3406504 C2 | 1/1990 |
| DE | 3839747 A1 | 5/1990 |
| DE | 3905989 C2 | 1/1991 |
| DE | 4202159 A1 | 7/1993 |
| DE | 4401282 A1 | 12/1994 |
| DE | 4446252 A1 | 6/1995 |
| DE | 19708622 A1 | 9/1997 |
| DE | 10138426 C1 | 12/2002 |
| DE | 102009009589 A1 | 9/2010 |
| DE | 102010046278 A1 | 2/2011 |
| DE | 202016104626 U1 | 10/2016 |
| EP | 0007948 A1 | 2/1980 |
| EP | 130816 A2 | 1/1985 |
| EP | 316289 A2 | 5/1989 |
| EP | 0359699 A1 | 3/1990 |
| EP | 0383685 A1 | 8/1990 |
| EP | 529941 A1 | 3/1993 |
| EP | 2609824 A1 | 7/2013 |
| FR | 996111 A | 12/1951 |
| FR | 1018215 A | 12/1952 |
| FR | 2824884 A1 | 11/2002 |
| GB | 2066049 A | 7/1981 |
| GB | 2462100 A | 1/2010 |
| JP | S56-080702 U | 6/1981 |
| JP | H02-121601 A | 5/1990 |
| JP | H05-37104 U | 5/1993 |
| JP | H0723804 A | 1/1995 |
| JP | H0739404 A | 2/1995 |
| JP | 3042853 U | 11/1997 |
| JP | H11-32806 A | 2/1999 |
| JP | 2000316606 A | 11/2000 |
| JP | 2002306280 A | 10/2002 |
| JP | 2015513354 A | 5/2015 |
| KR | 19990069793 A | 9/1999 |
| KR | 100230096 B1 | 11/1999 |
| KR | 200374026 Y1 | 1/2005 |
| KR | 20100086227 A | 7/2010 |
| WO | WO-1997035496 A1 | 10/1997 |
| WO | WO-9947014 A1 | 9/1999 |
| WO | WO-2006049401 A1 | 5/2006 |
| WO | WO-2008012809 A2 | 1/2008 |
| WO | WO-2015/065578 A1 | 5/2015 |

OTHER PUBLICATIONS

Japan Patent Office, Notice of Reasons for Rejection for JP Application No. 2018-515822 dated Jul. 22, 2019.
Japan Patent Office, Notice of Reasons for Rejection for JP Application No. 2018-515842 dated Aug. 5, 2019.
Japan Patent Office, Notice of Reasons for Rejection for JP Application No. 2018-515825 dated Jul. 22, 2019.
Japan Patent Office, Notice of Reasons for Rejection for JP Application No. 2018-515843 dated Aug. 5, 2019.
Japan Patent Office, Notice of Reasons for Rejection for JP Application No. 2018-515828 dated Jul. 22, 2019.
Taiwan Intellectual Property Office, Search Report for TW Application No. 105130844 dated Aug. 27, 2019.
European Patent Office (ISA), International Search Report and Written Opinion for PCT Application No. PCT/US2017/022651, dated Oct. 25, 2017.
European Patent Office (ISA), International Search Report and Written Opinion for PCT Application No. PCT/US2017/022647, dated Nov. 2, 2017.
Korean Intellectual Property Office, Office Action for Application No. 10-2018-7011477, dated May 29, 2019.
Korean Intellectual Property Office, Office Action for Application No. 10-2018-7011479, dated Jun. 4, 2019.
Korean Intellectual Property Office, Office Action for Application No. 10-2018-7011480, dated Jun. 10, 2019.
Korean Intellectual Property Office, Office Action for Application No. 10-2018-7011478, dated Jun. 4, 2019.
United States Patent and Trademark Office, Office Action for U.S. Appl. No. 15/816,270, dated Apr. 17, 2018.
United States Patent and Trademark Office, Office Action for U.S. Appl. No. 15/816,200, dated Apr. 18, 2018.
European Patent Office as the International Searching Authority, International Search Report and Written Opinion for PCT Application No. PCT/US2016/053256, dated Jan. 12, 2017.
European Patent Office as the International Searching Authority, International Search Report and Written Opinion for PCT Application No. PCT/US2016/053240, dated Jan. 3, 2017.
European Patent Office as the International Searching Authority, International Search Report and Written Opinion for PCT Application No. PCT/US2016/053260, dated Dec. 15, 2016.
European Patent Office as the International Searching Authority, International Search Report and Written Opinion for PCT Application No. PCT/US2016/053232, dated Jan. 10, 2017.
European Patent Office as the International Searching Authority, International Search Report and Written Opinion for PCT Application No. PCT/US2016/053246, dated Jan. 10, 2017.
European Patent Office as the International Searching Authority, International Search Report and Written Opinion for PCT Application No. PCT/US2016/053265, dated Dec. 20, 2016.
Korean Intellectual Property Office, Office Action for Application No. 10-2018-7011476, dated May 29, 2019.
European Patent Office (ISA), International Preliminary Report on Patentability for International Application No. PCT/US2017/022651, dated Sep. 26, 2019.
European Patent Office (ISA), International Preliminary Report on Patentability for International Application No. PCT/US2017/022647, dated Sep. 26, 2019.
Korean Intellectual Property Office, Office Action for KR Application No. 10-2018-7011479, dated Dec. 26, 2019.
Korean Intellectual Property Office, Office Action for KR Application No. 10-2018-7011480, dated Jan. 21, 2020.
China National Intellectual Property Office, Office Action for CN Application No. 201680062271.7, dated Feb. 3, 2020.
Korean Intellectual Property Office, Office Action for KR Application No. 10-2019-7036063, dated Feb. 7, 2020.
European Patent Office, Communication pursuant to Article 94(3) EPC for EP Application No. 16777864.6, dated Apr. 7, 2020.
China National Intellectual Property Office, Office Action and Search Report for CN Application No. 201680062323.0, dated Mar. 4, 2020.
China National Intellectual Property Office, Office Action and Search Report for CN Application No. 201680062231.2, dated Mar. 24, 2020.
China National Intellectual Property Office, Office Action for CN Application No. 201680066534.1, dated Mar. 26, 2020.
China National Intellectual Property Office, Office Action and Search Report for CN Application No. 201680062300.X, dated Mar. 12, 2020.
European Patent Office, Communication pursuant to Article 94(3) EPC for EP Application No. 16777865.3, dated Apr. 20, 2020.
Korean Intellectual Property Office, Office Action for KR Application No. 10-2020-7003423, dated Apr. 21, 2020.

\* cited by examiner

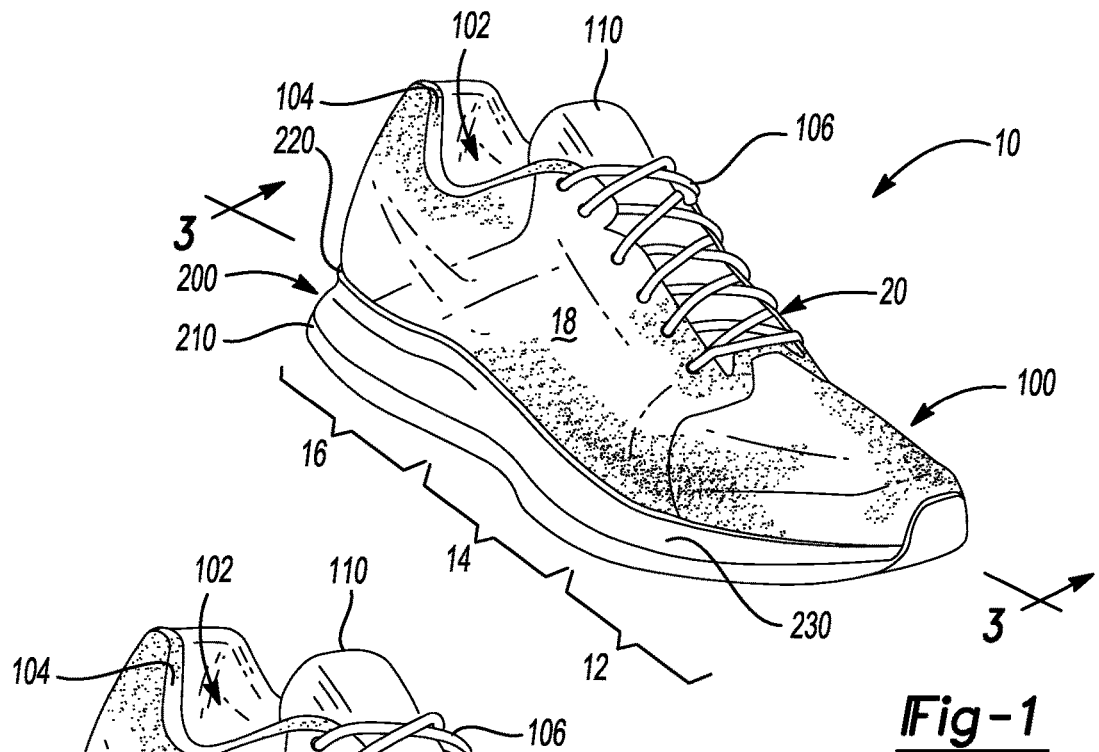
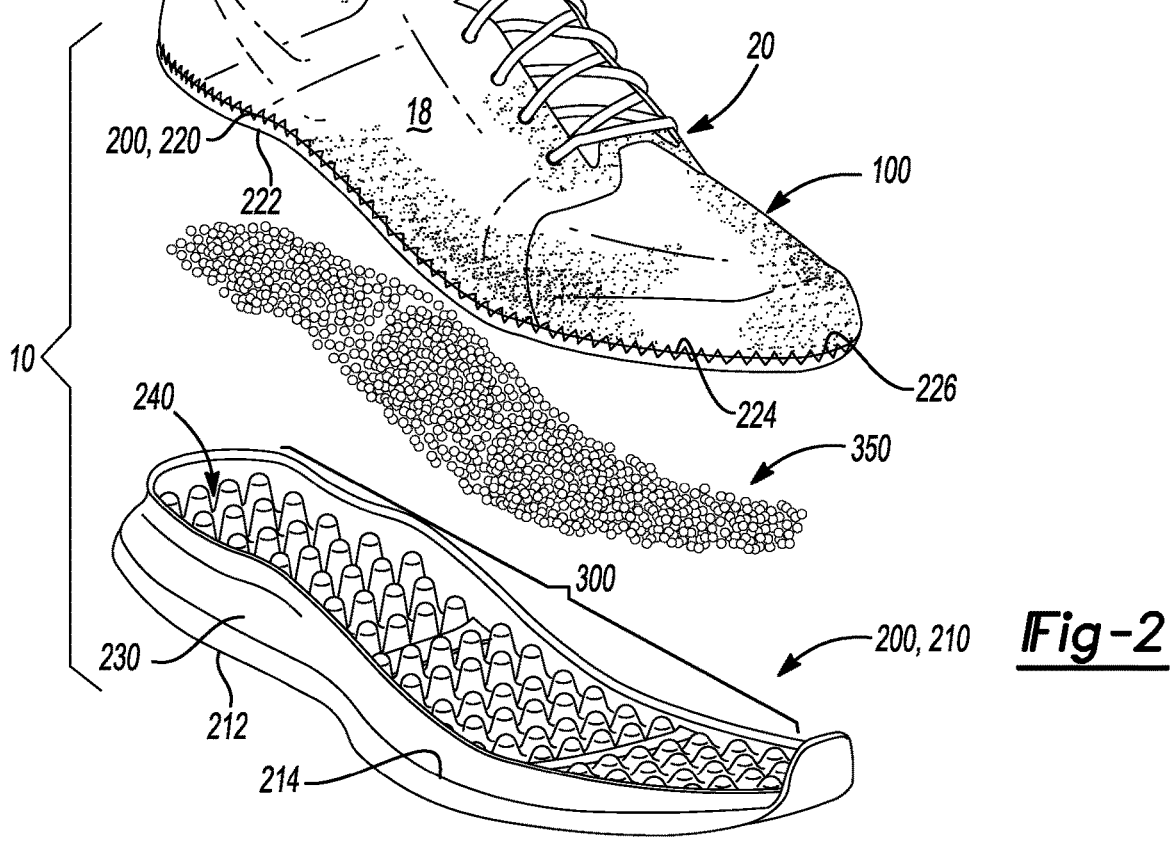
Fig-1
Fig-2

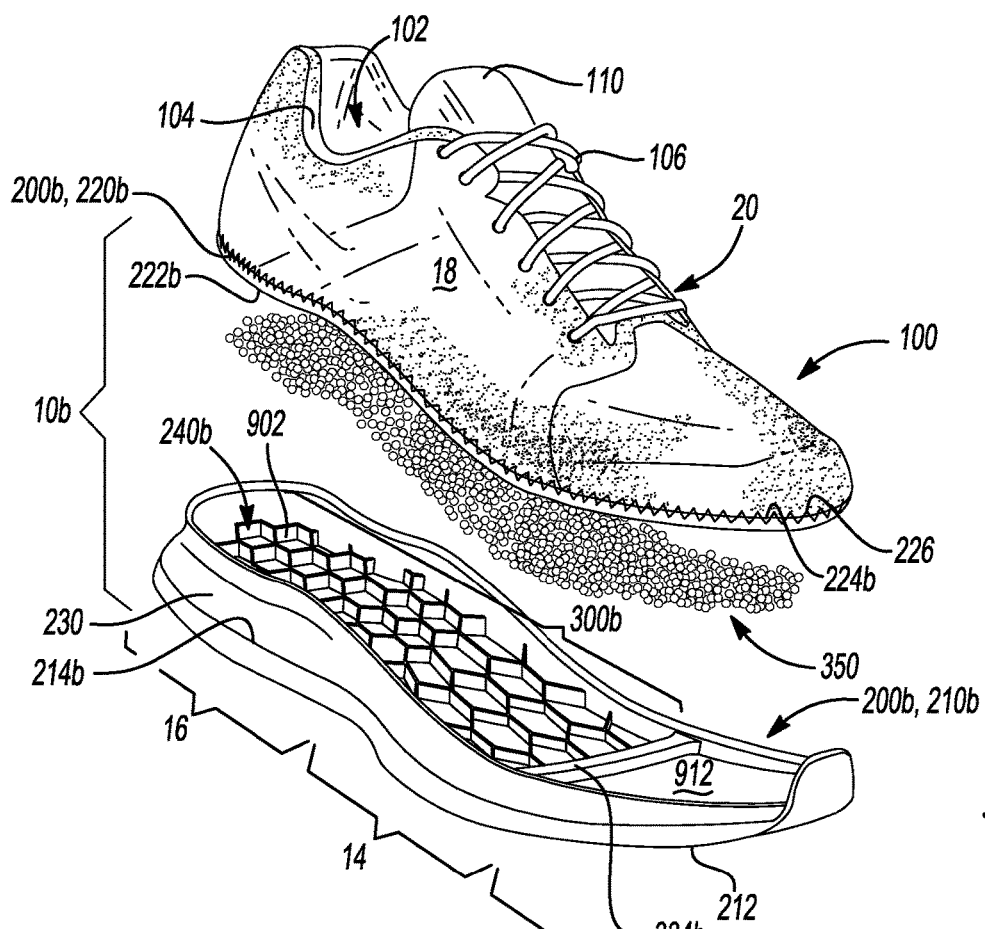
Fig-9
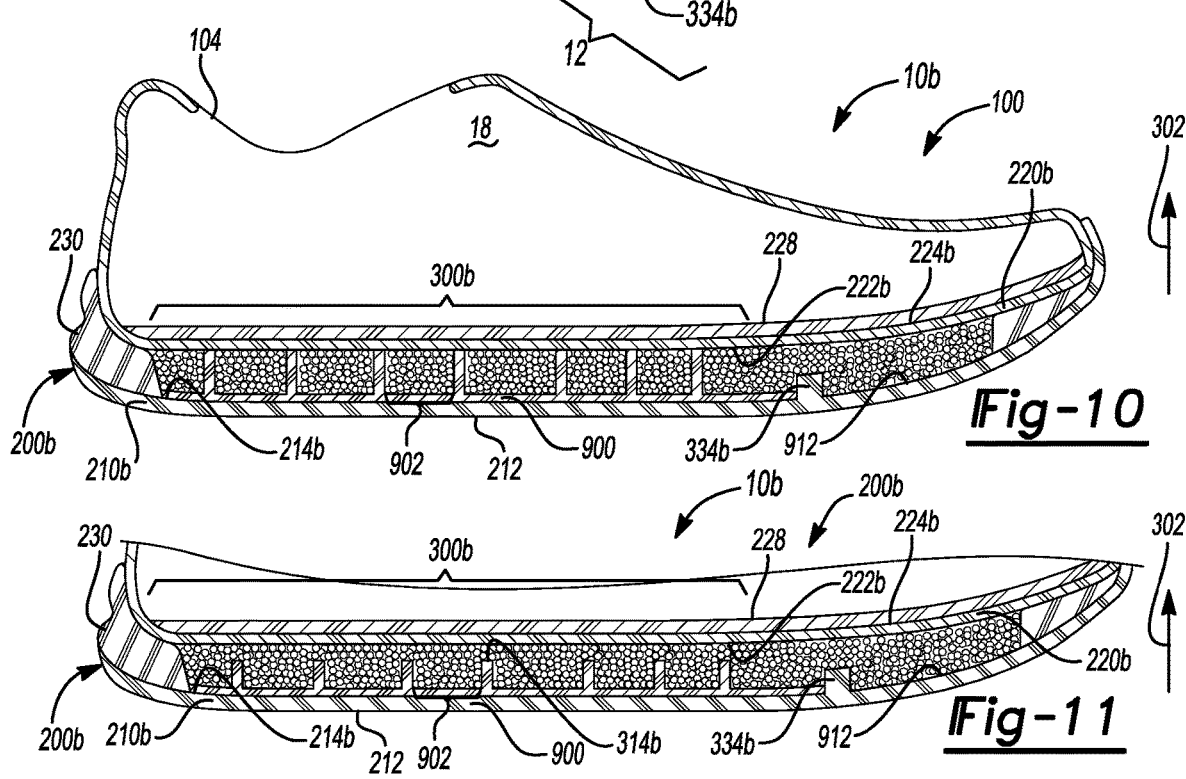
Fig-10
Fig-11

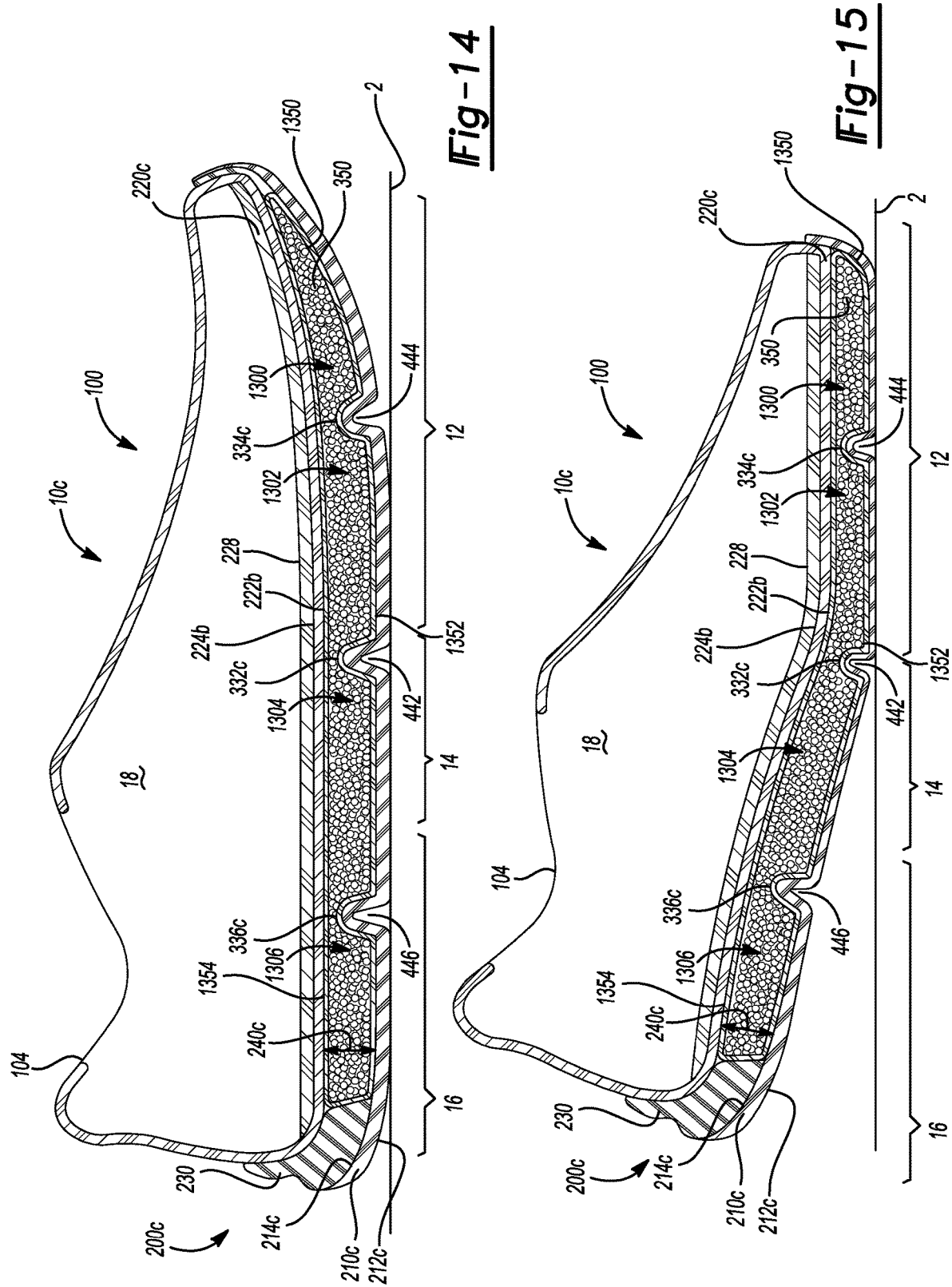

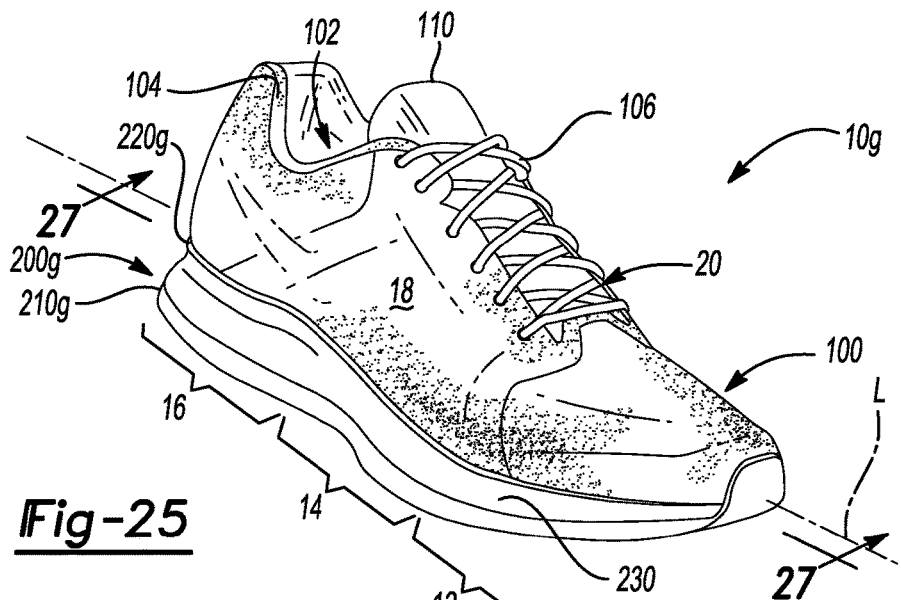
Fig-25
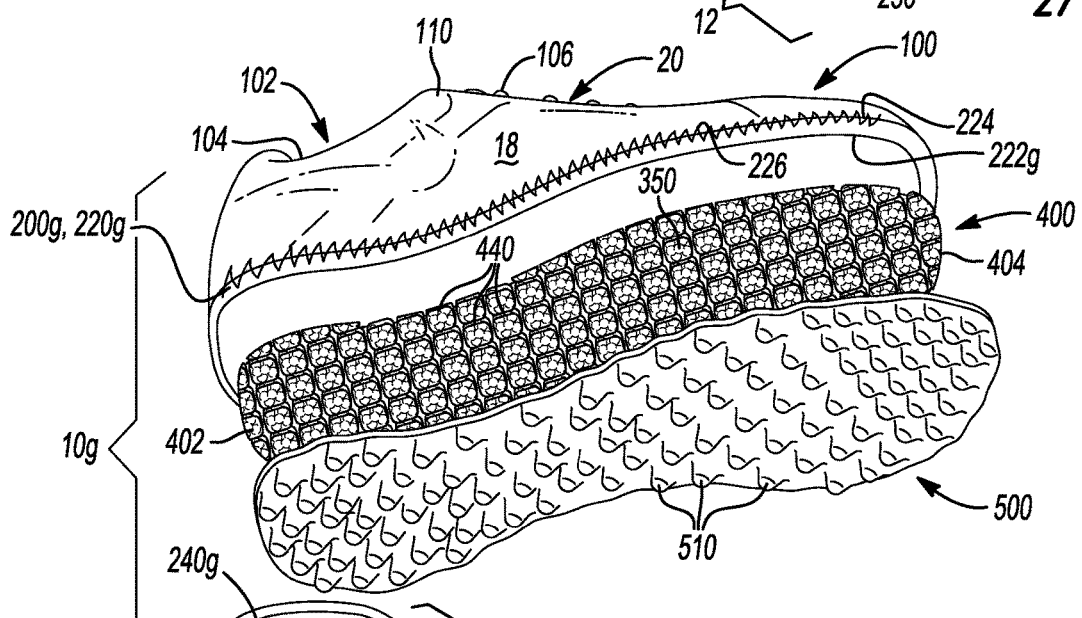
Fig-26
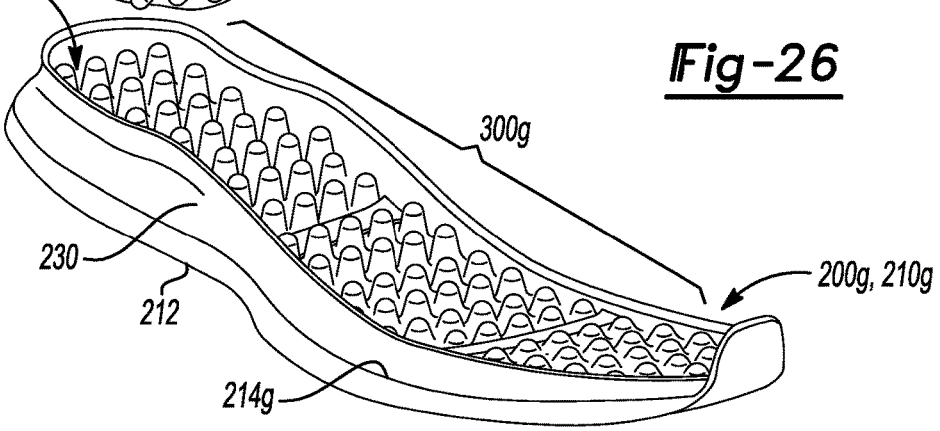

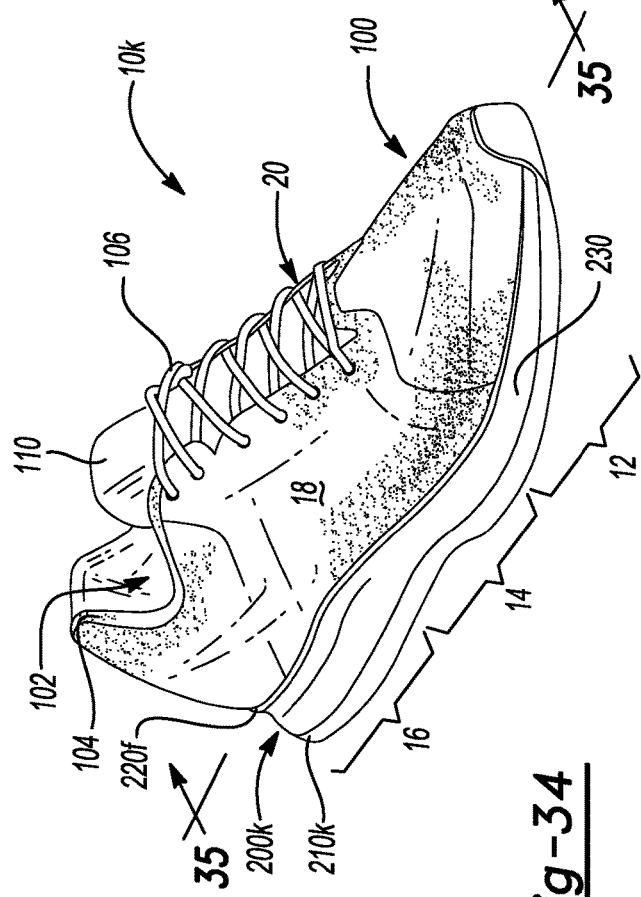
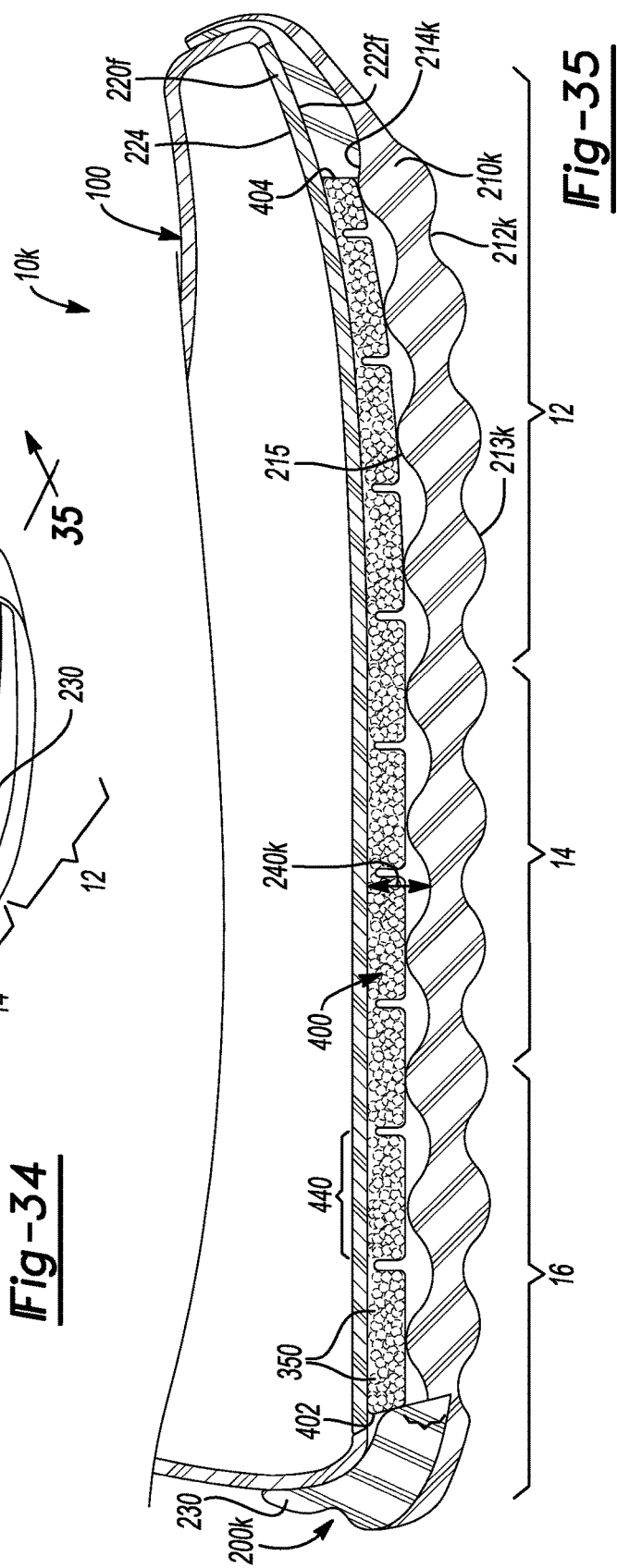

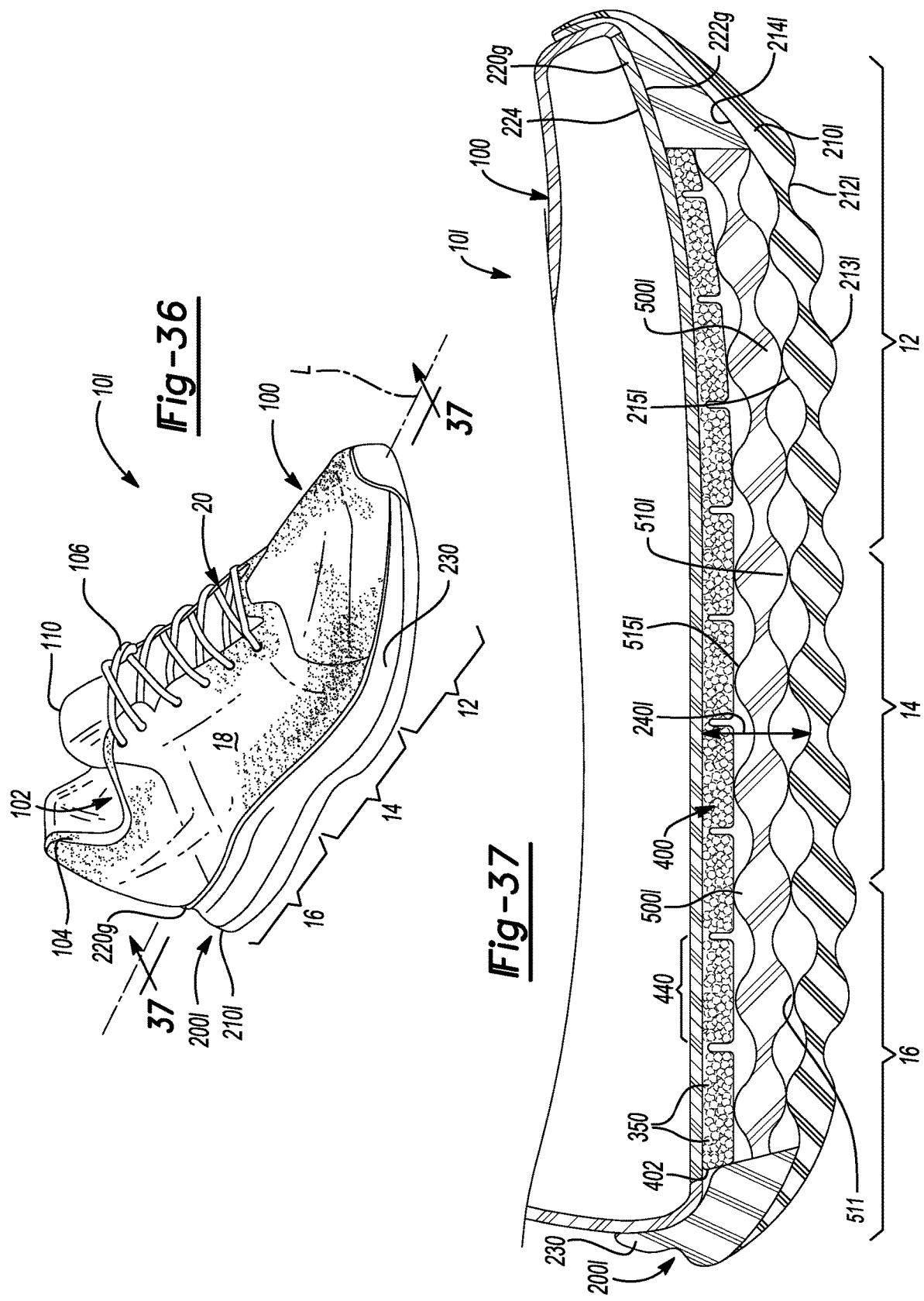

PARTICULATE FOAM WITH OTHER CUSHIONING

CROSS REFERENCE TO RELATED APPLICATIONS

This application is the national phase of International Application No. PCT/US2016/053260, filed Sep. 23, 2016, which claims priority to U.S. Provisional Application Ser. No. 62/222,882, filed Sep. 24, 2015, and to U.S. Provisional Application Ser. No. 62/222,873, filed Sep. 24, 2015, and to U.S. Provisional Application Ser. No. 62/222,851, filed Sep. 24, 2015, and to U.S. Provisional Application Ser. No. 62/222,842, filed Sep. 24, 2015, and to U.S. Provisional Application Ser. No. 62/222,832, filed Sep. 24, 2015, and to U.S. Provisional Application Ser. No. 62/222,816, filed Sep. 24, 2015, the disclosures of which are hereby incorporated by reference in their entirety.

FIELD

The present disclosure relates to articles of footwear having particulate foam incorporated with other cushioning.

BACKGROUND

This section provides background information related to the present disclosure which is not necessarily prior art.

Articles of footwear conventionally include an upper and a sole structure. The upper may be formed from any suitable material(s) to receive, secure, and support a foot on the sole structure. The upper may cooperate with laces, straps, or other fasteners to adjust the fit of the upper around the foot. A bottom portion of the upper, proximate to a bottom surface of the foot, attaches to the sole structure.

Sole structures generally include a layered arrangement extending between a ground surface and the upper. One layer of the sole structure includes an outsole that provides abrasion-resistance and traction with the ground surface. The outsole may be formed from rubber or other materials that impart durability and wear-resistance, as well as enhancing traction with the ground surface. Another layer of the sole structure includes a midsole disposed between the outsole and the upper. The midsole provides cushioning for the foot and is generally at least partially formed from a polymer foam material that compresses resiliently under an applied load to cushion the foot by attenuating ground-reaction forces. The midsole may define a bottom surface on one side that opposes the outsole and a footbed on the opposite side that may be contoured to conform to a profile of the bottom surface of the foot. Sole structures may also include a comfort-enhancing insole and/or a sockliner located within a void proximate to the bottom portion of the upper.

Midsoles using polymer foam materials are generally configured as a single slab that compresses resiliently under applied loads, such as during walking or running movements. Generally, single-slab polymer foams are designed with an emphasis on balancing cushioning characteristics that relate to softness and responsiveness as the slab compresses under gradient loads. Polymer foams providing cushioning that is too soft will decrease the compressibility and the ability of the midsole to attenuate ground-reaction forces after repeated compressions. Conversely, polymer foams that are too hard and, thus, very responsive, sacrifice softness, thereby resulting in a loss in comfort. While different regions of a slab of polymer foam may vary in density, hardness, energy return, and material selection to balance the softness and responsiveness of the slab as a whole, creating a single slab of polymer foam that loads in a gradient manner from soft to responsive is difficult to achieve.

DRAWINGS

The drawings described herein are for illustrative purposes only of selected configurations and are not intended to limit the scope of the present disclosure.

FIG. 1 is a top perspective view of an article of footwear in accordance with principles of the present disclosure;

FIG. 2 is an exploded view of the article of footwear of FIG. 1 showing projections extending from an inner surface of an outsole toward a bottom surface of a midsole;

FIG. 9 is an exploded view of the article of footwear of FIG. 8 showing projections extending from an inner surface of an outsole that define honeycomb-shaped compartments for receiving a quantity of particulate matter;

FIG. 10 is a cross-sectional view taken along line 10-10 of FIG. 8 showing projections extending from an inner surface of an outsole toward a bottom surface of a midsole and terminating at a point of contact with the bottom surface;

FIG. 11 is a partial cross-sectional view taken along line 10-10 of FIG. 8 showing projections extending from an inner surface of an outsole toward a bottom surface of a midsole;

FIG. 14 is a cross-sectional view taken along line 14-14 of FIG. 12 showing particulate matter residing in a casing disposed between an outsole and a midsole of a sole structure when the sole structure is at rest;

FIG. 15 is a cross-sectional view taken along line 14-14 of FIG. 12 showing particulate matter residing in a casing disposed between an outsole and a midsole of a sole structure when the sole structure if flexed;

FIG. 25 is a top perspective view of an article of footwear in accordance with principles of the present disclosure;

FIG. 26 is an exploded view of the article of footwear of FIG. 25 showing a tufted casing containing particulate matter and a cushioning layer received within a cavity and located on projections extending from an inner surface of an outsole toward a bottom surface of a midsole;

FIG. 34 is a top perspective view of an article of footwear in accordance with principles of the present disclosure;

FIG. 35 is a partial cross-sectional view of FIG. 34 taken along line 35-35 showing an inner surface of an outsole defining a series of top ridges extending into a cavity toward a bottom surface of a midsole and a tufted casing containing particulate matter disposed on the top ridges of the outsole;

Figure 3:
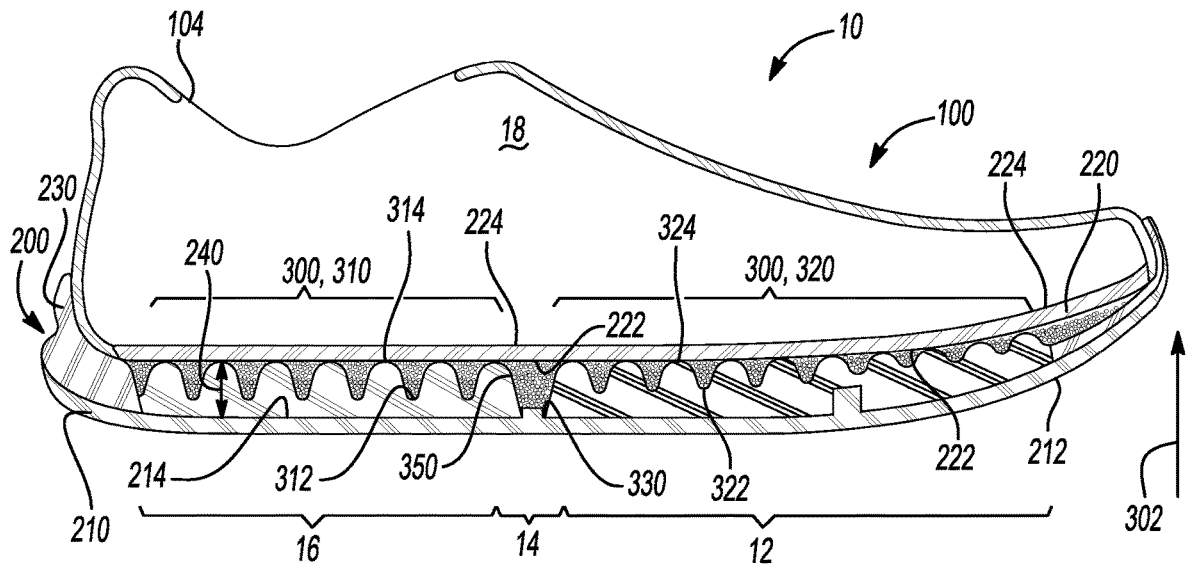
FIG. 3 is a cross-sectional view taken along line 3-3 of FIG. 1 showing projections extending from an inner surface of an outsole toward a bottom surface of a midsole and particulate matter disposed around a base of the projections at the inner surface.

FIG. 36 is a top perspective view of an article of footwear in accordance with principles of the present disclosure; and FIG. 37 is a partial cross-sectional view of FIG. 36 taken along line 37-37 showing a tufted casing containing particulate matter and a cushioning layer received within a cavity and located on top ridges defined by an inner surface of an outsole that extend into the cavity toward a bottom surface of a midsole.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

One aspect of the disclosure includes an article of footwear having an upper and an outsole attached to the upper. A ground-engaging surface and an inner surface are disposed on opposite sides of the outsole. A midsole of the article of footwear has a footbed and a bottom surface disposed on opposite sides of the midsole. The bottom surface of the midsole opposes the inner surface of the outsole to define a cavity therebetween. A quantity of particulate matter is disposed within the cavity. The article of footwear also includes a first series of projections and a second series of projections that each extend into the cavity from one of the inner surface and the bottom surface in a first direction toward the other one of the inner surface and the bottom surface. The first series of projections are spaced apart from the other of the inner surface and the bottom surface. The second series of projections have a different height than the first series of projections and are spaced apart from the other of the inner surface and the bottom surface.

In some examples, when the first and second series of projections extend into the cavity from the inner surface of the outsole, the quantity of particulate matter is disposed around a base of the first series of projections and around a base of the second series of projections. Either or both of the first series of projections and the second series of projections may include a cross-sectional area that decreases in the first direction.

In some implementations, the first series of projections and the second series of projections include a constantly tapered outer surface. The tapered outer surface may terminate at a rounded, distal end of each projection opposing the other of the inner surface and the bottom surface. The first series of projections may be disposed proximate to a heel portion of the outsole while the second series of projections may be disposed proximate to a forefoot portion of the outsole. Additionally, the first series of projections may extend farther from the one of the inner surface and the bottom surface than that of the second series of projections. The first series of projections and the second series of projections may optionally be spaced apart from one another by a void disposed proximate to a mid-foot portion of the outsole.

In some examples, the particulate matter disposed within the cavity includes foam beads having approximately the same size and shape or at least one of a different size and shape. In these examples, the foam beads may include a substantially spherical shape.

Another aspect of the disclosure includes an article of footwear having an upper and an outsole attached to the upper. A ground-engaging surface and an inner surface are disposed on opposite sides of the outsole. A midsole of the article of footwear has a footbed and a bottom surface disposed on opposite sides of the midsole. The inner surface of the outsole includes a first series of projections and second series of projections each extending in a direction toward the upper and each having a different height. The bottom surface of the midsole opposes the inner surface of the outsole to define a cavity therebetween. A quantity of particulate matter is disposed within the cavity. The bottom surface is additionally spaced apart from the first series of projections and the second series of projections.

In some implementations, a cross-sectional area of the first series of projections decreases in a direction that extends from the outsole toward the midsole. Additionally, a cross-sectional area of the second series of projections may decrease in a direction that extends from the outsole toward the midsole. In some examples, the first series of projections and the second series of projections include a constantly tapered outer surface. In these examples, the tapered outer surface may terminate at a rounded, distal end of each projection that opposes the bottom surface of the midsole. In some scenarios, the first series of projections are disposed proximate to a heel portion of the outsole, while the second series of projections are disposed proximate to a forefoot portion of the outsole. In these scenarios, the first series of projections may optionally extend farther from the inner surface of the outsole than the second series of projections. The first series of projections and the second series of projections may optionally be spaced apart from one another by a void disposed proximate to a mid-foot portion of the outsole.

In some examples, the particulate matter disposed within the cavity includes foam beads having approximately the same size and shape or at least one of a different size and shape. In these examples, the foam beads may include a substantially spherical shape.

In yet another aspect of the disclosure, an article of footwear includes an upper and a midsole having a footbed and a bottom surface disposed on an opposite side of the midsole than the footbed. The bottom surface of the midsole includes a first series of projections extending in a direction away from the upper. The bottom surface also includes a second series of projections extending away from the upper and having a different height than the first series of projections. The article of footwear also includes an outsole that is attached to the upper and includes a ground-engaging surface and an inner surface disposed on opposite sides of the outsole. The inner surface opposes the bottom surface of the midsole. The inner surface of the outsole and the bottom surface of the midsole cooperate to define a cavity therebetween. A quantity of particulate matter is disposed within the cavity and the inner surface of the outsole is spaced apart from the first series of projections and the second series of projections.

In some implementations, a cross-sectional area of the first series of projections decreases in a direction that extends from the midsole toward the outsole. Additionally, a cross-sectional area of the second series of projections may decrease in a direction that extends from the midsole toward the outsole. In some examples, the first series of projections and the second series of projections include a constantly tapered outer surface. In these examples, the tapered outer surface may terminate at a rounded, distal end of each projection that opposes the inner surface of the outsole. The first series of projections may optionally oppose a heel portion of the outsole, while the second series of projections may optionally oppose a forefoot portion of the outsole. In one configuration, the first series of projections extend farther from the bottom surface of the midsole than the second series of projections. In some scenarios, the first series of projections and the second series of projections may be spaced apart from one another by a void disposed proximate to a mid-foot portion of the outsole.

In some examples, the particulate matter disposed within the cavity includes foam beads having approximately the same size and shape or at least one of a different size and shape. In these examples, the foam beads may include a substantially spherical shape.

Another aspect of the disclosure provides a method of making an article of footwear. The method includes providing a cavity between a footbed and an outsole and providing one of the footbed and the outsole with a first series of projections that extend into the cavity in a first direction toward the other one of the footbed and the outsole. The first series of projections are spaced apart from the other of the footbed and the outsole. The method also includes providing the one of the footbed and the outsole with a second series of projections that extend into the cavity in the first direction toward the other one of the footbed and the outsole. The second series of projections are spaced apart from the other one of the footbed and the outsole. The second series of projections has a different height than the first series of projections. The method also includes providing the cavity with a quantity of particulate matter.

In some examples, the method includes providing the outsole with the first series of projections and the second series of projections. In these examples, the quantity of particulate matter is provided around a base of the first series of projections and around a base of the second series of projections.

In some implementations, the method includes providing the one of the footbed and the outsole with the first series of projections by providing the first series of projections with a cross-sectional area that decreases in a direction toward the other one of the footbed and the outsole. Optionally, the method includes providing the one of the footbed and the outsole with the first series of projections and the second series of projections by providing the first series of projections and the second series of projections with a constantly tapered outer surface. The method may also include providing the one of the footbed and the outsole with the first series of projections and the second series of projections by providing a void between the first series of projections and the second series of projections proximate to a mid-foot portion of the outsole.

In some examples, the method includes providing the one of the footbed and the outsole with the first series of projections and the second series of projections by providing the first series of projections proximate to a heel portion of the outsole and the second series of projections proximate to a forefoot portion of the outsole. In these examples, the method may also include extending the first series of projections farther from the one of the footbed and the outsole than the second series of projections.

In some examples, providing the cavity with particulate matter includes providing the cavity with foam beads. Providing the cavity with foam beads may include providing the cavity with a quantity of foam beads having a substantially spherical cross-section. Additionally or alternatively, providing the cavity with foam beads may include providing the cavity with a quantity of foam beads that include approximately the same size and shape or at least one of a different size and shape.

Referring to FIGS. 1-3, in some implementations, an article of footwear 10 includes an upper 100 and a sole structure 200 attached to the upper 100. The article of footwear 10 may be divided into one or more portions. The portions may include a forefoot portion 12, a mid-foot portion 14, and a heel portion 16. The forefoot portion 12 may correspond with toes and joints connecting metatarsal bones with phalanx bones of a foot. The mid-foot portion 14 may correspond with an arch area of the foot, and the heel portion 16 may correspond with rear portions of the foot, including a calcaneus bone. The footwear 10 may include lateral and medial sides 18, 20, respectively, corresponding with opposite sides of the footwear 10 and extending through the portions 12, 14, 16.

The upper 100 includes interior surfaces that define an interior void 102 that receives and secures a foot for support on the sole structure 200. An ankle opening 104 in the heel portion 16 may provide access to the interior void 102. For example, the ankle opening 104 may receive a foot to secure the foot within the void 102 and facilitate entry and removal of the foot from and to the interior void 102. In some examples, one or more fasteners 106 extend along the upper 100 to adjust a fit of the interior void 102 around the foot while concurrently accommodating entry and removal of the foot therefrom. The upper 100 may include apertures such as eyelets and/or other engagement features such as fabric or mesh loops that receive the fasteners 106. The fasteners 106 may include laces, straps, cords, hook-and-loop, or any other suitable type of fastener.

The upper 100 may additionally include a tongue portion 110 that extends between the interior void 102 and the fasteners 106. The upper 100 may be formed from one or more materials that are stitched or adhesively bonded together to form the interior void 102. Suitable materials of the upper may include, but are not limited, textiles, foam, leather, and synthetic leather. The materials may be selected and located to impart properties of durability, air-permeability, wear-resistance, flexibility, and comfort to the foot while disposed within the interior void 102.

In some implementations, the sole structure 200 includes an outsole 210 and a midsole 220 arranged in a layered configuration. The outsole 210 is generally positioned on a bottom surface of the article of footwear 10 to allow the outsole 210 to contact a ground surface during use. The midsole 220 is disposed between the upper 100 and the outsole 210 and provides a degree of cushioning to the foot during use of the article of footwear 10. In some examples, the sole structure 200 may also incorporate additional layers such as an insole or sockliner, which may reside within the interior void 102 of the upper 100 to receive a plantar surface of the foot to enhance the comfort of the footwear 10. In some examples, a sidewall 230 separates the outsole 210 and the midsole 220 to define a cavity 240 therebetween. In some implementations, projections 300 extend into the cavity 240 to provide cushioning for the foot as well as to control migration of particulate matter 350 residing in the cavity 240 during use of the footwear 10. The projections 300 and the particulate matter 350 disposed within the cavity 240 may cooperate to enhance functionality and cushioning characteristics that a conventional midsole provides. For example, one or more polymer foam materials, such as ethyl-vinyl-acetate or polyurethane, may form the projections 300 to provide resilient compressibility under an applied load to attenuate ground-reaction forces. The particulate matter 350 may include foam beads having a substantially spherical shape. In some examples, the particulate matter 350 includes foam beads that have approximately the same size and shape. In other examples, the particulate matter 350 includes foam beads having at least one of a different size and shape.

In some examples, the outsole 210 includes a ground-engaging surface 212 and an opposite interior surface 214. The outsole 210 may attach to the upper 100. In some examples, the sidewall 230 extends from the perimeter of the outsole 210 and attaches to the midsole 220 or the upper 100. The example of FIG. 1 shows the outsole 210 attaching to the upper 100 proximate to a tip of the forefoot portion 12. The outsole 210 is generally configured to provide abrasion-resistance and traction with the ground surface. The outsole 210 may be formed from one or more materials that impart durability and wear-resistance, as well as enhance traction with the ground surface. For example, rubber may form at least a portion of the outsole 210.

The midsole 220 may include a bottom surface 222 and a footbed 224 disposed on an opposite side of the midsole 220 than the bottom surface 222. Stitching 226 or adhesives may secure the midsole 220 to the upper 100. The footbed 224 may be contoured to conform to a profile of the bottom surface (e.g., plantar) of the foot. In some examples, an insole or sockliner may be disposed on the footbed 224 under the foot within at least a portion of the interior void 102 of the upper 100. The bottom surface 222 may oppose the inner surface 214 of the outsole 210 to define the cavity 240 therebetween.

The midsole 220 may be formed from a flexible material to allow the midsole 220 to conform to and react with the particulate matter 350 residing in the cavity 240. In so doing, the flexible midsole 220 may correspond to a flexible strobel that allows the particulate matter 350 residing in the cavity 240 to interact with the profile of the bottom surface of the foot during gradient loading of the sole structure 200. Providing the midsole 220 with the ability to flex during use of the article of footwear 10 allows the midsole 220 to conform to the surface profile of the bottom of the foot when compressed in response to a ground-reaction force which, in turn, allows the foot to experience a soft-type cushioning afforded by the compressibility of the particulate matter 350. In some examples, the sidewall 230 may define a perimeter of the cavity 240 as well as a depth of the cavity 240 based on a length of separation between the bottom surface 222 and the inner surface 214. One or more polymer foam materials may form the sidewall 230 to provide resilient compressibility under an applied load to attenuate ground-reaction forces.

FIG. 2 provides an exploded view of the article of footwear 10 showing the projections 300 extending in a direction from the inner surface 214 of the outsole 210 toward the bottom surface 222 of the midsole 220. In this implementation, the quantity of particulate matter 350 (e.g., foam beads) residing within the cavity 240 may be disposed around each of the projections 300 proximate to the inner surface 214 of the outsole 210. In some examples, the projections 300 are arranged in repeating rows and each projection 300 is equally spaced from adjacent projections 300. In other examples, the projections 300 are arranged in alternating repeating rows to restrict movement or migration of the particulate matter 300.

Referring to FIG. 3, a schematic cross-sectional view taken along line 3-3 of FIG. 1 shows the projections 300 extending in the direction from the inner surface 214 of the outsole 210 toward the bottom surface 222 of the midsole 220. In the example of FIG. 3, arrow 302 denotes the direction from the outsole 210 toward the midsole 220. In some implementations, the projections 300 include a first series of projections 310 and a second series of projections 320 each extending in the first direction from the inner surface 214 (outsole 210) toward the bottom surface 222 (midsole 222). The first series of projections 310 may be disposed proximate to the heel portion 16 of the outsole 210 while the second series of projections 320 may be disposed proximate to the forefoot portion 12 of the outsole 16. In some examples, the first series of projections 310 are separated from the second series of projections 320 by a void 330. The example of FIG. 3 shows the void 330 located at or proximate to the mid-foot portion 14 of the outsole 210 to separate the first series of projections 310 disposed proximate the heel portion 16 from the second series of projections 320 disposed proximate the forefoot portion 12. The first series of projections 310 may include a corresponding base 312 and a corresponding rounded, distal end 314. Likewise, the second series of projections 310 may include a corresponding base 322 and a corresponding rounded, distal end 324. The quantity of particulate matter 350 (e.g., foam beads) may be dispersed and disposed around the corresponding bases 312, 322 of the first and second series of projections 310, 320, respectively.

In some implementations, each projection of the first series of projections 310 includes a cross-sectional area that decreases as the projections 310 extend from the base 312 toward the rounded, distal end 314 (e.g., the cross-sectional area of the projections 310 decreases in the first direction). Additionally or alternatively, each projection of the second series of projections 320 may include a cross-sectional area that decreases as the projections 320 extend from the base 322 toward the rounded, distal end 324 (e.g., the cross-sectional area of the projections 320 decreases in the first direction). In some examples, the first and second series of projections 310, 320 include a constantly tapered outer surface extending between the bases 312, 322 and the distal ends 314, 324. In the example shown, the tapered outer surface of each projection 310, 320 terminates at its corresponding rounded, distal end 314, 324.

FIGS. 2 and 3 show the tapered outer surface of the projections 310, 320 defining valleys between adjacent projections 310, 320 for receiving, or otherwise, housing the particulate matter 350. The distal ends 314, 324 may oppose the bottom surface 222 of the midsole 220. The tapering and decreasing cross-sectional area of the projections 310, 320 may restrict migration or movement of the particulate matter 350 near the bases 312, 322 while permitting some movement or migration of the particulate matter 350 near the distal ends 314, 324. Conversely, the void 330 may restrict all migration of particulate matter 350 between the forefoot portion 12 and the heel portion 16 of the sole structure 200.

In addition to controlling migration of the particulate matter 350, the tapering and decreasing cross-sectional area of the projections 300 also controls compressibility of the projections 300. Controlling the compressibility of the projections 300 dictates the responsiveness of the cushioning at the corresponding forefoot and heel portions 12 and 16 (and/or the mid-foot portion 14). For example, smaller loads applied to the tip or distal ends 314, 324 of the projections 300 more easily compresses the projections 300 at the tips, as the cross-sectional area of the projections 300 at the tips is relatively small. The remainder of the projections 300 will only compress when a sufficient load is applied to each projection 300 to compress the wider, bases 312, 322 of the projections 300. Accordingly, the projections 300 provide a gradient cushioning affect that increases the degree of compressibility as the applied load increases. If the particulate matter 350 is only disposed proximate to the bases 312, 322 of the projections, the particulate matter 350 will only add to the cushioning affect when a sufficient load is applied to the projections 300 to compress the projections a predetermined amount (i.e., such that the projections 300 are compressed in a direction opposite to direction 302). Conversely, if a sufficient quantity of particulate matter 350 is disposed within the cavity 240 such that the particulate matter 350 extends between the distal ends 314, 324 and the bottom surface 222 of the midsole 220, any force that deflects the midsole 220 will cause compressibility of the particulate matter 350 within the cavity 240. Such forces may case the particulate matter 350 to migrate or otherwise move relative to and within the cavity 240 and, in so doing, transfer the applied load to the projections 300 at the distal ends 314, 324.

In some implementations, the projections 310, 320 extending from the outsole 210 (e.g., inner surface 214) are spaced apart from the midsole 220 (e.g., bottom surface 222). In other words, a gap may exist between the bottom surface 222 of the midsole 220 and the distal ends 314, 324 opposing the bottom surface 222. In these implementations, the projections 310, 320 are spaced from the midsole 220 when the sole structure 200 is not under an applied load and is at rest. Compressing the sole structure 200, however, may cause the bottom surface 222 of the midsole 220, in cooperation with the particulate matter 350, to translate toward the outsole 210 and into contact with one or more of the projections 310, 320. In other implementations, the projections 310, 320 are in contact with the bottom surface 222 of the midsole 220 even when the sole structure 200 is not under load. In other words, the distal ends 314, 324 oppose and contact the bottom surface 222 of the midsole 220. In some examples, a portion of either of the distal ends 314, 324 may contact the bottom surface 222 while the remaining portion of the distal ends 314, 324 may be spaced apart from the bottom surface 222 when the sole structure 200 is at rest. Compressibility by the projections 310, 320 may provide a responsive-type cushioning.

A distance between the inner surface 214 of the outsole 210 and the distal ends 314 defines a height of the first series of projections 310. Likewise, a distance between the inner surface 214 and the distal ends 324 defines a height of the second series of projections 320. Alternatively, the height of the projections 310, 320 may be obtained based on a distance between the distal ends 314, 324 and the corresponding bases 312, 322. In some examples, the height of the first series of projections 310 is different than the height of the second series of projections 320. For example, FIG. 3 shows the first series of projections 310 having a greater height (e.g., corresponding distal ends 314 extend farther from the inner surface 214) compared to the second series of projections 320. The height (and tapering) of the projections 300 effectuates the ability to disperse the particulate matter 350. For example, the heel portion 16 permits a greater quantity of particulate matter 350 to be disposed at the base 312 than in the forefoot portion 12 due to the first series of projections 310 extending further from the inner surface 214 (e.g., greater height) compared to the second series of projections 320. While the examples herein show the height being uniform for each of the first series of projections 310 and the corresponding height being uniform for each of the second series of projections 320, in some configurations, the heights of individual ones of either of the series of projections 310, 320 may vary.

The examples of FIGS. 1-3 show that the geometry (e.g., height, tapering, cross-sectional area) and the arrangement of the first and second projections 310, 320 extending into the cavity 240 effectuates the dispersion of particulate matter 350 and allows for cushioning from soft to responsive during gradient loading of the sole structure 200, such as during a walking or a running movement. For example, increasing the level of soft cushioning may be more desirable at the heel portion 16 due to an initial impact of a ground-reaction force occurring at the heel portion 16. Accordingly, a higher ratio of particulate matter 350 may reside at the heel portion 16 by extending the first series of projections 310 further from the inner surface 214. In this example, the quantity of particulate matter 350 may provide the level of soft-type cushioning during the initial impact of the ground-reaction force while compressibility of the projections 310, 320 may occur after the initial impact to provide responsive-type cushioning.

Referring to FIGS. 4-7, in some implementations, an article of footwear 10a includes an upper 100 and a sole structure 200a attached to the upper 100. In view of the substantial similarity in structure and function of the components associated with the article of footwear 10 with respect to the article of footwear 10a, like reference numerals are used hereinafter and in the drawings to identify like components while like reference numerals containing letter extensions are used to identify those components that have been modified. The sole structure 200a may include an outsole 210a and a midsole 220a arranged in the layered configuration and defining a cavity 240a therebetween. The outsole 210a includes an interior surface 214a disposed on an opposite side of the outsole 210a than the ground-engaging surface 212. The midsole 220a includes a bottom surface 222a disposed on an opposite side of the midsole 220a than the footbed 224. The bottom surface 222a opposes the inner surface 214a to define the cavity 240a therebetween. The sidewall 230 may separate the bottom surface 222a and the inner surface 214a to define a depth of the cavity 240a.

Figure 5:
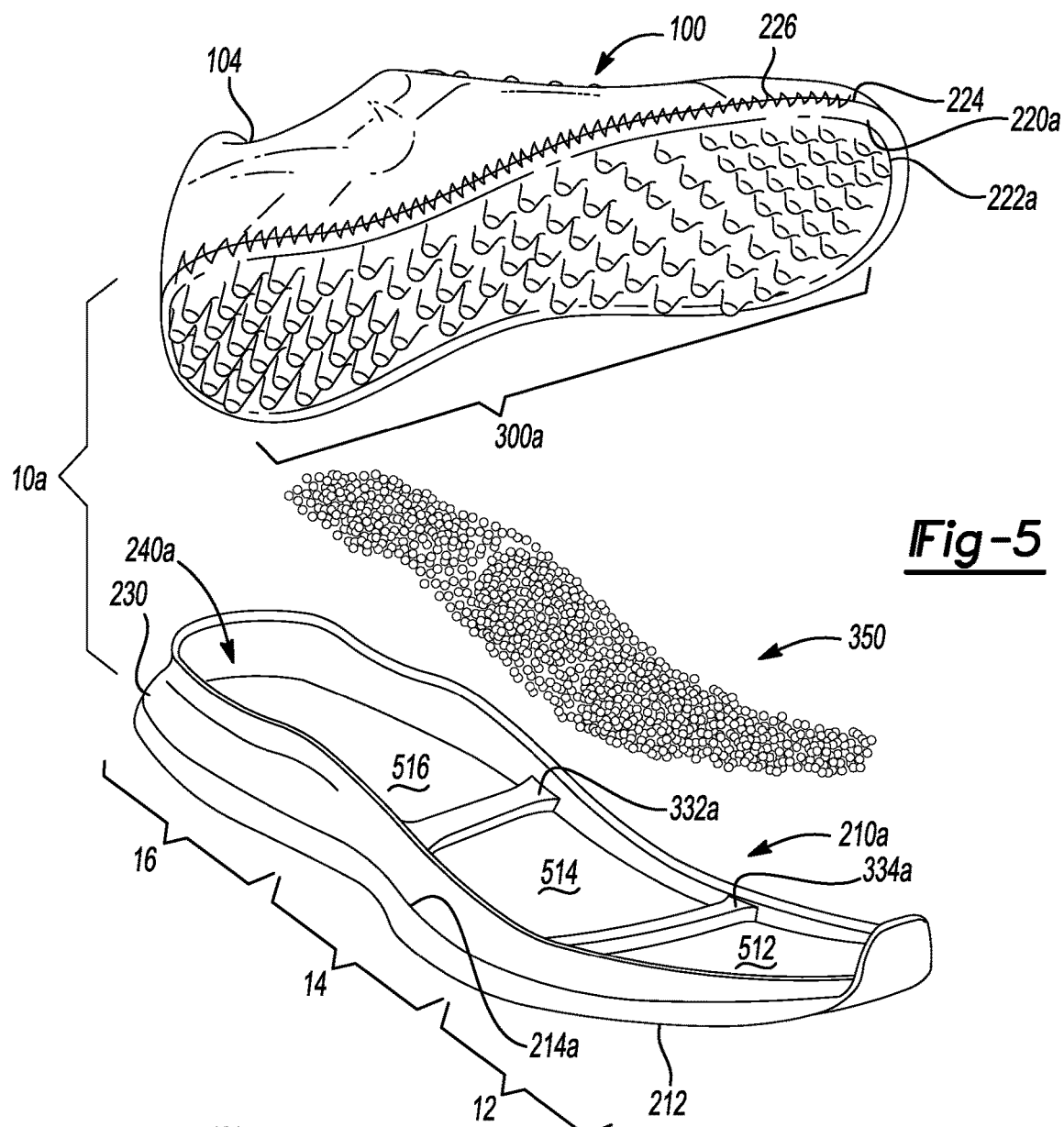
FIG. 5 is an exploded view of the article of footwear of FIG. 4 showing projections extending from a bottom surface of a midsole toward an inner surface of an outsole.

In some implementations, projections 300a extend into the cavity 240a to provide cushioning for the foot as well as to control migration of the particulate matter 350 residing in the cavity 240a during use of the footwear 10a. The projections 300a may be formed from the one or more polymer foam materials that form the projections 300 of FIGS. 1-3 to provide resilient compressibility under an applied load to attenuate ground-reaction forces. FIG. 5 provides an exploded view of the article of footwear 10a showing the projections 300a extending in a direction from the bottom surface 222a of the midsole 220a toward the inner surface 214a of the outsole 210a. In this implementation, the quantity of particulate matter 350 (e.g., foam beads) may be disposed and layered on the inner surface 214a of the outsole 210a to reside within the cavity 240a around each of the projections 300a that extend from the bottom surface 222a of the midsole 220a. In some examples, the projections 300a are arranged in repeating rows and each projection 300a is equally spaced apart from adjacent projections 300a. In other examples, the projections 300a are arranged in alternating repeating rows to restrict movement or migration of particulate matter 350. The midsole 220a may be formed from the flexible material forming the midsole 220 of FIGS. 1-3 to provide the midsole 220a with sufficient flexibility. Providing the midsole 220a with flexibility allows the particulate matter 350 residing in the cavity 240a around the projections 300a to provide the foot with cushioning when the midsole 220 and, thus, the projections 300a are deflected during loading of the sole structure 200a.

In some examples, one or more dividers 332a, 334a partially extend into the cavity 240 from the inner surface 214a of the outsole 210a. The dividers 332a, 334a extend between the lateral and medial sides 18, 20 and include ends terminating at the sidewall 230. The dividers 332a, 334a may cooperate with one or more of the projections 300a to restrict or manipulate migration of the particulate matter 350 between divided regions or portions of the cavity 240. In some examples, a first divider 332a is located proximate to the mid-foot portion 14 of the outsole 210a. Additionally or alternatively, in other examples, a second divider 334a is located proximate to the forefoot portion 12 of the outsole 210a. FIG. 5 shows a forefoot region 512 disposed to the right of the second divider 334a, a mid-foot region 514 extending between the first and second dividers 332a, 334a, and a heel region 516 disposed to the left of the first divider 332a.

Figure 4:
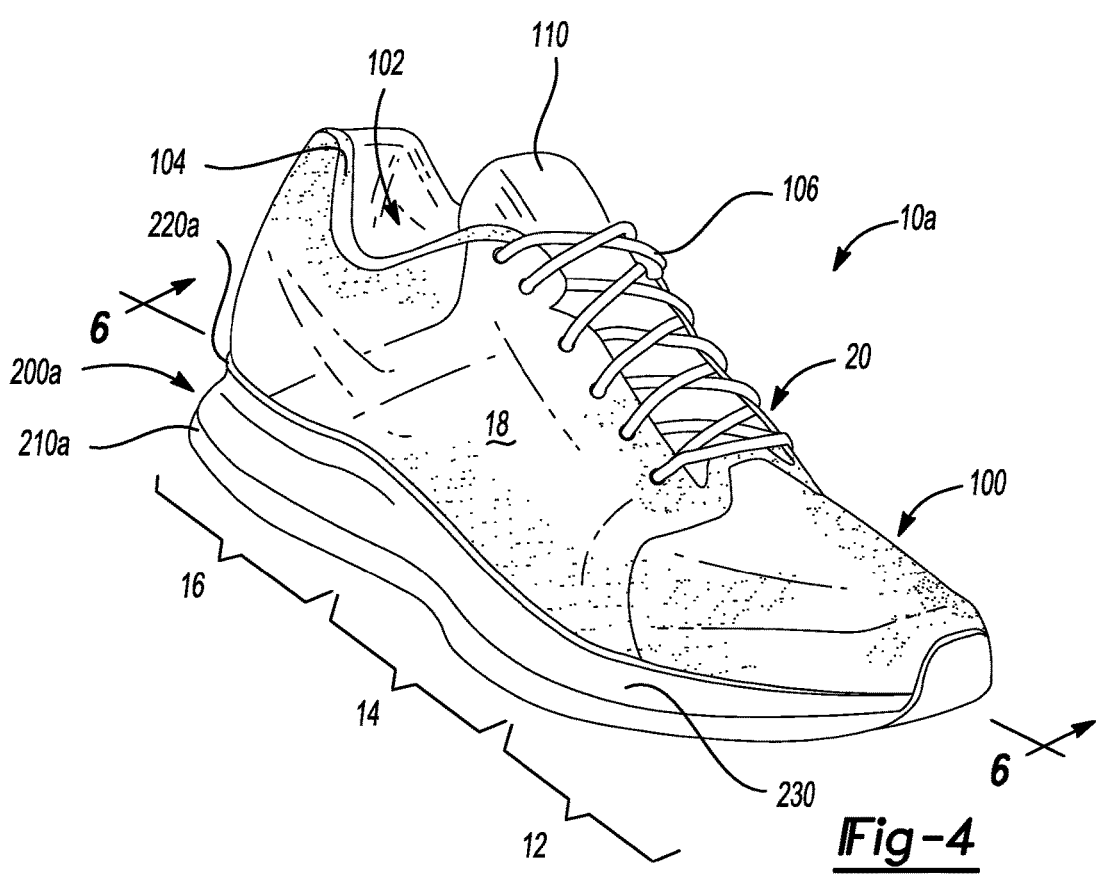
FIG. 4 is a top perspective view of an article of footwear in accordance with principles of the present disclosure.
Figure 6:
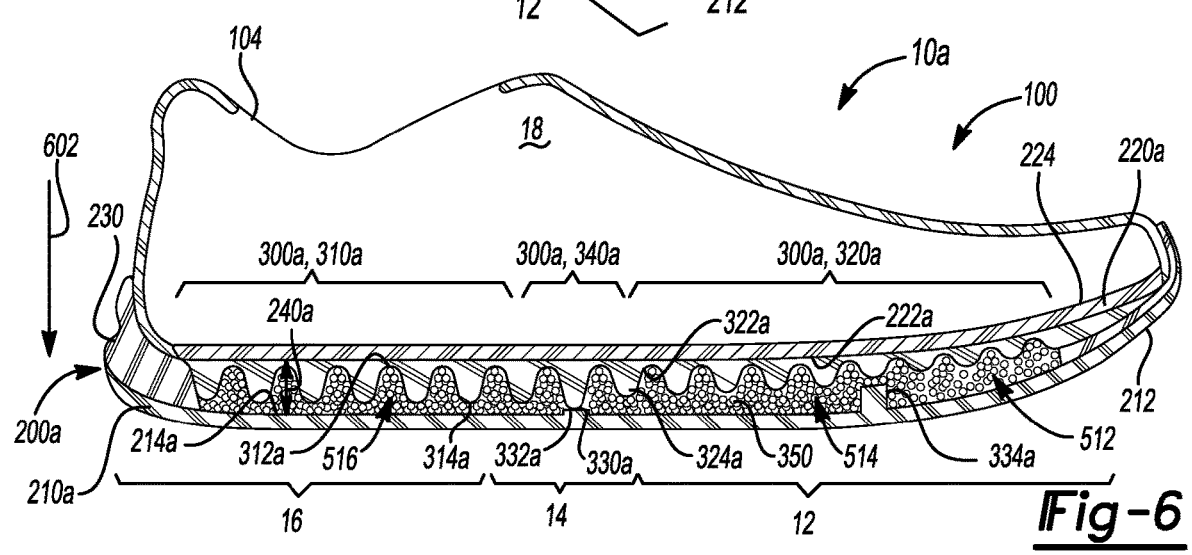
FIGS. 6 and 7 are cross-sectional views taken along line 6-6 of FIG. 4 each showing a first series of projections and a second series of projections extending from a bottom surface of a midsole toward an inner surface of an outsole and particulate matter disposed on the inner surface of the outsole.
Figure 7:
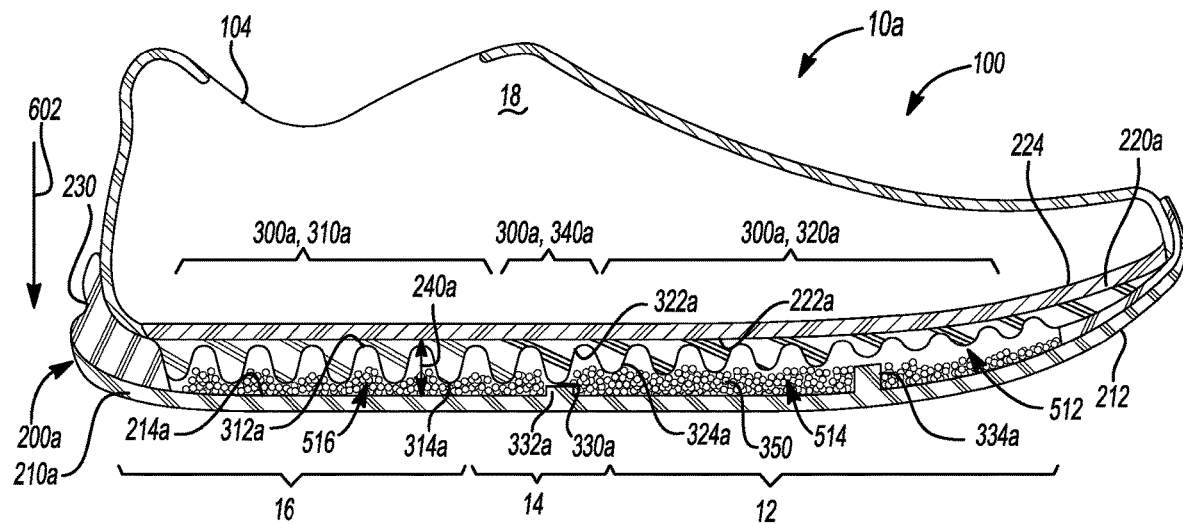

FIGS. 6 and 7 are cross-sectional views taken along line 6-6 of FIG. 4 and show the projections 300a extending in the direction from the bottom surface 222a of the midsole 220a toward the inner surface 214a of the outsole 210. In the examples of FIGS. 6 and 7, arrow 602 denotes the direction from the midsole 220a toward the outsole 210a. In some implementations, the projections 300a include a first series of projections 310a and a second series of projections 320a each extending in the direction of arrow 602. The first series of projections 310a may be disposed proximate to the heel portion 16 of the outsole 210a while the second series of projections 320a may be disposed proximate to the forefoot portion 12 of the outsole 210a.

In some examples, the first series of projections 310a are separated from the second series of projections 320a by a void 330a. As shown in FIG. 6, the first divider 332a extends from the inner surface 214a of the outsole 210a into the void 330a in an area of a third series of projections 340a. The third series of projections 340a are located proximate to the mid-foot portion 14 and extend in the direction from the bottom surface 222a toward the inner surface 214a. The third series of projections 340a may cooperate with the first divider 332a within the void 330a to restrict migration of the particulate matter 350 within the cavity 240a in a direction substantially parallel to a longitudinal axis of the article of footwear 10. Specifically, the third series of projections 340a are arranged between the lateral and medial sides 18, 20 in parallel with the first divider 332a and may contact the first divider 332a to substantially contain the particulate matter 350 in corresponding regions 514 or 516 (FIG. 6). Alternatively, a gap may separate the projections 340a and the first divider 332a to permit some migration of particulate matter 350 across the gap proximate to the divider 332a (FIG. 7) between the mid-foot region 514 and the heel region 516. Similarly, FIGS. 6 and 7 both show a gap existing between the second divider 334a and the second series of projections 320a, thereby permitting some migration of particulate matter 350 between the forefoot region 512 and the mid-foot region 514 of the sole structure 200a.

Similar to the projections 300 in the example of FIG. 3, the first series of projections 310a may include a corresponding base 312a and a corresponding rounded, distal end 314a. Likewise, the second series of projections 320a may include a corresponding base 322a and a corresponding rounded, distal end 324a. In some implementations, the first series of projections 310a includes a cross-sectional area that decreases as the projections 310a extend from the base 312a toward the rounded, distal end 314a (e.g., the cross-sectional area of the projections 310a decreases in the direction of arrow 602). Additionally or alternatively, each projection of the second series of projections 320a may include a cross-sectional area that decreases as the projections 320a extend from the base 322a toward the rounded, distal end 324a (e.g., the cross-sectional area of the projections 320a decreases in the direction of arrow 602). In some examples, the first and second series of projections 310a, 320a include a constantly tapered outer surface extending between the bases 312a, 322a and the distal ends 314a, 324a. The examples of FIGS. 6 and 7 show the tapered outer surface of each projection 310a, 320a terminating at its corresponding rounded, distal end 314a, 324a. The distal ends 314a, 324a may oppose the inner surface 214a of the outsole 210a. The tapered and decreasing cross-sectional area of the projections 310a, 320a may restrict migration or movement of the particulate matter 350 near the bases 312a, 322a while permitting some movement or migration of the particulate matter 350 through the cavity 240 near the distal ends 314a, 324a. The void 330a, however, may restrict all migration of particulate matter 350 between the forefoot portion 12 and the heel portion 16 of the sole structure 200a if the third projections 340a contact the first divider 332a, which essentially forms a wall that extends across the article of footwear 10 between the lateral side 18 and the medial side 20. This wall may be formed by providing the third projections 340a with a sufficient width such that adjacent projections 340a are in contact with one another in a direction extending substantially perpendicular to a longitudinal axis of the article of footwear 10, thereby creating a continuous wall that extends between the lateral side 18 and the medial side 20.

In addition to controlling migration of the particulate matter 350, the tapered and decreasing cross-sectional area may also control compressibility of the projections 300a to dictate how soft and how responsive the cushioning is at the corresponding forefoot and heel portions 12 and 16 (and/or the mid-foot portion 14). The tapered, outer surface of the projections 310a, 320a defines valleys between adjacent projections 310a, 320a for receiving, or otherwise, housing the particulate matter 350. For example, and with reference to FIG. 6, the quantity of particulate matter 350 fills the valleys of the cavity 240 between the projections 310a, 320a and the inner surface 214a. In these examples, the distal ends 314a, 324a, the bases 312, 322, and the inner surface 214a cooperate to compress the particulate matter 350 to attenuate a ground-reaction force under gradient loading of the sole structure 200a.

In other examples, and with reference to FIG. 7, a smaller quantity of particulate matter 350 is dispersed within the cavity 240a than in the example of FIG. 6, thereby resulting in no particulate matter 350 within portions of the valleys proximate to the corresponding bases 322a, 324a. In these examples, the particulate matter 350 compresses in response to a ground-reaction force by the distal ends 314a, 324a cooperating with the interior surface 214a. As the particulate matter 350 compresses, the partially empty valleys between adjacent projections 310a, 320a permit the particulate matter 350 to shift and occupy previously un-occupied space within the cavity 240a.

The projections 310a, 320a extending from the midsole 220a (e.g., bottom surface 222a) may be separated from the outsole 210a (e.g., inner surface 214a). For example, a gap may exist between the inner surface 214a of the outsole 210a and the distal ends 314a, 324a that oppose the inner surface 214a when the sole structure 200a is not under an applied load. However, one or more of the distal ends 314a, 324a may contact the inner surface 214a as corresponding projections 310a, 310b translate in unison with the midsole 220a as the particulate matter 350 compresses under gradient loading. Here, the projections 310a, 320a may compress while contacting the inner surface 214a during gradient loading of the sole structure 200a. As discussed above, compressibility by the particulate matter 350 may provide a soft-type cushioning while compressibility by the projections 300a may provide a responsive-type cushioning. Accordingly, the projections 300a and the particulate matter 350 may cooperate to provide gradient cushioning to the article of footwear 10 that changes as the applied load changes (i.e., the greater the load, the more the projections 300a are compressed and, thus, the more responsive the footwear 10 performs). In some configurations, the midsole 220a, or a portion thereof, may be removed to provide direct contact between the bottom surface of the foot and the base 312a of the first series of projections 310a and/or the base 322a of the second series of projections 320a. In these configurations, a flat surface of at least one of the bases 312a, 322a opposite the distal ends 314a, 324a and opposing the bottom surface of the foot may correspond to a flexible strobe that allows the particulate matter 350 residing in the cavity 240a to provide the foot with cushioning during gradient loading of the sole structure 200a as the projections 310a and/or 320a move toward the particulate matter 350.

The distance between the bottom surface 222a of the midsole 220a and the distal ends 314a defines a height of the first series of projections 310a and the distance between the bottom surface 222a of the midsole 220a and the distal ends 324a defines a height of the second series of projections 320a. Alternatively, the height of the projections 310a, 320a may be obtained based on a distance between the distal ends 314a, 324a and the corresponding bases 312a, 322a. In some examples, the height of the first series of projections 310a is different than the height of the second series of projections 320a. For example, FIGS. 6 and 7 show the first series of projections 310a having a greater height (e.g., corresponding distal ends 314a extend farther from the bottom surface 222a) compared to the second series of projections 320a. The height (and tapering) of the projections 300a effectuates the quantity of the particulate matter 350 permitted to reside within the cavity 240a. For example, the heel portion 16 permits a greater quantity of particulate matter 350 than in the forefoot portion 12 due to the first series of projections 310a extending further from the bottom surface 222a (e.g., greater height) compared to the second series of projections 320a. While the examples herein show the height being uniform for each of the first series of projections 310a and the corresponding height being uniform for each of the second series of projections 320a, in some scenarios, the heights of the projections 300a may vary among individual projections of either one of the first and second series of projections 310a, 320a.

The examples of FIGS. 4-7 show that the geometry (e.g., height, tapering, cross-sectional area) and the arrangement of the first and second projections 310a, 320a extending into the cavity 240a effectuate the dispersion of particulate matter 350 and allow for cushioning from soft to responsive during gradient loading of the sole structure 200a, such as during a walking or a running movement. For example, increasing the level of soft-type cushioning may be more desirable at the heel portion 16 than at the forefoot portion 12 due to an initial impact of a ground-reaction force occurring at the heel portion 16. Accordingly, a greater quantity of particulate matter 350 may reside at the heel portion 16 by extending the first series of projections 310a further from the bottom surface 222a. In this example, the quantity of particulate matter 350 may provide the level of soft-type cushioning during the initial impact of the ground-reaction force while compressibility of the projections 310a, 320a may occur after the initial impact to provide the level of responsive-type cushioning. Moreover, the quantity of particulate matter 350 residing in the cavity 240a may vary to increase or decrease the level of soft-type cushioning when the footwear 10a is worn.

The quantity of particulate matter 350 may be expressed as a ratio of particulate matter 350 to un-occupied space in the cavity 240a. For example, by filling all valleys of the cavity 240a between the projections 310a, 320a and the interior surface 214a of the outsole 210a with particulate matter 350 (FIG. 6), the level of soft-type cushioning increases to attenuate a ground-reaction force under loading of the sole structure 200a while the shifting of the particulate matter 350 is also limited due to the lack of un-occupied space. In contrast, by dispersing a lower quantity of particulate matter 350 within the cavity 240a, to provide a lower ratio of the particulate matter 350 to un-occupied space (FIG. 7), the level of soft-type cushioning decreases during gradient loading while the particulate matter 350 is also permitted to shift into and occupy the previously un-occupied space within the cavity 240a as the particulate matter 350 and the projections 310a, 320a compress. The ability for the particulate matter 350 to shift to previously un-occupied space in the cavity 240a may dynamically provide soft-type cushioning to various regions or portions of the sole structure 200a based on the magnitude of the ground-reaction force and a direction at which the ground-reaction force is applied.

Referring to FIGS. 8-11, in some implementations, an article of footwear 10b includes an upper 100 and a sole structure 200b attached to the upper 100. In view of the substantial similarity in structure and function of the components associated with the article of footwear 10 with respect to the article of footwear 10b, like reference numerals are used hereinafter and in the drawings to identify like components while like reference numerals containing letter extensions are used to identify those components that have been modified. The sole structure 200b may include an outsole 210b and a midsole 220b arranged in the layered configuration and defining a cavity 240b therebetween. The outsole 210b includes an inner surface 214b disposed on an opposite side of the outsole 210b than the ground-engaging surface 212. The midsole 220b includes a bottom surface 222b disposed on an opposite side of the midsole 220b than a footbed 224b. The sole structure 200b may further include an insole 228 (FIGS. 10 and 11) disposed on the footbed 224b under the foot within at least a portion of the interior void 102 of the upper 100. The bottom surface 222b opposes the inner surface 214b to define the cavity 240b and the sidewall 230 may separate the bottom surface 222b and the inner surface 214b to define a depth of the cavity 240b.

In some implementations, projections 300b extend into the cavity 240b to provide cushioning for the foot as well as to control migration of the particulate matter 350 residing in the cavity 240b during use of the footwear 10b. The projections 300b may be formed from the one or more polymer foam materials that form the projections 300, 300a of FIGS. 1-7 to provide resilient compressibility under an applied load to attenuate ground-reaction forces. FIG. 9 provides an exploded view of the article of footwear 10b showing the projections 300b extending in a direction from the inner surface 214b of the outsole 210b toward the bottom surface 222b of the midsole 220b and arranged in a pattern across the inner surface 214b to define multiple honeycomb-shaped compartments 902.

In some examples, a divider 334b may extend partially into the cavity 240b from the inner surface 214a of the outsole 210. The divider 334b may restrict or manipulate migration of the particulate matter 350 between specified regions or portions within the cavity 240b of the sole structure 200b. For example, a forefoot region 912 is located to the right of the divider 334b relative to the view shown in FIG. 10 while the projections 300b are located to the left of the divider 334b relative to the view shown in FIG. 10. The examples of FIGS. 9-11 show the divider 334b as being located proximate to the forefoot portion 12 of the outsole 210. While the divider 334b is shown as being located proximate to the forefoot portion 12, one or more other dividers may additionally or alternatively be located proximate to the mid-foot portion 14 and/or the heel portion 16 of the outsole 210b.

The projections 300b defining the honeycomb-shaped compartments 902 may receive a portion of the quantity of particulate matter 350 (e.g., foam beads) at the mid-foot and heel portions 14, 16 of the sole structure 200b (e.g., to the left of the divider 334b). Likewise, a remaining portion of the quantity of particulate matter 350 may be disposed and layered on the inner surface 214b to reside within the cavity 240b at the forefoot region 912 of the sole structure 200b (e.g., to the right of the divider 334b relative to the view shown in FIG. 10). Accordingly, the projections 300b and the particulate matter 350 may cooperate to provide a combination of soft- and response-type cushioning at the mid-foot and heel portions 14, 16 while the particulate matter 350 provides soft-type cushioning in the forefoot region 912 at the forefoot portion 12 during gradient loading of the sole structure 200b. The midsole 220b may be formed from the flexible material forming the midsole 220 of FIGS. 1-3 to provide the midsole 220b with sufficient flexibility, thereby allowing the particulate matter 350 received within the honeycomb-shaped compartments 902 to interact with the profile of the bottom surface of the foot during gradient loading of the sole structure 200b.

Figure 8:
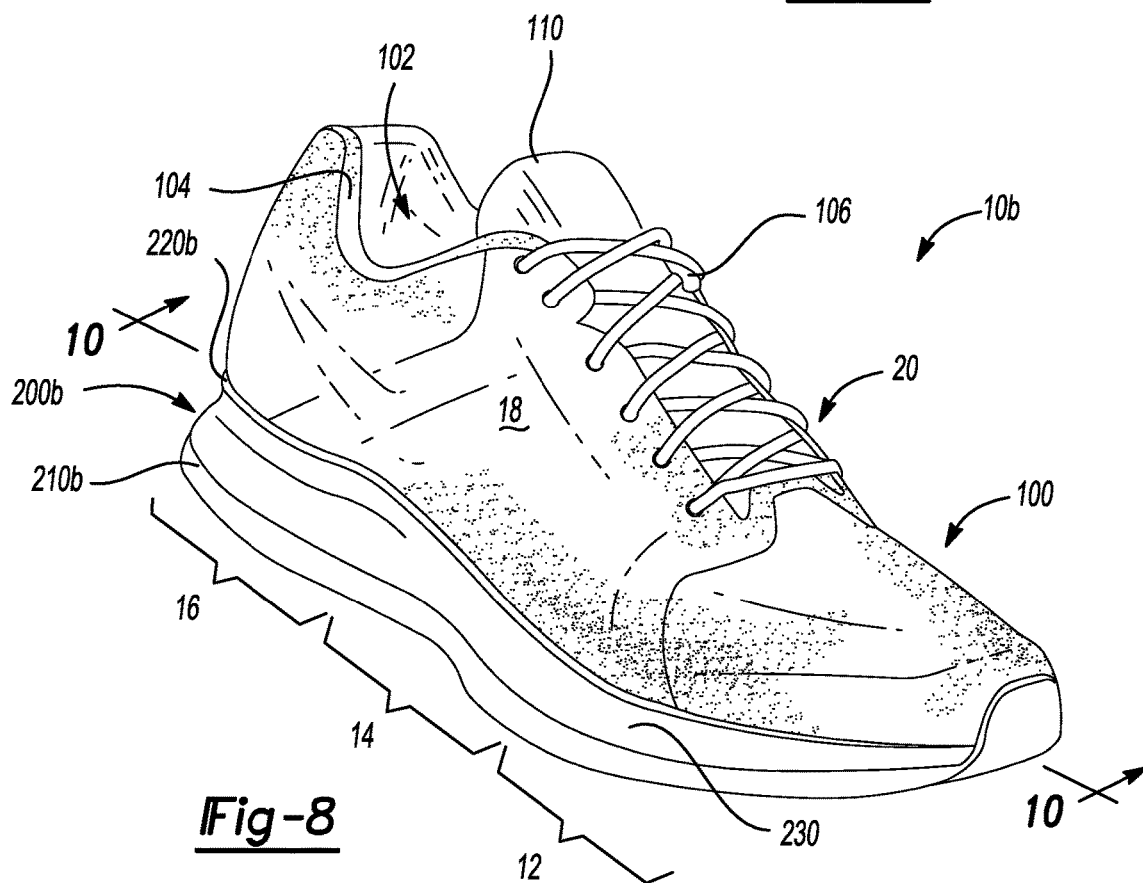
FIG. 8 is a top perspective view of an article of footwear in accordance with principles of the present disclosure.

FIGS. 10 and 11 are cross-sectional views taken along line 10-10 of FIG. 8 showing the projections 300b extending in the direction from the inner surface 214a of the outsole 210b toward the bottom surface 222a of the midsole 220b. In some examples, the projections 300b may extend from a projection base 900 opposing and contacting the inner surface 214b of the outsole 210b. In the examples of FIGS. 9 and 10, arrow 302 denotes the direction from the outsole 210b toward the midsole 220b. In some examples, the size and volume of one or more of the honeycomb-shaped compartments 902 is different to provide different levels of cushioning from soft to responsive. In some examples, the projections 300b and the projection base 900 are part of a single component disposed within the cavity 240b located on the inner surface 214b. In implementations omitting the projection base 900, the projections 300b may be part of a single component 240b disposed on the inner surface 214b. In other examples, the projections 300b are integrally formed with the outsole 210b and extend from the inner surface 214b.

Referring to FIG. 10, the projections 300b are shown as extending in the direction of the arrow 302 from the projection base 900 (or the inner surface 214b if the base 900 is omitted) toward the bottom surface 222b and as terminating at a point of contact with the bottom surface 222b. The quantity of particulate matter 350 resides between the inner surface 214b and the bottom surface 222b at the forefoot portion 12 and within the honeycomb-shaped compartments 902 defined by the projections 300b in the mid-foot at heel portions 14, 16 of the sole structure 200b. In the example of FIG. 10, each compartment 902 restricts the particulate matter 350 residing therein from migrating or shifting to adjacent compartments 902. In some scenarios, under gradient loading of the sole structure 200b, the projections 300b compress to provide response-type cushioning and the particulate matter 350 compresses to provide soft-type cushioning to attenuate ground-reaction forces.

In other examples, referring to FIG. 11, the projections 300b extend in the direction of the arrow 302 from the projection base 900 (or the inner surface 214b if the base 900 is omitted) toward the bottom surface 222b and terminate at corresponding distal ends 314b without contacting the bottom surface 222b of the midsole 220b when the sole structure 200b is at rest. Thus, a gap separates the distal ends 314b and the bottom surface 222b of the midsole 220b. While the particulate matter 350 resides in the cavity 240b at the forefoot, mid-foot, and heel portions 12, 14, 16, respectively, when the sole structure 200b is at rest and not under load, the particulate matter 350 residing in the honeycomb-shaped compartments 902 may migrate over the distal ends 314b via the gaps to adjacent compartments when the sole structure 200b is under load. In other words, under gradient loading of the sole structure 200b, the particulate matter 350 initially compresses between the bottom surface 222b, the inner surface 214b, and the projections 300b to provide an initial soft-type cushioning to attenuate ground-reaction forces. Thereafter, the compressing particulate matter 350 causes the midsole 220b to translate in a direction opposite the arrow 302 toward the inner surface 214b and into contact with the distal ends 314b of the projections 300b. As the midsole translates 220b, but before the bottom surface 222b contacts the distal ends 314b, the portion of the particulate matter 350 residing within one or more of the compartments 902 may migrate to adjacent compartments 902 based on a magnitude and direction of the ground-reaction force.

Compressing the projections 300b by the translating the midsole 220b provides responsive-type cushioning after the initial soft-type cushioning provided by the particulate matter 350 to further attenuate ground-reaction forces. Migration of the particulate matter 350 between the honeycomb-shaped compartments 902 effectuates how the soft-type and responsive-type cushioning is distributed during gradient-loading. The divider 334b, however, restricts migration of particulate matter 350 into and out of the forefoot region 912 that resides below the divider 334b. Moreover, the magnitude and direction of the ground-reaction force applied to the sole structure 200b may dictate how and if the particulate matter 350 will migrate over the distal ends 314b of the projections 300b via the gaps. In some configurations, the midsole 220b, or a portion thereof, may be removed to provide direct contact between the insole 228 supporting the bottom surface of the foot and the particulate matter 350 residing in the cavity 240b. In these configurations, the insole 228 may correspond to a flexible stroble that allows the particulate matter 350 residing in the cavity 240b to conform to the bottom surface of the foot during gradient loading of the sole structure 200b.

Figure 12:
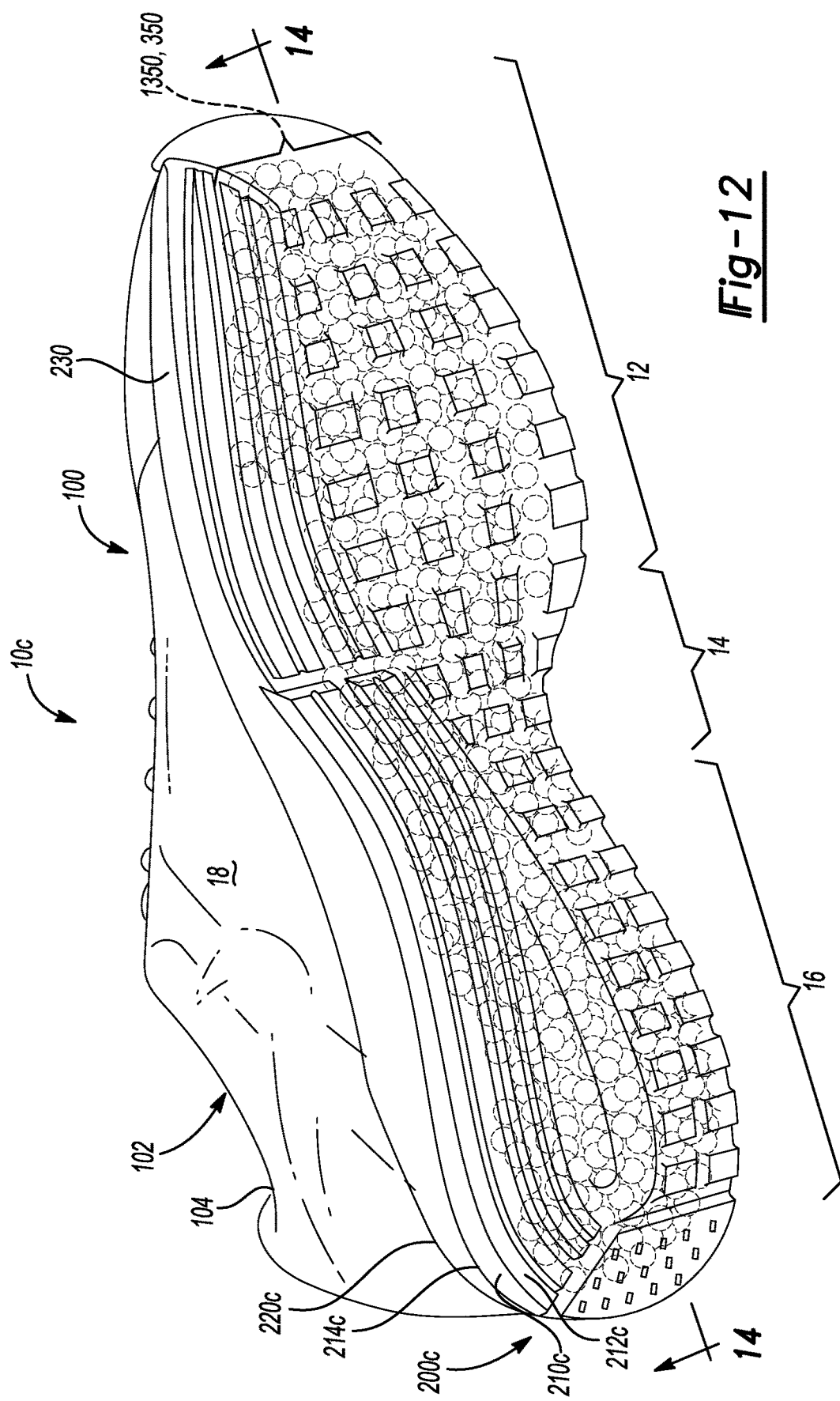
FIG. 12 is a bottom perspective view of an article of footwear in accordance with principles of the present disclosure.

Referring to FIGS. 12-15, in some implementations, an article of footwear 10c includes an upper 100 and a sole structure 200c attached to the upper 100. FIG. 12 shows a bottom perspective view of the footwear 10c. In view of the substantial similarity in structure and function of the components associated with the article of footwear 10 with respect to the article of footwear 10c, like reference numerals are used hereinafter and in the drawings to identify like components while like reference numerals containing letter extensions are used to identify those components that have been modified. The sole structure 200c may include an outsole 210c and a midsole 220c arranged in the layered configuration and defining a cavity 240c therebetween. The outsole 210c includes an inner surface 214c disposed on an opposite side of the outsole 210c than a ground-engaging surface 212c. The midsole 220c includes a bottom surface 222c disposed on an opposite side of the midsole 220c than the footbed 224b. The sole structure 200c may further include an insole 228 (FIGS. 14 and 15) disposed on the footbed 224b under the foot within at least a portion of the interior void 102 of the upper 100. The bottom surface 222c opposes the inner surface 214c to define the cavity 240c and the sidewall 230 may separate the bottom surface 222c and the inner surface 214c to define a depth of the cavity 240c.

Figure 13:
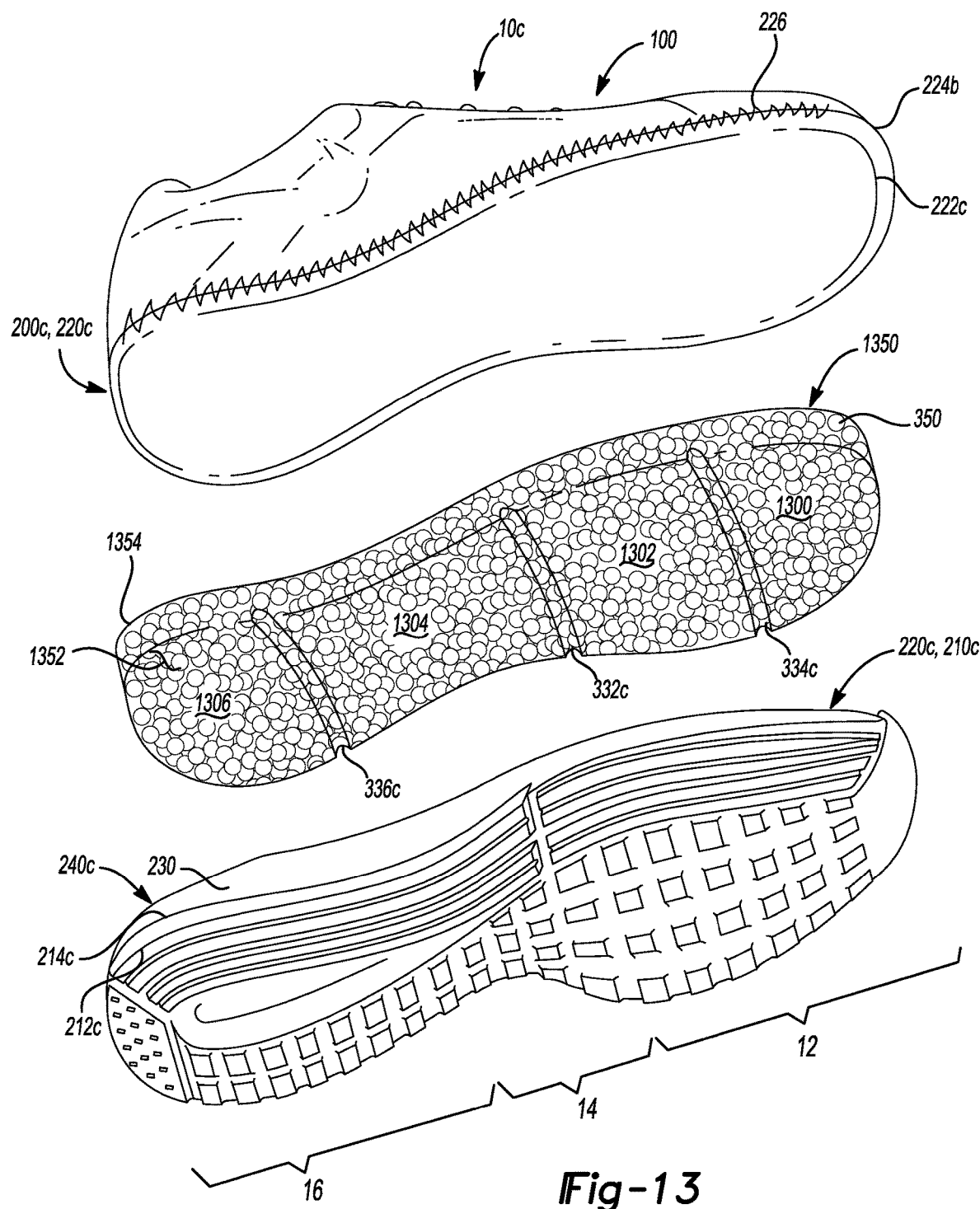
FIG. 13 is an exploded view of the article of footwear of FIG. 12 showing particulate matter residing within a casing disposed between an outsole and a midsole of a sole structure.

In some implementations, the particulate matter 350 is received within a casing 1350 and the cavity 240c receives the casing 1350. In some configurations, the casing 1350 is flexible and may be transparent or opaque. FIG. 13 is an exploded view of the article of footwear 12c showing the particulate matter 350 residing within the transparent casing 1350. The casing 1350 includes a bottom surface 1352 and a top surface 1354 that define a volume for receiving and storing a quantity of the particulate matter 350. The casing 1350 may be disposed on the inner surface 214c of the outsole 210c, while the perimeter of the casing 1350 may be enclosed by the sidewall 230. That is, the bottom surface 1352 opposes and rests on the inner surface 214c and the top surface 1354 opposes the bottom surface 222c of the midsole 220c while the sidewall 230 encloses the casing 1350. In some examples, the depth of the casing 1350 extending from the inner surface 214c toward the midsole 220c is less than a depth of the cavity 240c defined by the sidewall 230 separating the outsole 210c and the midsole 220c. The volume of the casing 1350 may be substantially filled with layers of the particulate matter 350, thereby resulting in the casing 1350 being substantially firm. The midsole 220c may be formed from the flexible material forming the midsole 220 of FIGS. 1-3 to provide the midsole 220c with sufficient flexibility, thereby allowing the particulate matter 350 received within the casing 1350 and residing in the cavity 240c to interact with the profile of the bottom surface of the foot during gradient loading of the sole structure 200c.

In some examples, the casing 1350 has one or more dividers 332c, 334c, 336c extending between the lateral and medial sides 18, 20 and also from the bottom surface 1352 toward the top surface 1354 of the casing 1350. The dividers 332c-336c may also be referred to as projections. One divider 332c may be located proximate to the mid-foot portion 14 of the sole structure 200c, another divider 334c may be located proximate to the forefoot portion 12 of the sole structure 200c, and another divider 336c may be located proximate to the heel portion 16 of the sole structure 200c. In some configurations, a toe region 1300 of the casing 1350 is formed to the right of the divider 334c relative to the view shown in FIG. 14, a forefoot region 1302 is formed between the dividers 332c and 334c, a mid-foot region 1304 is formed between the dividers 332c and 336c, and a heel region 1306 is formed to the left of the divider 336c relative to the view shown in FIG. 14. The dividers 332c, 334c, 336c may restrict or manipulate migration of the particulate matter 350 between the adjoining regions 1300-1306. Moreover, different quantities of particulate matter 350 may reside within the corresponding regions 1300-1306 to provide a desired level of soft-type cushioning as well as to assist in facilitating migration of particulate matter 350 between prescribed adjoining regions during gradient loading of the sole structure 200c.

FIGS. 14 and 15 are cross-sectional views taken along line 14-14 of FIG. 12 showing the casing 1350 filled with the particulate matter 350 and residing within the cavity 240c between the midsole 220c and the outsole 210c. More specifically, FIGS. 14 and 15 show the ground-engaging surface 212c of the outsole 210c engaging a ground surface 2 when the sole structure 200c is not under load (FIG. 14) and when the sole structure 200c is under load (FIG. 15). The examples show the bottom surface 1352 of the casing 1350 protruding toward the top surface 1354 at corresponding locations to form the dividers 332c-336c extending toward the top surface 1354. In some examples, the dividers 332c-336c terminate within the casing 1350 and gaps separate the top surface 1354 and the dividers 332c-336c. These gaps allow some particulate matter 350 to migrate between adjoining regions 1300-1306 of the casing 1350 during use of the article of footwear 10. Conversely, other configurations may include one or more of the dividers 332c-336c terminating at a corresponding point of contact with the top surface 1354 to prevent any migration between adjoining regions 1300-1306 separated by dividers 332c-336c in contact with the top surface 1354.

In some implementations, the outsole 210c defines a series of grooves 442, 444, 446 extending between the lateral and medial sides 18, 20 and also extending in a direction toward the midsole 220c. Each groove 442, 444, 446 bends and curves in the direction toward the midsole 220c and is contoured to correspond to respective ones of the dividers 332c, 334c, 336c. In some examples, the grooves 442-444 are flexible to form corresponding flexion regions that enhance the ability of the outsole 210c to flex, bend, or otherwise deform, when the sole structure 200c is under load, such as during walking, running or jumping. For example, FIG. 15 shows the groove 442 flexing to bend the mid-foot and heel portions 14, 16 of the sole structure 200c about the groove 442 and off of the ground surface 2 when a load is applied to the sole structure 200c, such as during a walking or running stride. In this example, particulate matter 350 residing in the mid-foot region 1304 above the divider 332c may shift or migrate into the forefoot region 1302 and/or particulate matter 350 residing in the heel region 1304 above divider 336c may shift or migrate into the mid-foot region 1304. In addition to soft-type cushioning provided by compressing the particulate matter 350, the casing 1350 may include rigidity characteristics to provide responsive-type cushioning when the sole structure 200c compresses. In some configurations, the midsole 220c and the insole 228, or portions thereof, may be removed to provide direct contact between the bottom surface of the foot and the top surface 1354 of the casing 1350. In these configurations, the top surface 1354 of the casing 1350 may correspond to a flexible strobel that allows the particulate matter 350 residing in the cavity 240c to conform to the bottom surface of the foot during gradient loading of the sole structure 200c.

Figure 16:
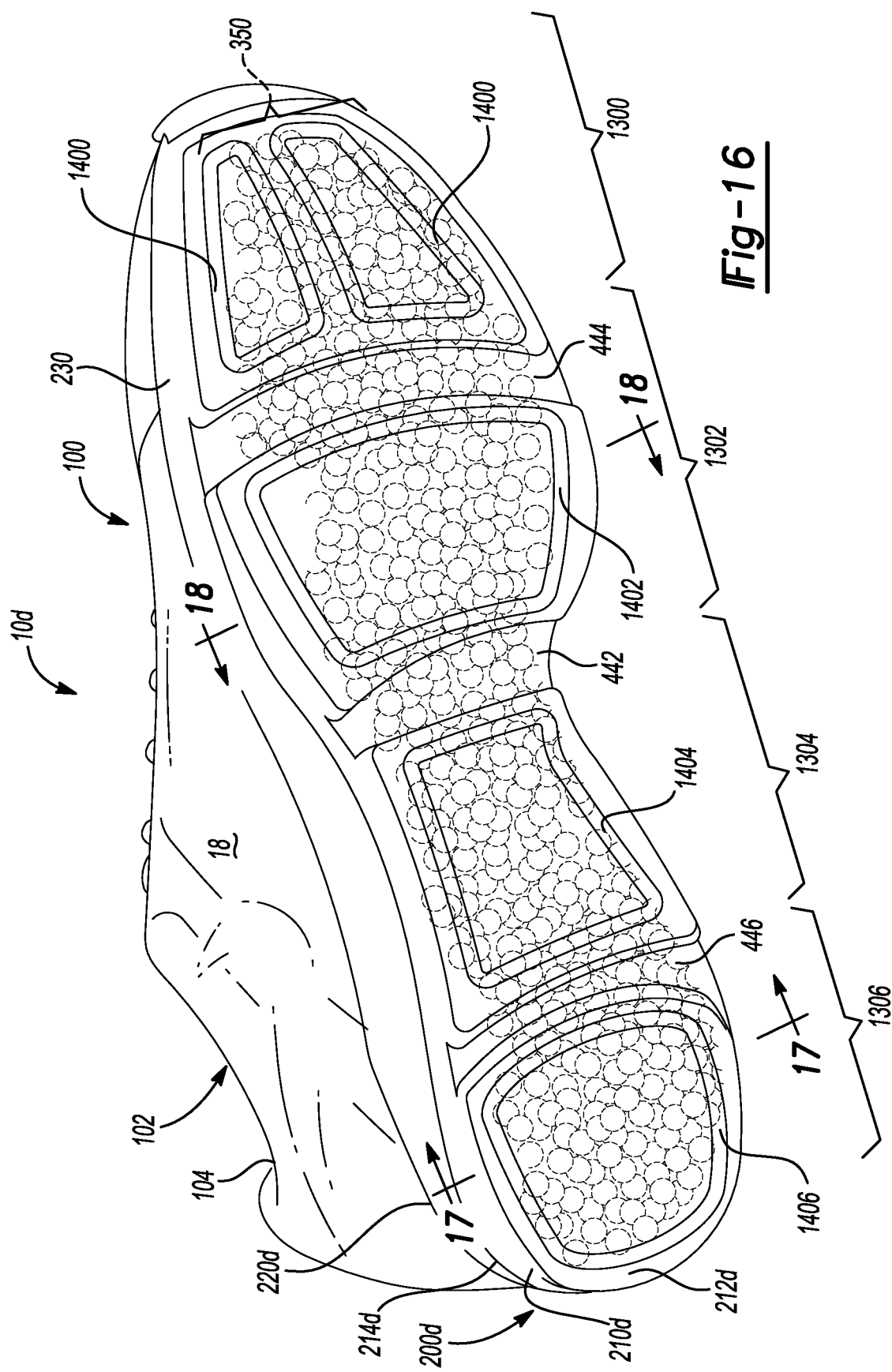
FIG. 16 is a bottom perspective view of an article of footwear in accordance with principles of the present disclosure.
Figure 17:
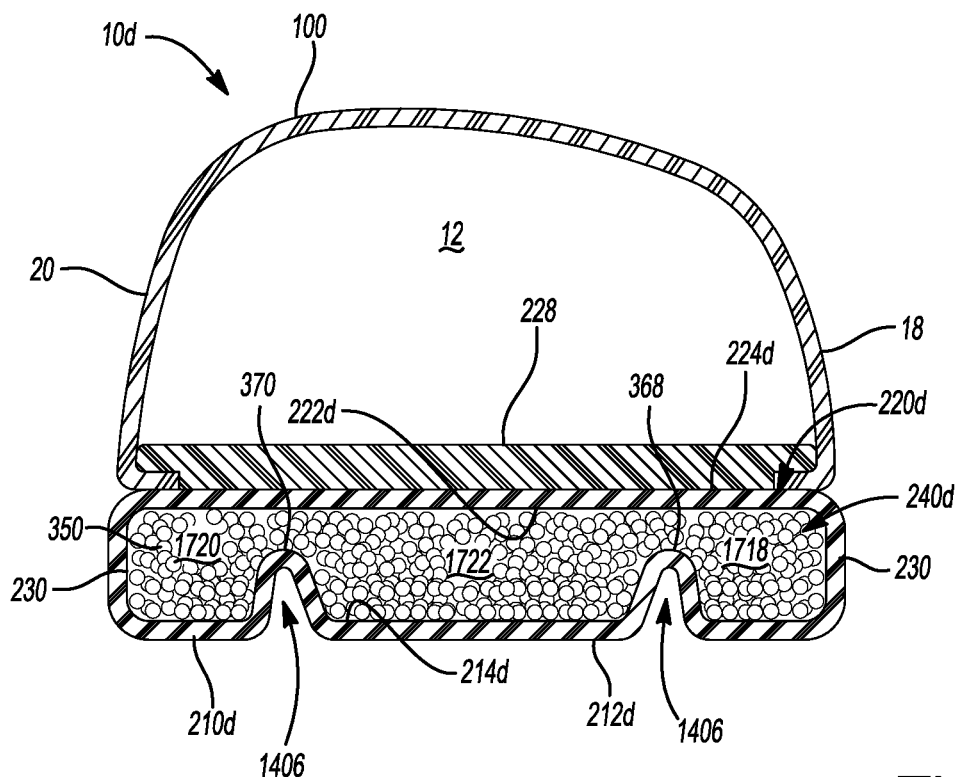
FIG. 17 is a cross-sectional view of a heel region of the article of footwear of FIG. 16 taken along line 17-17 of FIG. 16 showing particulate matter residing within a cavity of a sole structure.
Figure 18:
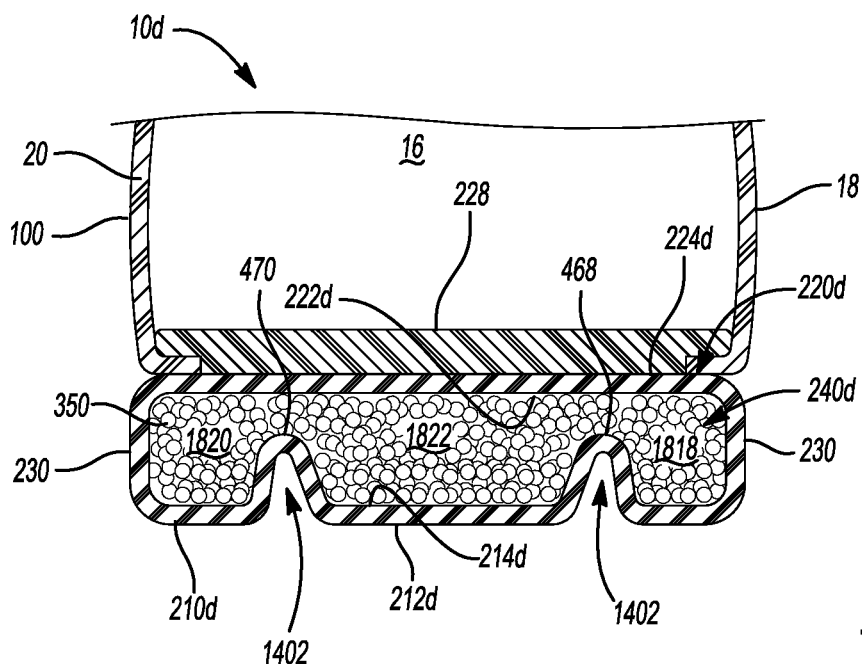
FIG. 18 is a partial cross-sectional view of a forefoot region of the article of footwear of FIG. 16 taken along line 18-18 of FIG. 16 showing particulate matter residing within a cavity of a sole structure.

Referring to FIGS. 16-18, in some implementations, an article of footwear 10d includes an upper 100 and a sole structure 200d attached to the upper 100. FIG. 16 shows a bottom perspective view of the footwear 10d. In view of the substantial similarity in structure and function of the components associated with the article of footwear 10 with respect to the article of footwear 10d, like reference numerals are used hereinafter and in the drawings to identify like components while like reference numerals containing letter extensions are used to identify those components that have been modified.

The sole structure 200d may include an outsole 210d and a midsole 220d arranged in the layered configuration and defining a cavity 240d therebetween. The outsole 210d includes an inner surface 214d disposed on an opposite side of the outsole 210d than a ground-engaging surface 212d. The outsole 210d may define the series of grooves 442, 444, 446 (FIGS. 14 and 15) that extend between the lateral and medial sides 18, 20 within the cavity 240d to form the toe, forefoot, mid-foot, and heel regions 1300, 1302, 1304, 1306, respectively. In some implementations, the outsole 210d further defines one or more closed grooves 1400, 1402, 1404, 1406 located within corresponding ones of the regions

1300, 1302, 1304, 1306. A closed groove refers to a groove having one or more sides closed at its ends to form a loop fully- or partially enclosing an interior region within the cavity 240*d*. The interior regions formed by the corresponding grooves 1400-1406 may include the same or different shapes, such as polygonal shapes (e.g., rectangular or trapezoidal) or elliptical shapes. FIG. 16 shows the toe region 1300 having two closed grooves 1400 symmetrically arranged, the forefoot region 1302 having closed groove 1402, the mid-foot region 1304 having closed groove 1404, and the heel region 1306 having closed groove 1406. Each closed groove 1400-1406 may extend into the cavity 240*d* in a direction toward the midsole 220*d*, as shown in FIGS. 17 and 18.

The midsole 220*d* includes a bottom surface 222*d* disposed on an opposite side of the midsole 220*c* than a footbed 224*d* and may be integrally formed with the outsole 210*d*. The sole structure 200*d* may further include an insole 228 disposed on the footbed 224*b* within at least a portion of the interior void 102 of the upper 100. The bottom surface 222*d* opposes the inner surface 214*d* to define the cavity 240*d*. The sidewall 230 may separate the bottom surface 222*d* and the inner surface 214*d* to define a depth of the cavity 240*d* and, as with the midsole 222*d*, may be integrally formed with the outsole 210*d*.

In some implementations, the particulate matter 350 resides within the cavity 240*d* between the inner surface 214*d* of the outsole 210*d*, the bottom surface 222*d* of the midsole 220*d*, and the sidewall(s) 230. In contrast to the examples of FIGS. 12-15, no casing is used to enclose the particulate matter 350. Instead, the particulate matter 350 fills some or all of the volume of the cavity 240*d*. Referring to FIG. 17, a cross-sectional view of the heel region 1306 taken along line 17-17 in FIG. 16 shows the closed groove 1406 and the particulate matter 350 residing within the cavity 240*d* of the sole structure 200*d*. In some examples, the outsole 210*d* bends and tapers into the cavity 240*d* in a direction toward the midsole 220*d* to form the closed groove 1406. In other examples, the outsole 210*d* bends or curves without tapering into the cavity 240*d*. The closed groove 1406 defines a divider 368 located proximate to the lateral side 18 and a divider 370 located proximate to the medial side 20. A lateral peripheral region 1718 is formed between the divider 368 and the sidewall 230 at the lateral side 18, a medial peripheral region 1720 is formed between the divider 370 and the sidewall 230 at the medial side 20, and an interior region 1722 is formed between the dividers 368, 370 (e.g., the interior region 1722 is enclosed by the closed groove 1406). Particulate matter 350 may reside in the cavity 240*d* at each of the regions 1718, 1720, 1722. In some implementations, the dividers 368, 370 extend into the cavity 240*d* from the outsole 210*d* and have distal ends that terminate without contacting the bottom surface 222*d* of the midsole 220*d*. That is, the distal ends of the dividers 368, 370 and the bottom surface 222*d* are separated by a corresponding gap. The corresponding gaps separating the dividers 368, 370 and the bottom surface 222*d* may permit the particulate matter 350 residing in the regions 1718, 1720, 1722 to migrate to adjoining regions via the gaps during gradient loading of the sole structure 200*d*. In other implementations, the dividers 368, 370 extend into the cavity 240*d* from the outsole 210*d* and have distal ends that terminate at a point of contact with the bottom surface 222*d* of the midsole 220*d*, thereby preventing the particulate matter 350 from migrating between adjoining regions 1718, 1720, 1722 that are divided and isolated by the dividers 368, 370 in contact with the bottom surface 222*d*. The midsole 220*d* may be formed from the flexible material forming the midsole 220 of FIGS. 1-3 to provide the midsole 220*d* with sufficient flexibility, thereby allowing the particulate matter 350 received within the cavity 240*d* to interact with the profile of the bottom surface of the foot during gradient loading of the sole structure 200*d*.

Referring to FIG. 18, a partial cross-sectional view of the forefoot region 1302 taken along line 18-18 of FIG. 16 shows the closed groove 1402 and the particulate matter 350 residing within the cavity 240*d* of the sole structure 200*d*. In some examples, the outsole 210*d* bends and tapers into the cavity 240*d* in a direction toward the midsole 220*d* to form the closed groove 1402. In other examples, the outsole 210*d* bends or curves without tapering into the cavity 240*d*. The closed groove 1402 defines a divider 468 located proximate to the lateral side 18 and a divider 470 located proximate to the medial side 20. A lateral peripheral region 1818 is formed between the divider 468 and the sidewall 230 at the lateral side 18, a medial peripheral region 1820 is formed between the divider 470 and the sidewall 230 at the medial side 20, and an interior region 1822 is formed between the dividers 468, 470 (e.g., the interior region 1822 is enclosed between the closed groove 1402).

Particulate matter 350 may reside in the cavity 240*d* at each of the regions 1818, 1820, 1822. In some implementations, the dividers 468, 470 extend into the cavity 240*d* from the outsole 210*d* and have distal ends that terminate without contacting the bottom surface 222*d* of the midsole 220*d*. That is, the distal ends of the dividers 468, 470 and the bottom surface 222*d* are separated by a corresponding gap. The corresponding gaps separating the dividers 468, 470 and the bottom surface 222*d* may permit the particulate matter 350 residing in the regions 1818, 1820, 1822 to migrate to adjoining regions via the gaps during gradient loading of the sole structure 200*d*. In other implementations, the dividers 468, 470 extend into the cavity 240*d* from the outsole 210*d* and have distal ends that terminate at a point of contact with the bottom surface 222*d* of the midsole 220*d*, thereby preventing the particulate matter 350 from migrating between adjoining regions 1818, 1820, 1822 that are divided and isolated by the dividers 468, 470 in contact with the bottom surface 222*d*. The closed grooves 1400 and 1404 may be configured similarly to the closed grooves 1402 and 1406 discussed in the implementations above. In some configurations, the midsole 220*d*, or a portion thereof, may be removed to provide direct contact between the insole 228 supporting the bottom surface of the foot and the particulate matter 350 residing in the cavity 240*d*. In these configurations, the insole 228 may correspond to a flexible strobel that allows the particulate matter 350 residing in the cavity 240*d* to conform to the bottom surface of the foot during gradient loading of the sole structure 200*d*.

Figure 19:
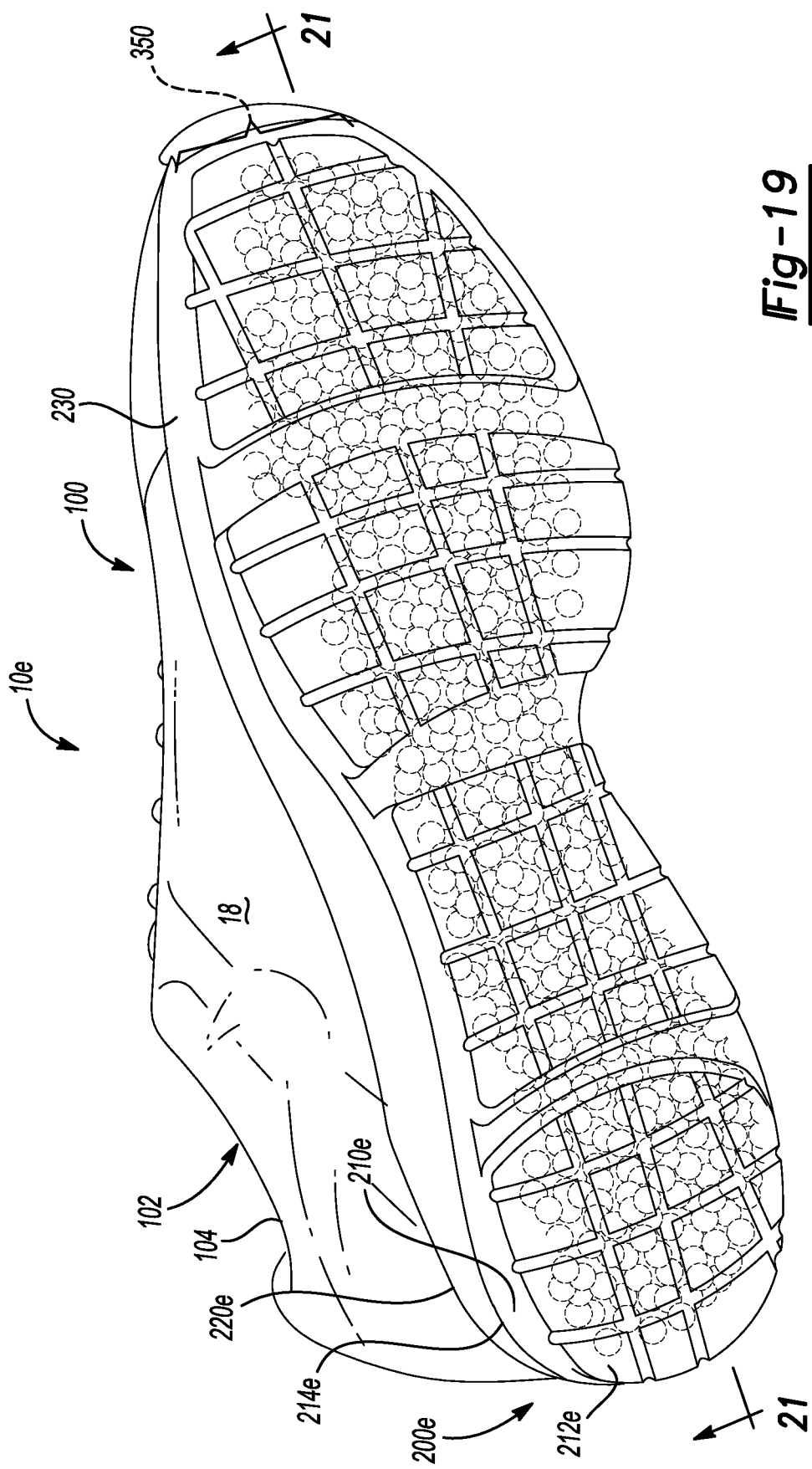
FIG. 19 is a bottom perspective view of an article of footwear in accordance with principles of the present disclosure.
Figure 20:
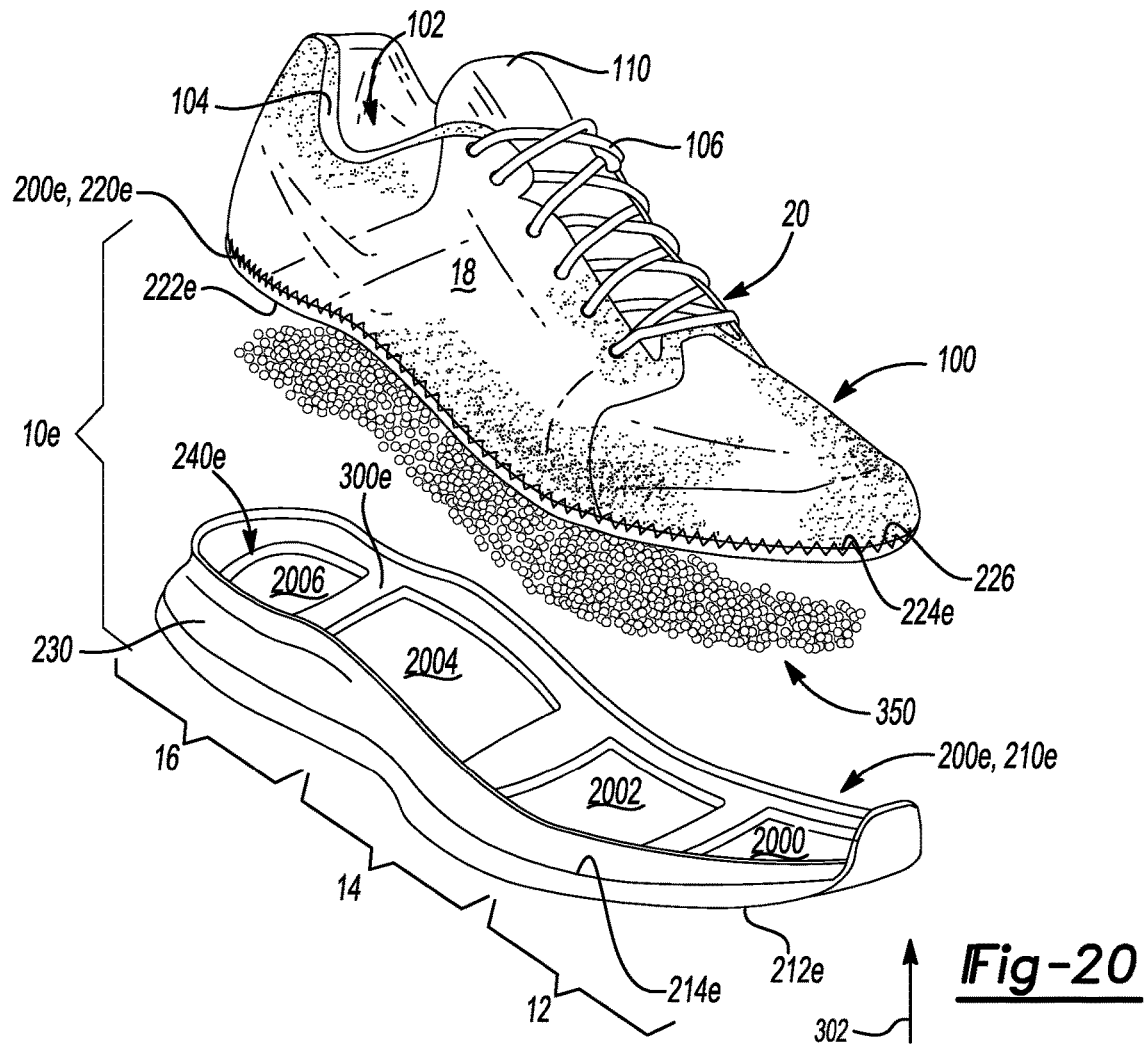
FIG. 20 is an exploded view of the article of footwear of FIG. 19 showing a projection plate extending from an inner surface of an outsole toward a bottom surface of a midsole.
Figure 21:
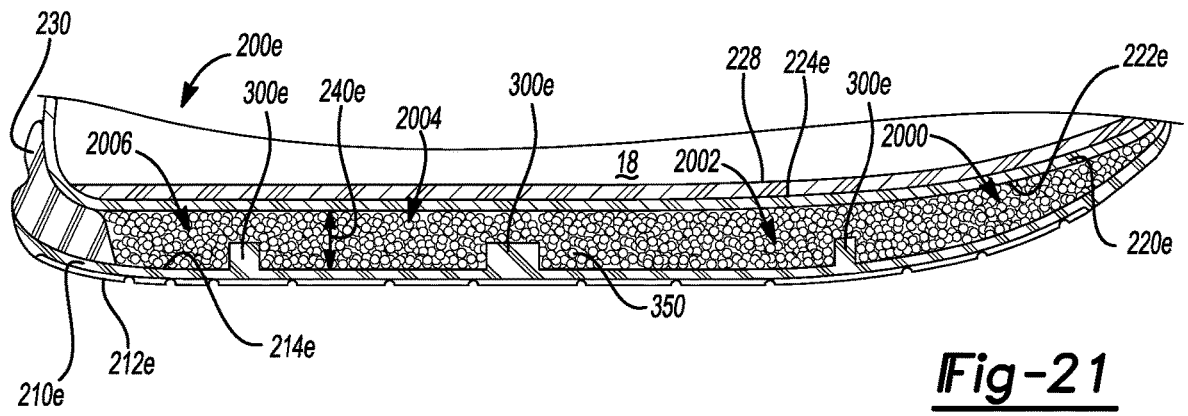
FIG. 21 is a partial cross-sectional view of the article of footwear of FIG. 19 taken along line 21-21 of FIG. 19 showing a projection plate extending from an inner surface of an outsole toward a bottom surface of a midsole and particulate matter residing within apertures extending through the projection plate.

Referring to FIGS. 19-21, an article of footwear 10*e* is provided and includes an upper 100 and a sole structure 200*e* attached to the upper 100. FIG. 19 shows a bottom perspective view of the footwear 10*e*. In view of the substantial similarity in structure and function of the components associated with the article of footwear 10 with respect to the article of footwear 10*e*, like reference numerals are used hereinafter and in the drawings to identify like components while like reference numerals containing letter extensions are used to identify those components that have been modified.

The sole structure 200*e* may include an outsole 210*e* and a midsole 220*e* arranged in the layered configuration and defining the cavity 240*e* therebetween. The outsole 210*e* includes an inner surface 214*e* disposed on an opposite side of the outsole 210e than the ground-engaging surface 212e. The midsole 220e includes a bottom surface 222e disposed on an opposite side of the midsole 220e than a footbed 224e. The sole structure 200e may further include an insole 228 disposed on the footbed 224e within at least a portion of the interior void 102 of the upper 100. The bottom surface 222e opposes the inner surface 214e to define the cavity 240e and the sidewall 230 may separate the bottom surface 222e and the inner surface 214e to define a depth of the cavity 240e.

In some implementations, a projection plate 300e extends into the cavity 240e to control migration of the particulate matter 350 residing in the cavity 240e during use of the footwear 10e. FIG. 20 provides an exploded view of the article of footwear 10e showing the projection plate 300e extending in a direction of the arrow 302 from the inner surface 214e of the outsole 210e toward the bottom surface 222e of the midsole 220e. The projection plate 300e, the midsole 220e, and the outsole 210e extend around a perimeter of the sole structure 200e and have a shape that generally corresponds with an outline of the foot. More particularly, the projection plate 300e, the midsole 220e, and the outsole 210e extend from the forefoot portion 12 to the heel portion 16 and also from the lateral side 18 to the medial side 20. Apertures 2000, 2002, 2004, 2006 extend between the surfaces of the projection plate 300e to form openings that expose portions of the inner surface 214e of the outsole 210e. The surfaces of the projection plate 300e may be contoured to conform to the shape of the bottom surface of the foot. One of the apertures 2000 is primarily located in the forefoot portion 12, while another aperture 2002 is located in the forefoot portion 12 and extends into the mid-foot portion 14. Aperture 2004 is located in the mid-foot and heel portions 14, 16, and aperture 2006 is primarily located in the heel portion 16 and at a position that corresponds with a calcaneus bone of the foot. That is, the aperture 2006 in the heel portion 16 is generally located to correspond with the heel of the foot.

Each of the apertures 2000-2006 correspond to receptacles enclosed by interior walls of the projection plate 300e to receive and store a corresponding quantity of the particulate matter 350. A distance the projection plate 300e extends from the inner surface 214e of the outsole 210e toward the bottom surface 222e of the midsole 220e defines a depth of the apertures/receptacles 2000-2006. In some examples, the projection plate 300e partially extends into the cavity 240e from the inner surface 214e of the outsole 210e, permitting particulate matter 350 residing above projection plate (e.g., outside of the apertures 2000-2006) to migrate through the cavity 240e to adjoining portions 12, 14, 16 of the sole structure 200e. In other examples, the projection plate 300e extends through the cavity 240e from the inner surface 214e and into contact with the bottom surface 222e of the midsole 220e to close off the apertures 2000-2006, thereby restricting particulate matter 350 residing within the apertures 2000-2006 from migrating or shifting away.

The projection plate 300e may be formed from a diverse range of materials that include polymers, for example. Suitable polymers include polyester, thermoset urethane, thermoplastic urethane, various nylon formulations, rubber, polyether block amide, polybutylene terephthalate, or blends of these materials. Composite materials may also be formed by incorporating glass fibers or carbon fibers into the various polymer materials discussed above. In some examples, the plate 300e may also be formed from polymer foam materials. Accordingly, a variety of different materials may be utilized in manufacturing the projection plate 300e, depending on the desired properties of the sole structure 200e. The midsole 220e may be formed from the flexible material forming the midsole 220 of FIGS. 1-3 to provide the midsole 220e with sufficient flexibility, thereby allowing the projection plate 300e and the particulate matter 350 residing in the cavity 240a to provide cushioning to the bottom surface of the foot during gradient loading of the sole structure 200e as the midsole 220e translates towards the inner surface 214e of the outsole 210e.

Referring to FIG. 21, a cross-sectional view taken along line 21-21 of FIG. 19 shows the particulate matter 350 residing within the cavity 240e between the midsole 220e and the outsole 210e. The example shows projection plate 300e partially extending into the cavity 240e from the inner surface 214e of the outsole 210e and the apertures 2000-2006 extending through the surfaces of the projection plate 300e that expose the inner surface 214e. The particulate matter 350 may partially or entirely fill the volume of the cavity 240e between the bottom surface 222d and the inner surface 214e or the projection plate 300e. The distance the projection plate 300e extends away from the inner surface 214e corresponds to a height of the interior walls of the projection plate 300e that define the depth of the apertures 2000-2006. Accordingly, particulate matter 350 residing below the depth one of the apertures 2000-2006 is restricted from migrating to an adjoining aperture. However, particulate matter 350 that resides above the depth of the apertures 2000-2006 is permitted to migrate between adjoining apertures if un-occupied space exists within the cavity 240e. In some configurations, the midsole 220e, or a portion thereof, may be removed to provide direct contact between the insole 228 supporting the bottom surface of the foot and the particulate matter 350 residing in the cavity 240e. In these configurations, the insole 228 may correspond to a flexible strobe that allows the particulate matter 350 residing in the cavity 240e to conform to the bottom surface of the foot during gradient loading of the sole structure 200e.

Figure 22:
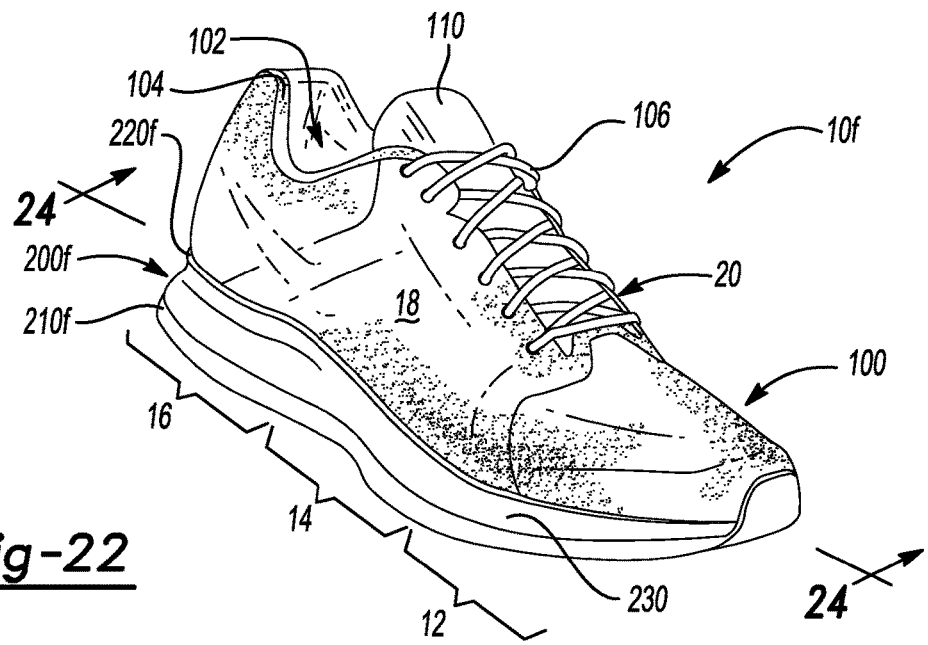
FIG. 22 is a top perspective view of an article of footwear in accordance with principles of the present disclosure.
Figure 23:
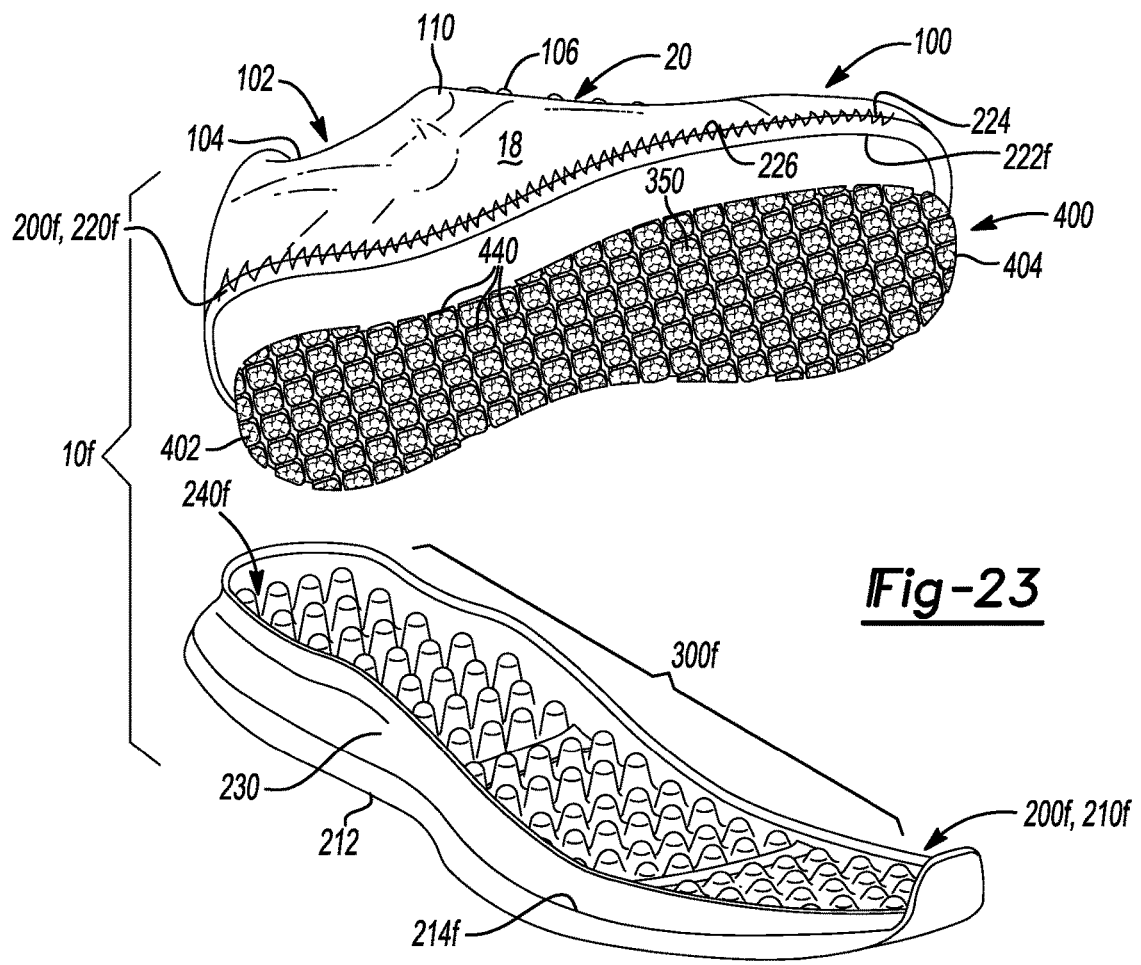
FIG. 23 is an exploded view of the article of footwear of FIG. 22 showing projections extending from an inner surface of an outsole toward a bottom surface of a midsole and a tufted casing containing particulate matter disposed upon the projections.
Figure 24:
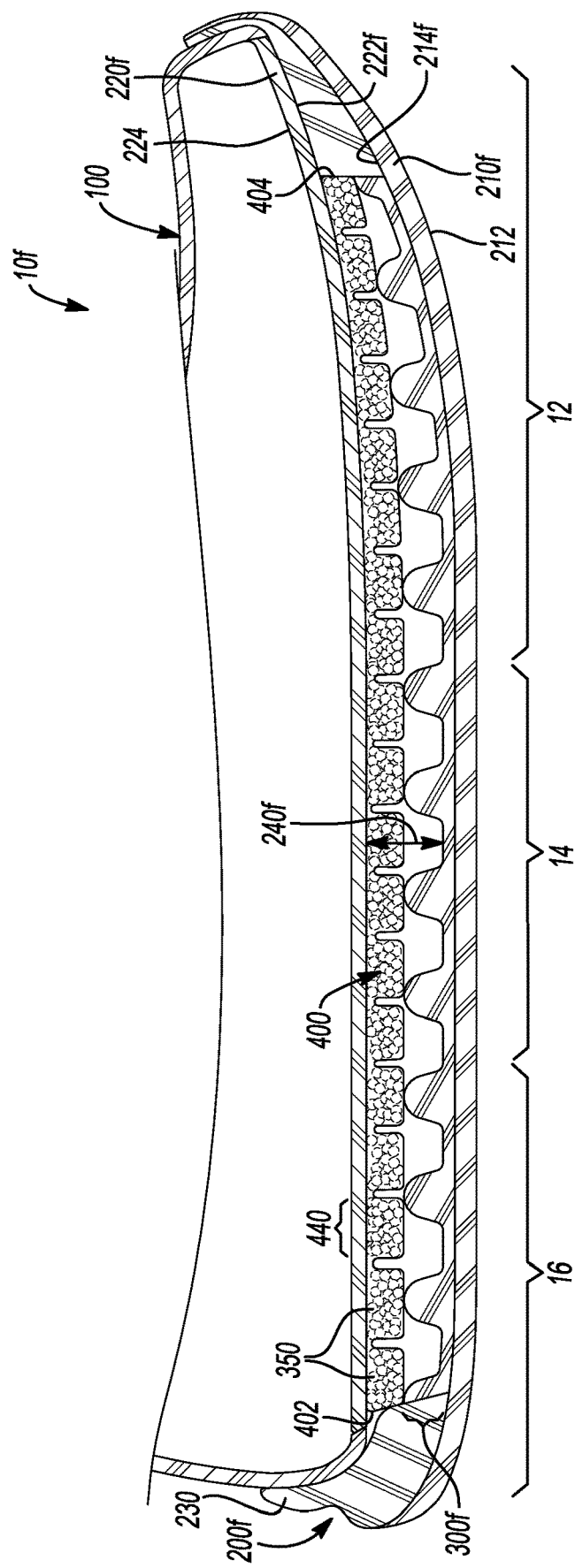
FIG. 24 is a partial cross-sectional view taken along line 24-24 of FIG. 22 showing projections extending from an inner surface of an outsole toward a bottom surface of a midsole and a tufted casing containing particulate matter disposed on the projections.

Referring to FIGS. 22-24, in some implementations, an article of footwear 10f includes an upper 100 and a sole structure 200f attached to the upper 100. In view of the substantial similarity in structure and function of the components associated with the article of footwear 10 with respect to the article of footwear 10f, like reference numerals are used hereinafter and in the drawings to identify like components while like reference numerals containing letter extensions are used to identify those components that have been modified. The sole structure 200f may include the outsole 210f and the midsole 220f arranged in the layered configuration and defining a cavity 240f therebetween. The outsole 210f includes an interior surface 214f disposed on an opposite side of the outsole 210f than the ground-engaging surface 212. The midsole 220f includes a bottom surface 222f disposed on an opposite side of the midsole 220f than the footbed 224. The bottom surface 222f opposes the inner surface 214f to define the cavity 240f therebetween. The sidewall 230 may separate the bottom surface 222f and the inner surface 214f to define a depth of the cavity 240f.

In some implementations, projections 300f extend into the cavity 240f to provide cushioning for the foot as well as to support and limit movement of a tufted casing 400 containing particulate matter 350 residing in the cavity 240a during use of the footwear 10f. The projections 300f may be formed from the one or more polymer foam materials that form the projections 300 of FIGS. 1-3 to provide resilient compressibility under an applied load to attenuate ground-reaction forces. FIG. 23 provides an exploded view of the article of footwear 10f showing the projections 300f extending in a direction from the inner surface 214f of the outsole 210f toward the bottom surface 222f of the midsole 220f. In this implementation, the tufted casing 400 containing particulate matter 350 (e.g., foam beads) is disposed on the projections 300f that extend from the inner surface 214f of the outsole 210f. The tufted casing 400 may be sized and shaped to substantially conform to the outline of the midsole 220f and the outsole 210f. In some examples, the projections 300f are arranged in repeating rows and each projection 300f is equally spaced apart from adjacent projections 300f. In other examples, the projections 300f are arranged in alternating, repeating rows. The midsole 220f may be formed from the flexible material forming the midsole 220 of FIGS. 1-3 to provide the midsole 220f with sufficient flexibility, thereby allowing the particulate matter 350 received within the tufted casing 400 and residing in the cavity 240f to interact with the profile of the bottom surface of the foot during gradient loading of the sole structure 200f.

The tufted casing 400 may be formed from a flexible material. In one configuration, the tufted casing 400 is formed from a mesh material. Additionally or alternatively, the tufted casing 400 may be formed from a nylon material. Thus, the tufted casing 400 may be formed from the flexible material, the mesh material, and/or the nylon material. Optionally, the tufted casing 400 may be formed from any suitable material that allows the received particulate matter 350 to conform to the sole structure 200f, such as surface profiles of the inner and bottom surfaces 214f, 222f, respectively, as well as the contour of the sidewall 230. In some configurations, the midsole 220f, or a portion thereof, may be removed to provide direct contact between the bottom surface of the foot and tufted casing 400 containing the particulate matter 350.

A first end 402 of the tufted casing 400 resides proximate to the heel portion 16 and a second end 404 of the tufted casing 400 resides proximate to the forefoot portion 12 when the casing 400 is received by the cavity 240f on the projections 300f. The tufted casing 400 may be formed by tufting, joining, or fastening portions of material together to define tufted regions or pockets 440 each filled with a corresponding quantity of particulate matter 350. The pockets 440 may extend along the length of the casing 400 between the first end 402 and the second end 404 as well as between the lateral and medial sides 18, 20, respectively, of the sole structure 200f. In some examples, each pocket 440 includes approximately the same quantity of particulate matter 350, while in other examples, at least one of the pockets 440 includes a different quantity of particulate matter 350. For instance, it may be desirable to include a greater quantity of particulate matter 350 within pockets 440 located proximate to the heel portion 16 to increase the level of soft-type cushioning at the heel area of the foot. The pockets 440 may restrict the corresponding quantities of particulate matter 350 from migrating to adjoining pockets. However, some movement of particulate matter 350 may be permitted within the corresponding pockets 440 to provide fluid cushioning during gradient loading of the sole structure 200f. In other words, the pockets 440 are effective to prevent the loss of cushioning in areas of the sole structure 200f caused by particulate matter 350 migration during repeated compressions of the sole structure 200f but may permit movement of the particulate matter 350 within each pocket 440.

Referring to FIG. 24, a cross-sectional view taken along line 24-24 of FIG. 22 shows the tufted casing 400 containing particulate matter 350 received within the cavity 240f and on the projections 300f extending from the inner surface 214f FIG. 24 shoes the projections 300f supporting the tufted casing 400 and the projections 300f being spaced from the midsole 220f when the sole structure 200f is not under an applied load (i.e., the sole structure 200f is at rest). Compressing the sole structure 200f, however, may cause the bottom surface 222f of the midsole 220f, in cooperation with the tufted casing 400 containing particulate matter 350, to translate toward the outsole 210f and into contact with one or more of the projections 300f Here, the projections 300f may compress while contacting the bottom surface 222f as the particulate matter 350 located within the pockets 440 of the tufted casing 400 compresses during gradient loading of the sole structure 200f As discussed above, compressibility by the particulate matter 350 may provide a soft-type cushioning while compressibility by the projections 300f may provide a responsive-type cushioning. Accordingly, the projections 300f and the particulate matter 350 residing within the tufted casing 400 may cooperate to provide gradient cushioning to the article of footwear 10f that changes as the applied load changes (i.e., the greater the load, the more the projections 300f are compressed and, thus, the more responsive the footwear 10f performs). In some configurations, the midsole 220f, or a portion thereof, may be removed to provide closer contact between the bottom surface of the foot and the particulate matter 350 disposed within the pockets 440 of the tufted casing 400 and residing in the cavity 240f. In these configurations, a surface of the casing 400 opposing the bottom surface of the foot may correspond to a flexible stroble that allows the particulate matter 350 residing in the pockets 440 to conform to the bottom surface of the foot during gradient loading of the sole structure 200f.

Figure 27:
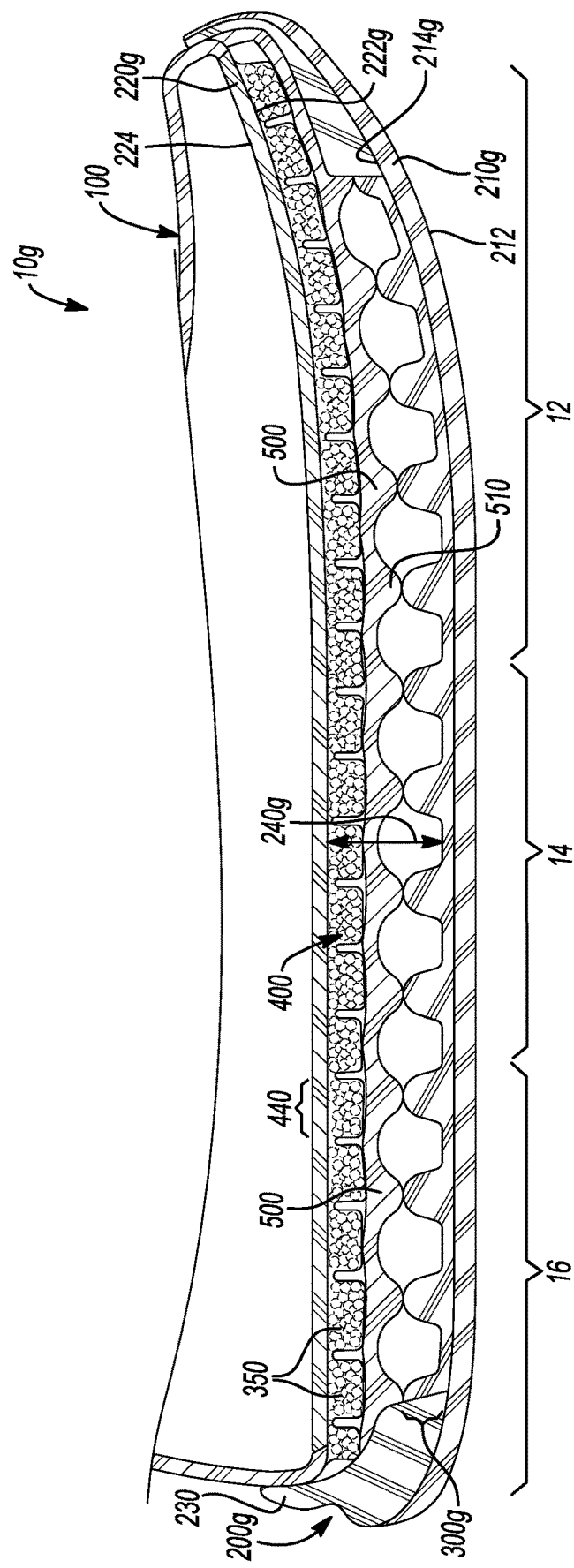
FIG. 27 is a cross-sectional view taken along line 27-27 of FIG. 25 showing a tufted casing containing particulate matter and a cushioning layer received within a cavity and located on projections extending from an inner surface of an outsole toward a bottom surface of a midsole.

Referring to FIGS. 25-27, an article of footwear 10g is provided and includes an upper 100 and a sole structure 200g attached to the upper 100. In view of the substantial similarity in structure and function of the components associated with the article of footwear 10 with respect to the article of footwear 10g, like reference numerals are used hereinafter and in the drawings to identify like components while like reference numerals containing letter extensions are used to identify those components that have been modified. The sole structure 200g may include the outsole 210g and the midsole 220g arranged in the layered configuration and defining a cavity 240g therebetween. The outsole 210g includes an interior surface 214g disposed on an opposite side of the outsole 210g than the ground-engaging surface 212. The midsole 220g includes a bottom surface 222g disposed on an opposite side of the midsole 220g than the footbed 224. The bottom surface 222g opposes the inner surface 214g to define the cavity 240g therebetween. The sidewall 230 may separate the bottom surface 222g and the inner surface 214g to define a depth of the cavity 240g.

Projections 300g extend into the cavity 240g to provide cushioning for the foot as well as to support a cushioning layer 500 and the tufted casing 400 containing particulate matter 350 residing in the cavity 240g during use of the footwear 10f. The projections 300g may be formed from the one or more polymer foam materials that form the projections 300 of FIGS. 1-3 to provide resilient compressibility under an applied load to attenuate ground-reaction forces. FIG. 26 provides an exploded view of the article of footwear 10g showing the tufted casing 400, the cushioning layer 500, and the projections 300g extending in a direction from the inner surface 214g of the outsole 210g toward the bottom surface 222g of the midsole 220g. The tufted casing 400 and the cushioning layer 500 may each have a length extending through the forefoot, mid-foot, and heel portions 12, 14, 16, respectively, and a width between the lateral and medial sides 18, 20, respectively. The tufted casing 400 and the cushioning layer 500 may be sized and shaped to substantially conform to the outline of the midsole 220g and the outsole 210g. The cushioning layer 500 may rest between, and may be in contact with, the distal ends of the projections 300g and the tufted casing 400 when the sole structure 200g is assembled. The cushioning layer 500 may include a contouring structure that forms a plurality of ridges 510 located along surfaces of the cushioning layer 500 to define a so-called egg-crate shape. The cushioning layer 500 may be formed from one or more polymer foam materials, such as ethyl-vinyl-acetate or polyurethane. Each projection 300g may be aligned with a corresponding ridge 510 of the cushioning layer 500 that opposes the outsole 210g. The midsole 220g may be formed from the flexible material forming the midsole 220 of FIGS. 1-3 to provide the midsole 220g with sufficient flexibility, thereby allowing the particulate matter 350 received within the tufted casing 400 and residing in the cavity 240g to interact with the profile of the bottom surface of the foot during gradient loading of the sole structure 200g.

Referring to FIG. 27, a cross-sectional view taken along line 27-27 of FIG. 25 shows the tufted casing 400 containing particulate matter 350 and the cushioning layer 500 received within the cavity 240g on the projections 300g extending from the inner surface 214g of the outsole 210g. FIG. 27 shows each ridge 510 of the cushioning layer 500 opposing the outsole 210g and being supported by a corresponding one of the projections 300g extending into the cavity 240g from the inner surface 214g. The pairs of ridges 510 and projections 300g located within the cavity 240g may cooperate to provide resilient compressibility under an applied load to attenuate ground-reaction forces. For example, the pairs of ridges 510 and projections 300g may compress against each other under load to provide a spring-effect that dampens the magnitude of the impact on the foot. In some examples, voids between pairs of ridges 510 and projections 300g may be filled with particulate matter 350. In addition to the resilient compressibility provided by the pairs of ridges 510 and projections 300g, the particulate matter 350 disposed within the pockets 440 of the tufted casing 400 compresses during gradient loading of the sole structure 200g. As discussed above, compressibility by the particulate matter 350 may provide a soft-type cushioning while compressibility by the projections 300g may provide a responsive-type cushioning. Accordingly, the projections 300g, the cushioning layer 500, and the particulate matter 350 residing within the tufted casing 400 may cooperate to provide gradient cushioning to the article of footwear 10g that changes as the applied load changes (i.e., the greater the load, the more the projections 300g are compressed and, thus, the more responsive the footwear 10g performs). In some configurations, the midsole 220g, or a portion thereof, may be removed to provide direct contact between the bottom surface of the foot and the tufted casing 400 containing the particulate matter 350.

Figure 28:
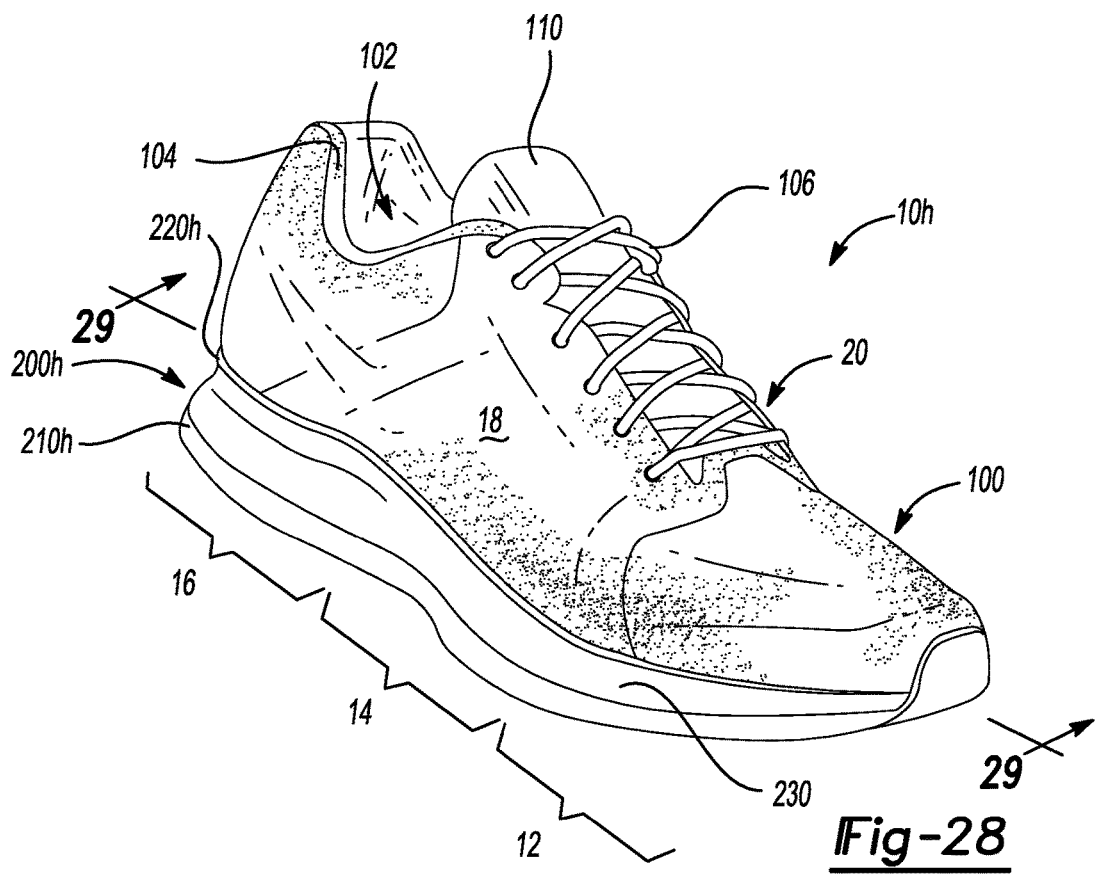
FIG. 28 is a top perspective view of an article of footwear in accordance with principles of the present disclosure.
Figure 29:
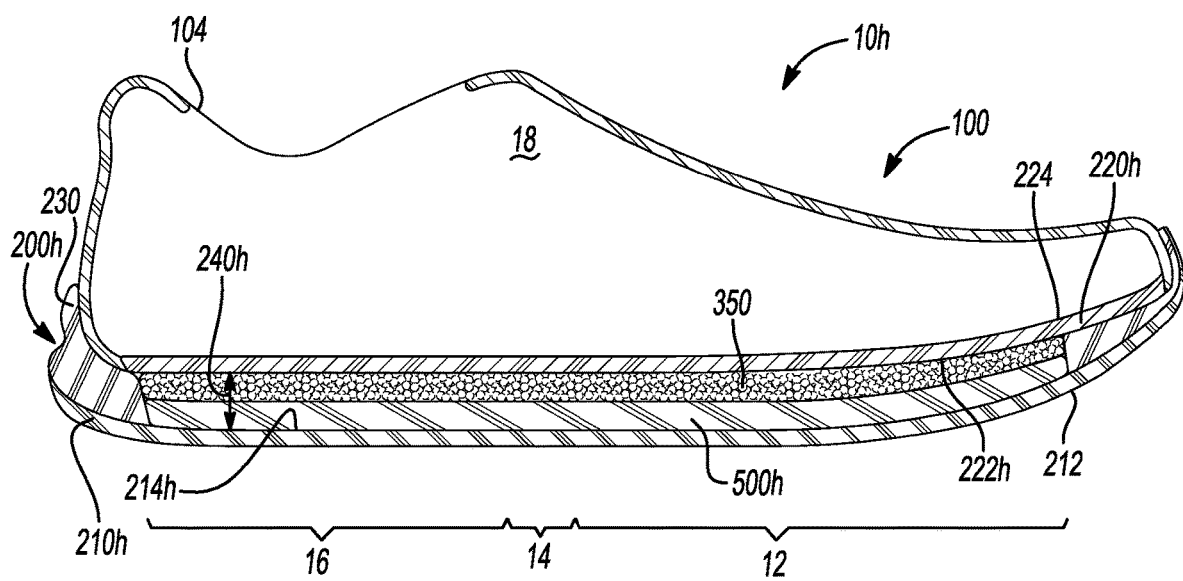
FIG. 29 is a cross-sectional view taken along line 29-29 of FIG. 28 showing a sole structure including a cushioning layer disposed on an inner surface of an outsole and particulate matter disposed between the cushioning layer and a bottom surface of a midsole.

Referring to FIGS. 28 and 29, in some implementations, an article of footwear 10h includes an upper 100 and a sole structure 200h attached to the upper 100. In view of the substantial similarity in structure and function of the components associated with the article of footwear 10 with respect to the article of footwear 10h, like reference numerals are used hereinafter and in the drawings to identify like components while like reference numerals containing letter extensions are used to identify those components that have been modified. The sole structure 200h may include the outsole 210h and the midsole 220h arranged in the layered configuration and defining a cavity 240h therebetween. The outsole 210h includes an interior surface 214h disposed on an opposite side of the outsole 210h than the ground-engaging surface 212. The midsole 220h includes a bottom surface 222h disposed on an opposite side of the midsole 220h than the footbed 224. The bottom surface 222h opposes the inner surface 214h to define the cavity 240h therebetween. The sidewall 230 may separate the bottom surface 222h and the inner surface 214h to define a depth of the cavity 240h.

In some implementations, the sole structure 200h includes a cushioning layer 500h and particulate matter 350 disposed within the cavity 240h. Referring to FIG. 29, a cross-sectional view taken along line 29-29 of FIG. 28 shows the cushioning layer 500h disposed on the inner surface 214h of the outsole 210h and the quantity of particulate matter 350 disposed between the cushioning layer 500h and the bottom surface 222h of the midsole 220h when the sole structure 200h is not under an applied load (i.e., when the sole structure 200h is at rest). In some examples, the cushioning layer 500h includes a slab of polymer foam sized and shaped to occupy a portion of empty space within the cavity 240h. Here, a gap between the cushioning layer 500h and the bottom surface 222h defines a remaining portion of empty space within the cavity 240h that receives the particulate matter 350. In some examples, the particulate matter 350 (e.g., foam beads) slightly over fills (e.g., stuffs) the remaining portion of empty space within the cavity 240h to permit the particulate matter 350 to substantially occupy the area enclosed between the sidewall 230, the bottom surface 222h of the midsole 220h, and the cushioning layer 500h (other than voids between individual beads of particulate matter 350). The midsole 220h may be formed from the flexible material forming the midsole 220 of FIGS. 1-3 to provide the midsole 220h with sufficient flexibility, thereby allowing the particulate matter 350 received within the cavity 240h to interact with the profile of the bottom surface of the foot during gradient loading of the sole structure 200h.

During gradient loading of the sole structure 200h, the midsole 220h may translate toward the outsole 210h as the particulate matter 350 compresses between the midsole 220h and the cushioning layer 500h. Here, the cushioning layer 500h compresses resiliently between the outsole 210h and the midsole 220h. The cushioning layer 500h, together with the quantity of particulate matter 350 (e.g., foam beads) residing on the cushioning layer 500h, may cooperate to enhance functionality and enhance cushioning characteristics that a conventional midsole provides. For example, when the sole structure 200h is under load, the particulate matter 350 compressing may provide a level of soft-type cushioning during an initial impact of a ground-reaction force while compressibility of the cushioning layer 500h may occur after the initial impact to provide responsive-type cushioning. Accordingly, the particulate matter 350 and the cushioning layer 500h residing in the cavity 240h may cooperate to provide gradient cushioning to the article of footwear 10h that changes as the applied load changes (i.e., the greater the load, the more the cushioning layer 500h compresses, thus, the more responsive the footwear 10h performs).

Figure 30:
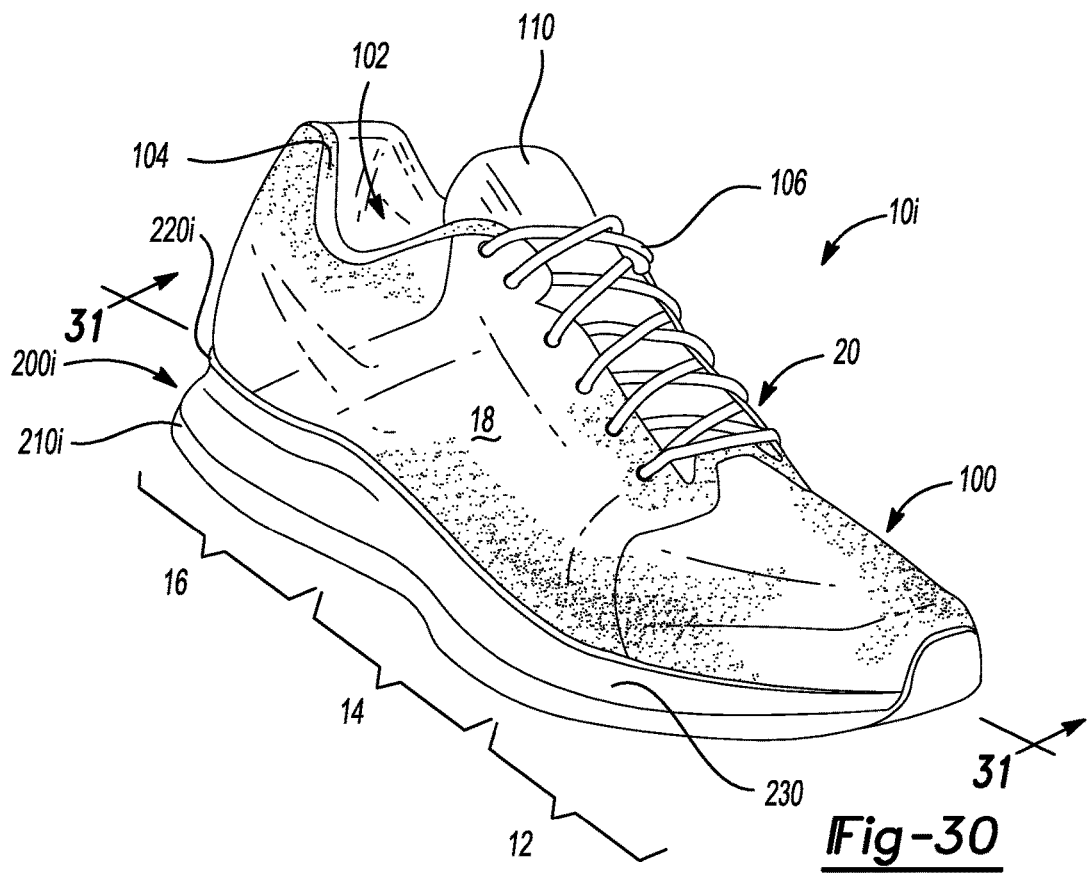
FIG. 30 is a top perspective view of an article of footwear in accordance with principles of the present disclosure.
Figure 31:
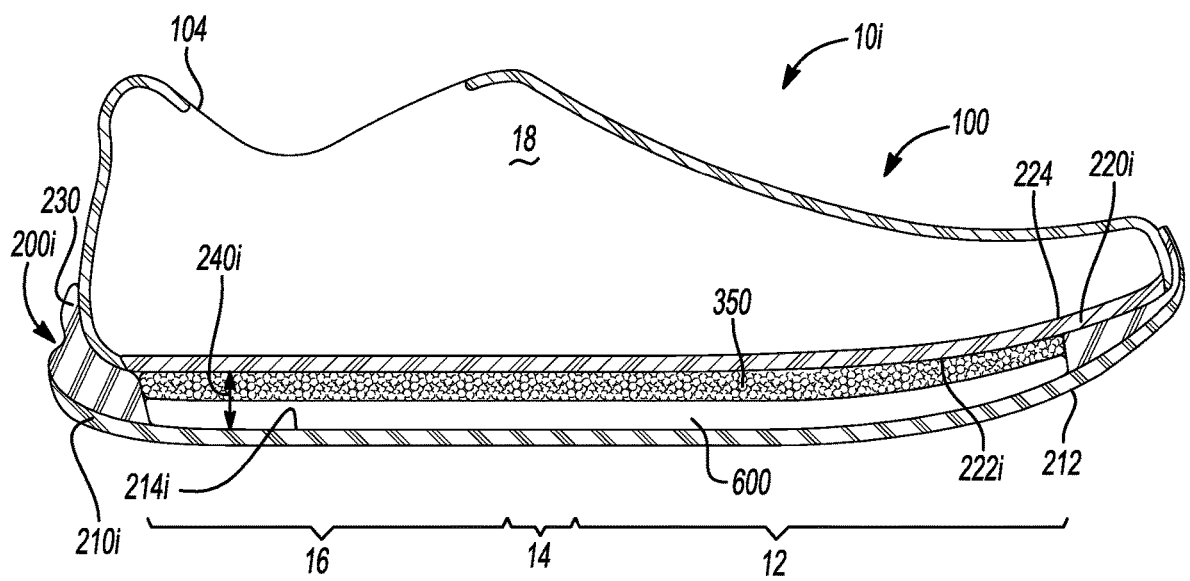
FIG. 31 is a cross-sectional view taken along line 31-31 of FIG. 30 showing a sole structure including a fluid-filled chamber disposed on an inner surface of an outsole and particulate matter disposed between the fluid-filled chamber and a bottom surface of a midsole.

Referring to FIGS. 30 and 31, in some implementations, an article of footwear 10i includes an upper 100 and a sole structure 200i attached to the upper 100. In view of the substantial similarity in structure and function of the components associated with the article of footwear 10 with respect to the article of footwear 10i, like reference numerals are used hereinafter and in the drawings to identify like components while like reference numerals containing letter extensions are used to identify those components that have been modified. The sole structure 200i may include the outsole 210i and the midsole 220i arranged in the layered configuration and defining a cavity 240i therebetween. The outsole 210i includes an interior surface 214i disposed on an opposite side of the outsole 210i than the ground-engaging surface 212. The midsole 220i includes a bottom surface 222i disposed on an opposite side of the midsole 220i than the footbed 224. The bottom surface 222i opposes the inner surface 214i to define the cavity 240i therebetween. The sidewall 230 may separate the bottom surface 222i and the inner surface 214i to define a depth of the cavity 240i.

In some implementations, the sole structure 200i includes a fluid-filled chamber 600 and particulate matter 350 disposed within the cavity 240i. In some examples, the fluid-filled chamber 600 defines an interior void that receives a pressurized fluid and provides a durable sealed barrier for retaining the pressurized fluid therein. The pressurized fluid may be air. A wide range of polymer materials may be utilized to form the fluid-filled chamber 600. In selecting the polymer materials, engineering properties, such as tensile strength, stretch properties, fatigue characteristics, and dynamic modulus, as well as the ability of the materials to prevent the diffusion of the fluid contained by the chamber 600 may be considered. Exemplary materials used to form the fluid-filled chamber 600 may include one or more of thermoplastic urethane, polyurethane, polyester, polyester polyurethane, and polyether polyurethane.

Referring to FIG. 31, a cross-sectional view taken along line 31-31 of FIG. 30 shows the fluid-filled chamber 600 disposed on the inner surface 214i of the outsole 210i and the quantity of particulate matter 350 disposed between the fluid-filled chamber 600 and the bottom surface 222i of the midsole 220i when the sole structure 200i is not under an applied load (i.e., when the sole structure 200i is at rest). In some examples, the fluid-filled chamber 600 is sized and shaped to occupy a portion of the empty space within the cavity 240i. Here, a gap between the fluid-filled chamber 600 and the bottom surface 222i defines a remaining portion of empty space within the cavity 240i that receives the particulate matter 350. In some examples, the particulate matter 350 (e.g., foam beads) slightly over fills (e.g., stuffs) the remaining portion of empty space within the cavity 240i to permit the particulate matter 350 to substantially occupy the area enclosed between the sidewall 230, the bottom surface 222i of the midsole 220i, and the fluid-filled chamber 600 (other than voids between individual beads of particulate matter 350). The midsole 220i may be formed from the flexible material forming the midsole 220 of FIGS. 1-3 to provide the midsole 220i with sufficient flexibility, thereby allowing the particulate matter 350 received within the cavity 240i to interact with the profile of the bottom surface of the foot during gradient loading of the sole structure 200i.

During gradient loading of the sole structure 200i, the midsole 220i may translate toward the outsole 210i as the particulate matter 350 compresses between the midsole 220i and the fluid-filled chamber 600. Here, the fluid within the fluid-filled chamber 600 compresses between the outsole 210h and the midsole 220h. The fluid-filled chamber 600, together with the quantity of particulate matter 350 (e.g., foam beads) residing on the fluid-filled chamber 600, may cooperate to enhance functionality and cushioning characteristics that a conventional midsole provides. For example, when the sole structure 200i is under load, the particulate matter 350 compressing may provide a level of soft-type cushioning during an initial impact of a ground-reaction force while compressibility of the fluid contained by the fluid-filled chamber 600 may occur after the initial impact to provide responsive-type cushioning. Accordingly, the particulate matter 350 and the fluid-filled chamber 600 residing in the cavity 240i may cooperate to provide gradient cushioning to the article of footwear 10i that changes as the applied load changes (i.e., the greater the load, the more the fluid contained by the fluid-filled chamber 600 compresses, thus, the more responsive the footwear 10i performs).

Figure 32:
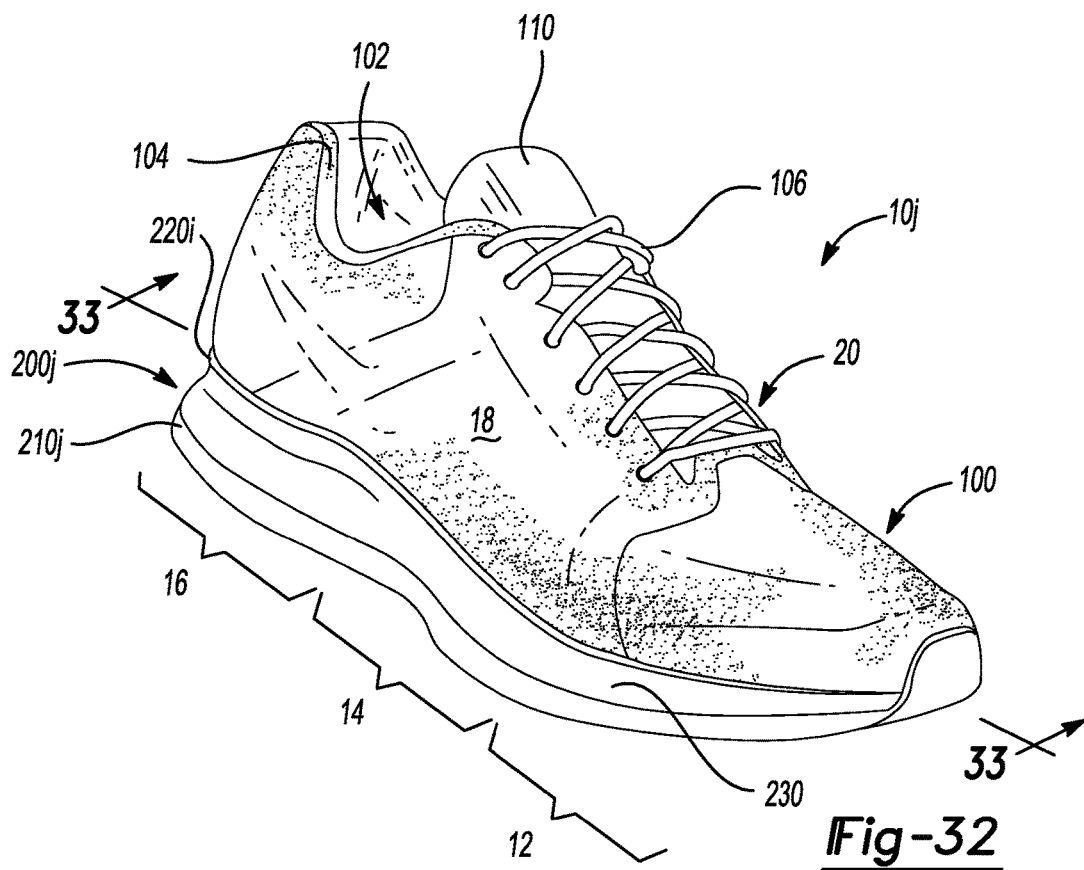
FIG. 32 is a top perspective view of an article of footwear in accordance with principles of the present disclosure.
Figure 33:
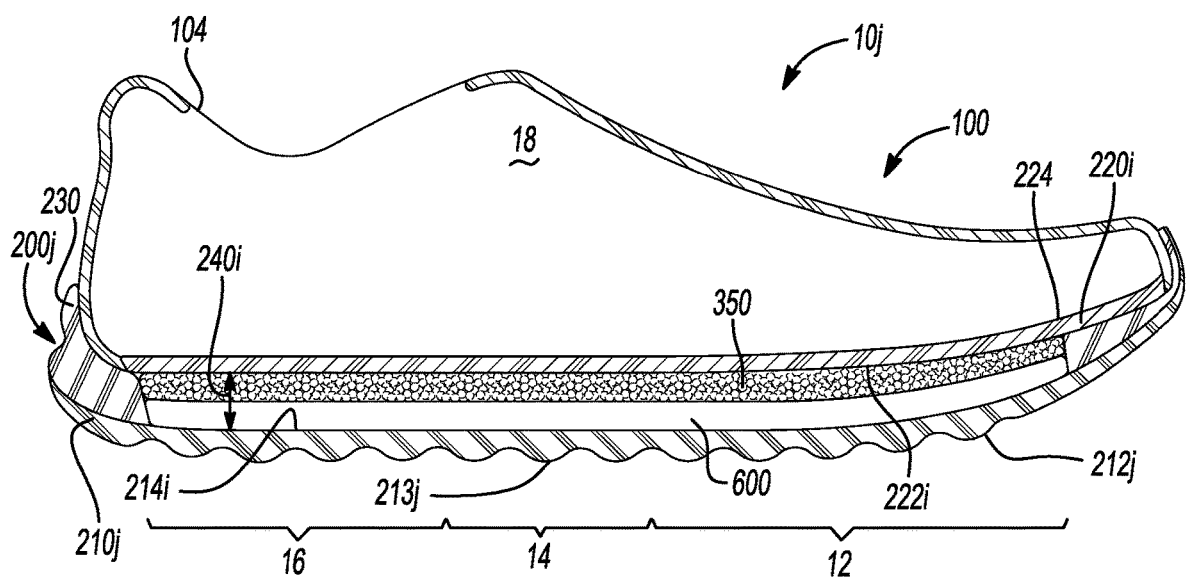
FIG. 33 is a cross-sectional view of FIG. 32 taken along line 33-33 showing a sole structure including a fluid-filled chamber disposed on an inner surface of an outsole and particulate matter disposed between the fluid-filled chamber and a bottom surface of a midsole.

Referring to FIGS. 32 and 33, an article of footwear 10j is provided and includes an upper 100 and a sole structure 200j attached to the upper 100. In view of the substantial similarity in structure and function of the components associated with the article of footwear 10 with respect to the article of footwear 10j, like reference numerals are used hereinafter and in the drawings to identify like components while like reference numerals containing letter extensions are used to identify those components that have been modified.

The sole structure 200j may include an outsole 210j and the midsole 220i of FIGS. 30 and 31 arranged in the layered configuration and defining the cavity 240i therebetween. The sole structure 200j also includes the fluid-filled chamber 600 and the particulate matter 350 disposed within the cavity 240i. In other implementations, the bottom cushioning member 500h of FIGS. 28 and 29 may be disposed on the inner surface 214i in place of the fluid-filled chamber 600.

Referring to FIG. 33, a cross-sectional view taken along line 33-33 of FIG. 32 shows the fluid-filled chamber 600 disposed on the inner surface 214i of the outsole 210j and the quantity of particulate matter 350 disposed between the fluid-filled chamber 600 and the bottom surface 222i of the midsole 220i when the sole structure 200j is not under an applied load (i.e., when the sole structure 200j is at rest). Where the outsole 210i of FIGS. 30 and 31 includes the substantially flat ground-engaging surface 212, FIG. 33 shows the outsole 210j of the article of footwear 10j including a ground-engaging surface 212j that defines a series of bottom ridges or projections 213j that extend away from the cavity 240i and into contact with the ground surface. Here, the ground-engaging surface 212j may permit the outsole 210j to bend and flex as the sole structure 200j rolls for engagement with the ground surface during use of the footwear 10j.

The projections 213j may act as so-called pistons during use of the article of footwear 10j, as the projections 213j may move toward the midsole 220i under an applied load, thereby urging the particulate matter 350 toward the midsole 220i. Because the midsole 220i is formed from a flexible material, as described above with respect to the article of footwear 10i, such upward movement of the projections 213j and particulate matter 350 may be felt at the bottom surface of the user's foot to provide the user with noticeable and responsive cushioning during use. Such cushioning may be tailored by positioning the projections 213j at predetermined locations along the outsole 210j and/or by adjusting the relative size of the projections 213j. For example, the heel portion 16 may include larger projections 213j and/or a greater density of projections 213j than the forefoot portion 12 to provide increased upward movement of the particulate matter 350 during a heel-strike event.

Referring to FIGS. 34 and 35, an article of footwear 10k is provided and includes an upper 100 and a sole structure 200k attached to the upper 100. In view of the substantial similarity in structure and function of the components associated with the article of footwear 10 with respect to the article of footwear 10k, like reference numerals are used hereinafter and in the drawings to identify like components while like reference numerals containing letter extensions are used to identify those components that have been modified.

The sole structure 200k may include an outsole 210k and the midsole 220f of FIGS. 22-24 arranged in the layered configuration and defining a cavity 240k therebetween. Referring to FIG. 35, a partial cross-sectional view taken along line 35-35 of FIG. 34 shows the outsole 210k as including a ground-engaging surface 212k defining a series of bottom ridges or projections 213k extending away from the cavity 240k and an inner surface 214k disposed on an opposite side of the outsole 210k than the ground-engaging surface 212k and defining a series of top ridges or projections 215k that extend into the cavity 240k.

The bottom ridges 213k are substantially identical to the bottom ridges 213j of FIGS. 32-33 and, thus, extend into contact with the ground surface to permit the outsole 210k to bend and flex as the sole structure 200k rolls for engagement with the ground surface during use of the footwear 10k. The top ridges 215k extend into the cavity 240k to provide cushioning for the foot as well as to support and limit movement of the tufted casing 400 containing particulate matter 350 residing in the cavity 240k during use of the footwear 10k. In addition, the top ridges 215k may be aligned with respective ones of the bottom ridges 213k such that a load applied at the bottom ridges 213k is directly transmitted to a corresponding top ridge 215k, thereby providing a load path between the outsole 210k and the tufted casing 400.

The tufted casing 400 is described above with reference to FIGS. 22-24, and includes the first end 402 residing proximate to the heel portion 16 and the second end 404 residing proximate to the forefoot portion 12 when the casing 400 is received by the cavity 240k on the top ridges 215k defined by the inner surface 214k of the outsole 210k. The casing 400 may include the pockets 440 containing equal or different quantities of the particulate matter 350. Where the outsole 210f of FIGS. 22-24 includes the projections 300f extending into the cavity 240f from the inner surface 214f, FIG. 35 shows the top ridges 215k of the inner surface 214k extending into the cavity 240k in place of the projections 300f to support the casing 400 containing particulate matter 350 in an effort to provide response-type cushioning for the foot during use of the footwear 10k. The responsive-type cushioning is further enhanced by providing a direct load path from the top ridges 215k to the respective bottom ridges 213k when the midsole 220f and tufted casing 400 cooperate to apply a load on outsole 210k at the top ridges 215k during use.

FIG. 35 shows the top ridges 215k supporting the tufted casing 400 and being spaced from the midsole 220f when the sole structure 200k is not under an applied load (i.e., the sole structure 200k is at rest). Compressing the sole structure 200k, however, may cause the bottom surface 222f of the midsole 220f, in cooperation with the tufted casing 400 containing particulate matter 350, to translate toward the outsole 210k and into contact with one or more of the top ridges 215k defined by the inner surface 214k. Here, the top ridges 215k may compress while contacting the bottom surface 222f as the particulate matter 350 located within the pockets 440 of the tufted casing 400 compresses and moves during gradient loading of the sole structure 200k.

The outsole 210k may be formed form a resilient-type material to provide response-type cushioning when the top ridges 215k compress in the same manner as the projections 300f of FIGS. 22-24. As discussed above, compressibility by the particulate matter 350 may provide a soft-type cushioning. Accordingly, the top ridges 215k and the particulate matter 350 residing within the tufted casing 400 may cooperate to provide gradient cushioning to the article of footwear 10k that changes as the applied load changes (i.e., the greater the load, the more the top ridges 215k are compressed and, thus, the more responsive the footwear 10k performs). As described above, the midsole 220f may be formed from the flexible material forming the midsole 220 of FIGS. 1-3 to provide the midsole 220f with sufficient flexibility, thereby allowing the particulate matter 350 received within the tufted casing 400 and residing in the cavity 240k to interact with the profile of the bottom surface of the foot during gradient loading of the sole structure 200k. In some configurations, the midsole 220f, or a portion thereof, may be removed to provide direct contact between the bottom surface of the foot and the tufted casing 400 containing the particulate matter 350.

Referring to FIGS. 36 and 37, an article of footwear 10l is provided and includes an upper 100 and a sole structure 200l attached to the upper 100. In view of the substantial similarity in structure and function of the components associated with the article of footwear 10 with respect to the article of footwear 10l, like reference numerals are used hereinafter and in the drawings to identify like components while like reference numerals containing letter extensions are used to identify those components that have been modified. The sole structure 200l may include an outsole 210l and the midsole 220g of FIGS. 25-27 arranged in the layered configuration and defining a cavity 240l therebetween.

Referring to FIG. 37, a partial cross-sectional view taken along line 37-37 of FIG. 36 shows the outsole 210l as including a ground-engaging surface 212l defining a series of bottom ridges 213l extending away from the cavity 240l and an inner surface 214l disposed on an opposite side of the outsole 210l than the ground-engaging surface 212l and defining a series of top ridges 215l that extend into the cavity 240l. The bottom ridges 213l are substantially identical to the bottom ridges 213j of FIGS. 32-33 and, thus, extend into contact with the ground surface to permit the outsole 210l to bend and flex as the sole structure 200l rolls for engagement with the ground surface during use of the footwear 10l.

The top ridges 215l extend into the cavity 240l to provide cushioning for the foot as well as to support a cushioning layer 500l and the tufted casing 400 containing particulate matter 350 residing in the cavity 240l during use of the footwear 10l. The tufted casing 400 and the cushioning layer 500l may be sized and shaped to substantially conform to a perimeter of the midsole 220g and the outsole 210l. The cushioning layer 500l may rest between, and may be in contact with, the distal ends of the top ridges 515l of the inner surface 214l of the outsole 210l and the tufted casing 400 when the sole structure 200l is assembled.

The cushioning layer 500l may include a contouring structure that forms a plurality of bottom ridges 510l and top ridges 515l located along surfaces of the cushioning layer 500l to define a so-called egg-crate shape. In one configuration, the bottom ridges 510l and top ridges 515l are aligned with respective ones of the bottom ridges 213l and top ridges 215l of the outsole 210l to provide a direct load path from the tufted casing 400 to the ground during use. The cushioning layer 500l may be formed from one or more polymer foam materials, such as ethyl-vinyl-acetate or polyurethane. Each top ridge 215l of the outsole 210l may be aligned with a corresponding bottom ridge 510l of the cushioning layer 500 that opposes the outsole 210l. Each top ridge 515l of the cushioning layer 500l may oppose and contact a corresponding pocket 440 of the tufted casing 400. As described above, the midsole 220g may be formed from the flexible material forming the midsole 220 of FIGS. 1-3 to provide the midsole 220g with sufficient flexibility, thereby allowing the particulate matter 350 received within the tufted casing 400 and residing in the cavity 240l to interact with the profile of the bottom surface of the foot during gradient loading of the sole structure 200l.

FIG. 37 shows each bottom ridge 510l of the cushioning layer 500l opposing the outsole 210l and being supported by a corresponding one of the top ridges 215l of the inner surface 214l extending into the cavity 240l. The corresponding pairs of bottom ridges 510l and top ridges 215l located within the cavity 240l may cooperate to provide resilient compressibility under an applied load to attenuate ground-reaction forces. For example, the pairs of bottom ridges 510l and top ridges 215l may compress against each other under load to provide a spring-effect that dampens the magnitude of the impact on the foot. In some examples, voids between pairs of bottom ridges 510l and top ridges 215l may be filled with particulate matter 350. In addition to the resilient compressibility provided by the pairs of bottom ridges 510l and top ridges 215l, the particulate matter 350 disposed within the pockets 440 of the tufted casing 400 compresses and moves during gradient loading of the sole structure 200l. As discussed above, compressibility by the particulate matter 350 may provide a soft-type cushioning while compressibility by the bottom ridges 510l and top ridges 215l may provide a responsive-type cushioning. Accordingly, the outsole 210l, the cushioning layer 500l, and the particulate matter 350 residing within the tufted casing 400 may cooperate to provide gradient cushioning to the article of footwear 10l that changes as the applied load changes (i.e., the greater the load, the more the ridges 310l, 315l, 510l, 515l are compressed and, thus, the more responsive the footwear 10l performs). In some configurations, the midsole 220g, or a portion thereof, may be removed to provide direct contact between the bottom surface of the foot and the tufted casing 400 containing the particulate matter 350.

The following Clauses provide an exemplary configuration for the sole structure for an article of footwear described above.

Clause 1: An article of footwear comprising an upper and an outsole attached to the upper and including a ground-engaging surface and an inner surface disposed on an opposite side of the outsole than the ground-engaging surface. The midsole having a footbed and a bottom surface disposed on an opposite side of the midsole than the footbed and opposing the inner surface of the outsole to define a cavity therebetween and a first series of projections extending into the cavity from one of the inner surface and the bottom surface in a first direction toward the other of the inner surface and the bottom surface. The first series of projections being spaced apart from the other of the inner surface and the bottom surface. The second series of projections extend into the cavity from the one of the inner surface and the bottom surface in the first direction toward the other of the inner surface and the bottom surface, the second series of projections having a different height than the first series of projections and being spaced apart from the other of the inner surface and the bottom surface. The quantity of particulate matter is disposed within the cavity.

Clause 2: The article of footwear of Clause 1, wherein the one of the inner surface and the bottom surface is the inner surface, the quantity of particulate matter being disposed around a base of the first series of projections and around a base of the second series of projections.

Clause 3: The article of footwear of any of the preceding Clauses, wherein the first series of projections include a cross-sectional area that decreases in the first direction.

Clause 4: The article of footwear of any of the preceding Clauses, wherein the second series of projections include a cross-sectional area that decreases in the first direction.

Clause 5: The article of footwear of any of the preceding Clauses, wherein the first series of projections and the second series of projections include a constantly tapered outer surface.

Clause 6: The article of footwear of Clause 5, wherein the tapered, outer surface terminates at a rounded, distal end of each projection that opposes the other of the inner surface and the bottom surface.

Clause 7: The article of footwear of any of the preceding Clauses, wherein the first series of projections are disposed proximate to a heel portion of the outsole and the second series of projections are disposed proximate to a forefoot portion of the outsole.

Clause 8: The article of footwear of Clause 6, wherein the first series of projections extend farther from the one of the inner surface and the bottom surface than the second series of projections.

Clause 9: The article of footwear of any of the preceding Clause, wherein the particulate matter includes foam beads.

Clause 10: The article of footwear of Clause 9, wherein the foam beads include a substantially spherical shape.

Clause 11: The article of footwear of Clause 9, wherein the foam beads include approximately the same size and shape.

Clause 12: The article of footwear of Clause 9, wherein the foam beads include at least one of a different size and shape.

Clause 13: The article of footwear of any of the preceding Clauses, wherein the first series of projections and the second series of projections are spaced apart from one another by a void disposed proximate to a mid-foot portion of the outsole.

Clause 14: An article of footwear comprising an upper and an outsole attached to the upper and including a ground-engaging surface and an inner surface disposed on an opposite side of the outsole than the ground-engaging surface. The inner surface including a first series of projections extending in a direction toward the upper and a second series of projections extending toward the upper and having a different height than the first series of projections. The midsole having a footbed and a bottom surface disposed on an opposite side of the midsole than the footbed and opposing the inner surface of the outsole to define a cavity therebetween, the bottom surface spaced apart from the first series of projections and the second series of projections. The quantity of particulate matter is disposed within the cavity.

Clause 15: The article of footwear of Clause 14, wherein the first series of projections include a cross-sectional area that decreases in a direction extending from the outsole toward the midsole.

Clause 16: The article of footwear of any of the preceding Clauses, wherein the second series of projections include a cross-sectional area that decreases in a direction extending from the outsole toward the midsole.

Clause 17: The article of footwear of any of the preceding Clauses, wherein the first series of projections and the second series of projections include a constantly tapered outer surface.

Clause 18: The article of footwear of Clause 17, wherein the tapered, outer surface terminates at a rounded, distal end of each projection that opposes the bottom surface of the midsole.

Clause 19: The article of footwear of any of the preceding Clauses, wherein the first series of projections are disposed proximate to a heel portion of the outsole and the second series of projections are disposed proximate to a forefoot portion of the outsole.

Clause 20: The article of footwear of Clause 19, wherein the first series of projections extend farther from the inner surface of the outsole than the second series of projections.

Clause 21: The article of footwear of any of the preceding Clauses, wherein the particulate matter includes foam beads.

Clause 22: The article of footwear of Clause 21, wherein the foam beads include a substantially spherical shape.

Clause 23: The article of footwear of Clause 21, wherein the foam beads include approximately the same size and shape.

Clause 24: The article of footwear of Clause 21, wherein the foam beads include at least one of a different size and shape.

Clause 25: The article of footwear of any of the preceding Clauses, wherein the first series of projections and the second series of projections are spaced apart from one another by a void disposed proximate to a mid-foot portion of the outsole.

Clause 26: An article of footwear comprising an upper and a midsole having a footbed and a bottom surface disposed on an opposite side of the midsole than the footbed. The bottom surface including a first series of projections extending in a direction away from the upper and a second series of projections extending away from the upper and having a different height than the first series of projections. The outsole attached to the upper and including a ground-engaging surface and an inner surface disposed on an opposite side of the outsole than the ground-engaging surface. The inner surface opposing the bottom surface of the midsole, cooperating with the bottom surface to define a cavity therebetween, and spaced apart from the first series of projections and the second series of projections. The quantity of particulate matter is disposed within the cavity.

Clause 27: The article of footwear of Clause 26, wherein the first series of projections include a cross-sectional area that decreases in a direction extending from the midsole toward the outsole.

Clause 28: The article of footwear of any of the preceding Clauses, wherein the second series of projections include a cross-sectional area that decreases in a direction extending from the midsole toward the outsole.

Clause 29: The article of footwear of any of the preceding Clauses, wherein the first series of projections and the second series of projections include a constantly tapered outer surface.

Clause 30: The article of footwear of Clause 29, wherein the tapered, outer surface terminates at a rounded, distal end of each projection that opposes the inner surface of the outsole.

Clause 31: The article of footwear of any of the preceding Clauses, wherein the first series of projections oppose a heel portion of the outsole and the second series of projections oppose a forefoot portion of the outsole.

Clause 32: The article of footwear of Clause 31, wherein the first series of projections extend farther from the bottom surface of the midsole than the second series of projections.

Clause 33: The article of footwear of any of the preceding Clauses, wherein the particulate matter includes foam beads.

Clause 34: The article of footwear of Clause 33, wherein the foam beads include a substantially spherical shape.

Clause 35: The article of footwear of Clause 33, wherein the foam beads include approximately the same size and shape.

Clause 36: The article of footwear of Clause 33, wherein the foam beads include at least one of a different size and shape.

Clause 37: The article of footwear of any of the preceding Clauses, wherein the first series of projections and the second series of projections are spaced apart from one another by a void that opposes a mid-foot portion of the outsole.

Clause 38: A method of making an article of footwear, the method comprising providing a cavity between a footbed and an outsole and providing one of the footbed and the outsole with a first series of projections that extend into the cavity in a first direction toward the other of the footbed and the outsole, the first series of projections being spaced apart from the other of the footbed and the outsole and providing the one of the footbed and the outsole with a second series of projections that extend into the cavity in the first direction toward the other of the footbed and the outsole, the second series of projections being spaced apart from the other of the footbed and the outsole and having a different height than the first series of projections and providing the cavity with a quantity of particulate matter.

Clause 39: The method of Clause 38, wherein providing the one of the footbed and the outsole with the first series of projections and the second series of projections includes providing the outsole with the first series of projections and the second series of projections.

Clause 40: The method of Clause 39, wherein providing the cavity with the quantity of particulate matter includes providing the quantity of particulate matter around a base of the first series of projections and around a base of the second series of projections.

Clause 41: The method of any of the preceding clauses, wherein providing the one of the footbed and the outsole with the first series of projections includes providing the first series of projections with a cross-sectional area that decreases in a direction toward the other of the footbed and the outsole.

Clause 42: The method of any of the preceding clauses, wherein providing the one of the footbed and the outsole with the second series of projections includes providing the second series of projections with a cross-sectional area that decreases in a direction toward the other of the footbed and the outsole.

Clause 43: The method of any of the preceding clauses, wherein providing the one of the footbed and the outsole with the first series of projections and the second series of projections includes providing the first series of projections and the second series of projections with a constantly tapered outer surface.

Clause 44: The method of any of the preceding clauses, wherein providing the one of the footbed and the outsole with the first series of projections and the second series of projections includes providing the first series of projections proximate to a heel portion of the outsole and the second series of projections proximate to a forefoot portion of the outsole.

Clause 45: The method of Clause 44, wherein providing the first series of projections proximate to a heel portion of the outsole and the second series of projections proximate to a forefoot portion of the outsole includes extending the first series of projections farther from the one of the footbed and the outsole than the second series of projections.

Clause 46: The method of any of the preceding clauses, wherein providing the cavity with the quantity of particulate matter includes providing the cavity with a quantity of foam beads.

Clause 47: The method of Clause 46, wherein providing the cavity with the quantity of foam beads includes providing the cavity with a quantity of foam beads having a substantially spherical shape.

Clause 48: The method of Clause 46, wherein providing the cavity with the quantity of foam beads includes providing the cavity with a quantity of foam beads that include approximately the same size and shape.

Clause 49: The method of Clause 46, wherein providing the cavity with the quantity of foam beads includes providing the cavity with a quantity of foam beads that include at least one of a different size and shape.

Clause 50: The method of any of the preceding clauses, wherein providing the one of the footbed and the outsole with the first series of projections and the second series of projections includes providing a void between the first series of projections and the second series of projections proximate to a mid-foot portion of the outsole.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. An article of footwear comprising:
    an upper;
    an outsole attached to the upper and including a ground-engaging surface and an inner surface disposed on an opposite side of the outsole than the ground-engaging surface;
    a midsole having a footbed and a bottom surface disposed on an opposite side of the midsole than the footbed and opposing the inner surface of the outsole to define a cavity therebetween;
    a first series of projections extending into the cavity from one of the inner surface and the bottom surface in a first direction toward the other of the inner surface and the bottom surface, the first series of projections being spaced apart from the other of the inner surface and the bottom surface;
    a second series of projections extending into the cavity from the one of the inner surface and the bottom surface in the first direction toward the other of the inner surface and the bottom surface, the second series of projections having a different height than the first series of projections and being spaced apart from the other of the inner surface and the bottom surface, the first series of projections extending farther from the one of the inner surface and the bottom surface than the second series of projections; and
    a quantity of particulate matter disposed within the cavity.

2. The article of footwear of claim 1, wherein the one of the inner surface and the bottom surface is the inner surface, the quantity of particulate matter being disposed around a base of the first series of projections and around a base of the second series of projections.

3. The article of footwear of claim 1, wherein the first series of projections include a cross-sectional area that decreases in the first direction.

4. The article of footwear of claim 1, wherein the second series of projections include a cross-sectional area that decreases in the first direction.

5. The article of footwear of claim 1, wherein the first series of projections and the second series of projections include a constantly tapered outer surface.

6. The article of footwear of claim 5, wherein the tapered, outer surface terminates at a rounded, distal end of each projection that opposes the other of the inner surface and the bottom surface.

7. The article of footwear of claim 1, wherein the first series of projections are disposed proximate to a heel portion of the outsole and the second series of projections are disposed proximate to a forefoot portion of the outsole.

8. The article of footwear of claim 1, wherein the particulate matter includes foam beads.

9. The article of footwear of claim 8, wherein the foam beads include a substantially spherical shape.

10. The article of footwear of claim 8, wherein the foam beads include approximately the same size and shape.

11. The article of footwear of claim 8, wherein the foam beads include at least one of a different size and shape.

12. The article of footwear of claim 1, wherein the first series of projections and the second series of projections are spaced apart from one another by a void disposed proximate to a mid-foot portion of the outsole.

13. An article of footwear comprising:
    an upper;
    an outsole attached to the upper and including a ground-engaging surface and an inner surface disposed on an opposite side of the outsole than the ground-engaging surface, the inner surface including (i) a first series of projections disposed proximate to a heel portion of the outsole and extending from the inner surface of the outsole in a direction toward the upper and (ii) a second series of projections disposed proximate to a forefoot portion of the outsole, extending from the inner surface of the outsole toward the upper, and having a different height than the first series of projections, the first series of projections extending farther from the inner surface of the outsole than the second series of projections;
    a midsole having a footbed and a bottom surface disposed on an opposite side of the midsole than the footbed and opposing the inner surface of the outsole to define a cavity therebetween, the bottom surface spaced apart from the first series of projections and the second series of projections; and
    a quantity of particulate matter disposed within the cavity.

14. The article of footwear of claim 13, wherein the first series of projections include a cross-sectional area that decreases in a direction extending from the outsole toward the midsole.

15. The article of footwear of claim 13, wherein the second series of projections include a cross-sectional area that decreases in a direction extending from the outsole toward the midsole.

16. The article of footwear of claim 13, wherein the first series of projections and the second series of projections include a constantly tapered outer surface.

17. The article of footwear of claim 16, wherein the tapered, outer surface terminates at a rounded, distal end of each projection that opposes the bottom surface of the midsole.

18. An article of footwear comprising:
   an upper;
   an outsole attached to the upper and including a ground-engaging surface and an inner surface disposed on an opposite side of the outsole than the ground-engaging surface, the inner surface including a first series of projections extending in a direction toward the upper and a second series of projections extending toward the upper and having a different height than the first series of projections;
   a midsole having a footbed and a bottom surface disposed on an opposite side of the midsole than the footbed and opposing the inner surface of the outsole to define a cavity therebetween, the bottom surface spaced apart from the first series of projections and the second series of projections; and
   a quantity of foam beads disposed within the cavity.

19. The article of footwear of claim 18, wherein the foam beads include a substantially spherical shape.

20. The article of footwear of claim 18, wherein the foam beads include approximately the same size and shape.

21. The article of footwear of claim 18, wherein the foam beads include at least one of a different size and shape.

22. The article of footwear of claim 13, wherein the first series of projections and the second series of projections are spaced apart from one another by a void disposed proximate to a mid-foot portion of the outsole.

\* \* \* \* \*